United States Patent
Zewail et al.

(10) Patent No.: US 12,058,066 B2
(45) Date of Patent: Aug. 6, 2024

(54) PHASE TRACKING REFERENCE SIGNAL (PTRS) ALLOCATION FOR MULTI-SYMBOL DEMODULATION REFERENCE SIGNALS (DMRS)

(71) Applicant: QUALCOMM Incorporated, San Diego, CA (US)

(72) Inventors: Ahmed Abdelaziz Ibrahim Abdelaziz Zewail, San Diego, CA (US); Xiaoxia Zhang, San Diego, CA (US); Tao Luo, San Diego, CA (US); Jing Sun, San Diego, CA (US); Zhifei Fan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/314,812

(22) Filed: May 7, 2021

(65) Prior Publication Data
US 2021/0359811 A1   Nov. 18, 2021

Related U.S. Application Data

(60) Provisional application No. 63/024,262, filed on May 13, 2020.

(51) Int. Cl.
  *H04L 5/00*     (2006.01)
  *H04L 25/02*    (2006.01)
  *H04W 72/20*    (2023.01)

(52) U.S. Cl.
  CPC ........ *H04L 5/0048* (2013.01); *H04L 25/0204* (2013.01); *H04L 25/0224* (2013.01); *H04W 72/20* (2023.01)

(58) Field of Classification Search
  CPC ... H04L 5/0048; H04L 5/0051; H04L 5/0094; H04L 25/0202; H04L 25/0224; H04L 25/0226; H04W 72/0406
  See application file for complete search history.

(56) References Cited

U.S. PATENT DOCUMENTS

| | | | |
|---|---|---|---|
| 2018/0091350 A1* | 3/2018 | Akkarakaran | H04L 5/0053 |
| 2018/0192416 A1* | 7/2018 | Yin | H04L 1/1607 |

(Continued)

FOREIGN PATENT DOCUMENTS

| | | |
|---|---|---|
| CN | 108604973 A | 9/2018 |
| WO | WO-2018044715 A1 | 3/2018 |

OTHER PUBLICATIONS

International Search Report and Written Opinion—PCT/US2021/031507—ISA/EPO—Jul. 16, 2021.

(Continued)

*Primary Examiner* — David B Lugo
(74) *Attorney, Agent, or Firm* — Norton Rose Fulbright US LLP

(57) ABSTRACT

This disclosure provides systems, methods, and apparatuses, including computer programs encoded on computer storage media, for wireless communication. In one aspect of the disclosure, a method of wireless communication includes receiving, at a user equipment (UE) from a network entity or a second UE, multiple demodulation reference signals (DMRSs) including a first set of DMRSs allocated to a first DMRS symbol and a first subset of subcarriers and a second set of DMRSs allocated to a second DMRS symbol and a second subset of subcarriers. The method also includes receiving, from the network entity or the second UE, a phase tracking reference signal (PTRS) associated with the multiple DMRSs. The method further includes performing channel estimation based on the multiple DMRSs and a phase tracking process based on the multiple DMRSs and the PTRS. Other aspects and features are also claimed and described.

20 Claims, 14 Drawing Sheets

(56) References Cited

U.S. PATENT DOCUMENTS

| | | | |
|---|---|---|---|
| 2018/0367277 A1* | 12/2018 | Zhang | H04W 72/04 |
| 2018/0368013 A1 | 12/2018 | Yoo et al. | |
| 2019/0149295 A1 | 5/2019 | Wang et al. | |
| 2019/0215118 A1 | 7/2019 | Moles Cases et al. | |
| 2019/0268904 A1 | 8/2019 | Miao et al. | |
| 2019/0273544 A1* | 9/2019 | Cha | H04B 7/06 |
| 2019/0296876 A1* | 9/2019 | Zhang | H04L 5/0048 |
| 2020/0007303 A1* | 1/2020 | Ren | H04L 5/0092 |
| 2020/0076647 A1* | 3/2020 | Zhang | H04L 25/0226 |
| 2020/0099490 A1* | 3/2020 | Sridharan | H04L 5/0082 |
| 2020/0228384 A1* | 7/2020 | Saito | H04L 27/2675 |
| 2020/0295979 A1* | 9/2020 | Saito | H04W 74/004 |
| 2021/0314931 A1* | 10/2021 | Farag | H04B 7/0617 |
| 2021/0321447 A1* | 10/2021 | Lee | H04W 72/044 |
| 2022/0022238 A1* | 1/2022 | Chen | H04W 72/1289 |

OTHER PUBLICATIONS

Mediatek Inc: "On Remaining Details of Downlink DMRS," 3GPP Draft, 3GPP TSG-RAN WG1 Meeting #90bis, R1-1718351, On Remaining Details of Downlink DMRS Final, 3rd Generation Partnership Project (3GPP), Mobile Competence Centre, 650, Route Des Lucioles, F-06921, Sophia-Antipolis Cedex, France, vol. RAN WG1, No. Prague, Czech Republic; Oct. 9, 2017-Oct. 13, 2017, Oct. 8, 2017 (Oct. 8, 2010), XP051341534, 7 pages, Retrieved from the Internet: URL: http://www.3gpp.org/ftp/Meetings_3GPP_SYNC/RAN1/Docs/ [retrieved on Oct. 8, 2017] section 3, table 2.

ZTE: "Evaluation Results on DL DMRS", 3GPP TSG RAN WG1 NR Ad-Hoc#2, R1-1710197, Qingdao, P.R. China Jun. 27-30, 2017, 13 Pages.

* cited by examiner

PHASE TRACKING REFERENCE SIGNAL (PTRS) ALLOCATION FOR MULTI-SYMBOL DEMODULATION REFERENCE SIGNALS (DMRS)

CROSS-REFERENCE TO RELATED APPLICATIONS

This application claims the benefit of U.S. Provisional Patent Application No. 63/024,262, entitled, "PHASE TRACKING REFERENCE SIGNAL (PTRS) ALLOCATION FOR MULTI-SYMBOL DEMODULATION REFERENCE SIGNALS (DMRS)," filed on May 13, 2020, which is expressly incorporated by reference herein in its entirety.

TECHNICAL FIELD

Aspects of the present disclosure relate generally to wireless communication systems, and more particularly, to allocating a phase tracking reference signal (PTRS).

BACKGROUND

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

In wireless communication systems, demodulation reference signals (DMRSs) may be used by a wireless device to enable coherent demodulation of a wireless channel. Using frequency division multiplexing (FDM), different DMRS ports can be used for transmission on the same orthogonal frequency division multiplexing (OFDM) symbol by using different subcarriers (e.g., tones) for different DMRS ports. Using code division multiplexing (CDM), different DMRS ports can be used for transmission of DMRSs on the same OFDM symbol (or across a set of OFDM symbols on the same subcarrier) by using different orthogonal cover codes (OCCs) for different DMRS ports (e.g., the DMRS ports that are used for transmission on the same subcarrier belong to the same CDM group). For wireless communication in a sub-6 gigahertz (GHz) frequency band, such as frequency range 1 (FR1), and in a millimeter wave band, such as FR2, such DMRS design may permit relatively accurate channel estimation and interpolation for subcarriers on which DMRSs are not received. For example, a UE that receives DMRS transmissions on port 0 in even subcarriers may be able to use DMRS measurements to estimate or interpolate a channel on odd subcarriers despite not receiving DMRS transmissions on the odd subcarriers.

However, for wireless communication in higher frequency bands (e.g., greater than 52.6 GHz, such as up to 71 GHz), a larger subcarrier spacing (e.g., 960 kilohertz (kHz), 1.92 megahertz (MHz), 3.84 MHz, as non-limiting examples) may be used as compared to lower frequency bands (such as FR1 and FR2, which may use a subcarrier spacing of 15 kHz, 30 kHz, 60 kHz, 120 kHz, 240 kHz, as non-limiting examples), with the same Fast Fourier transform (FFT) size as the lower frequency bands. The larger subcarrier spacing may mitigate the impact of phase noise in the higher frequency bands and may support a larger bandwidth, such as 2 GHz, with a reasonable FFT size. However, with a larger subcarrier spacing, the DMRS design described above may not permit accurate channel estimation and interpolation for subcarriers on which DMRSs are not received, because the spacing between subcarriers (e.g., a coherence bandwidth) is larger and thus more difficult to accurately estimate and interpolate across subcarriers. One technique to address this difficulty in larger subcarrier spacing is to allocate DMRSs of a first CDM group to a first OFDM symbol for a first set of subcarriers, and to allocate DMRSs of a second CDM group to a second OFDM symbol of a second set of subcarriers. However, this may cause the DMRSs to become unaligned with other reference signals, such as a phase tracking reference signal (PTRS), which can impact a phase noise correction process.

SUMMARY

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes receiving, at a user equipment (UE) from a network entity or a second UE, multiple demodulation reference signals (DMRSs) including a first set of DMRSs allocated to a first DMRS symbol and a first subset of subcarriers and a second set of DMRSs allocated to a second DMRS symbol and a second subset of subcarriers. The method also includes receiving, from the network entity or the second UE, a phase tracking reference signal (PTRS) associated with the multiple DMRSs (e.g., the DMRS symbols). The method further includes performing channel and phase noise estimation based on the multiple DMRSs and the PTRS.

In an additional aspect of the disclosure, an apparatus configured for wireless communication is disclosed. The apparatus includes at least one processor, and a memory coupled to the at least processor. The at least one processor is configured to, when executing instructions stored in the memory, cause the apparatus to receive, from a network entity or a second UE, multiple DMRSs including a first set of DMRSs allocated to a first DMRS symbol and a first subset of subcarriers and a second set of DMRSs allocated to a second DMRS symbol and a second subset of subcarriers. The at least one processor is also configured to, when executing the instructions stored in the memory, cause the apparatus to receive, from the network entity or the second UE, a PTRS associated with the multiple DMRSs (e.g., the DMRS symbols). The at least one processor is further configured to, when executing the instructions stored in the memory, cause the apparatus to perform channel and phase noise estimation based on the multiple DMRSs and the PTRS.

In an additional aspect of the disclosure, an apparatus configured for wireless communication is disclosed. The apparatus includes means for receiving, at a UE from a network entity or a second UE, multiple DMRSs including a first set of DMRSs allocated to a first DMRS symbol and a first subset of subcarriers and a second set of DMRSs allocated to a second DMRS symbol and a second subset of subcarriers. The apparatus also includes means for receiving, from the network entity or the second UE, a PTRS associated with the multiple DMRSs (e.g., the DMRS symbols). The apparatus further includes means for performing channel and phase noise estimation based on the multiple DMRSs and the PTRS.

In an additional aspect of the disclosure, a non-transitory computer-readable medium stores instructions that, when executed by a processor, cause the processor to perform operations including receiving, at a UE from a network entity or a second UE, multiple DMRSs including a first set of DMRSs allocated to a first DMRS symbol and a first subset of subcarriers and a second set of DMRSs allocated to a second DMRS symbol and a second subset of subcarriers. The operations also include receiving, from the network entity or the second UE, a PTRS associated with the multiple DMRSs (e.g., the DMRS symbols). The operations further include performing channel and phase noise estimation based on the multiple DMRSs and the PTRS.

In an additional aspect of the disclosure, a method of wireless communication includes transmitting, from a UE to a network entity, multiple DMRSs including a first set of DMRSs allocated to a first DMRS symbol and a first subset of subcarriers and a second set of DMRSs allocated to a second DMRS symbol and a second subset of subcarriers. The method also includes transmitting, to the network entity, a PTRS associated with the multiple DMRSs (e.g., the DMRS symbols). The method further includes receiving a channel estimation from the network entity, the channel estimation based on the multiple DMRSs and the PTRS.

In an additional aspect of the disclosure, an apparatus configured for wireless communication is disclosed. The apparatus includes at least one processor, and a memory coupled to the at least processor. The at least one processor is configured to, when executing instructions stored in the memory, cause the apparatus to initiate transmission, to a network entity, of multiple DMRSs including a first set of DMRSs allocated to a first DMRS symbol and a first subset of subcarriers and a second set of DMRSs allocated to a second DMRS symbol and a second subset of subcarriers. The at least one processor is also configured to, when executing the instructions stored in the memory, cause the apparatus to initiate transmission, to the network entity, of a PTRS associated with the multiple DMRSs (e.g., the DMRS symbols). The at least one processor is further configured to, when executing the instructions stored in the memory, cause the apparatus to receive a channel estimation from the network entity, the channel estimation based on the multiple DMRSs and the PTRS.

In an additional aspect of the disclosure, an apparatus configured for wireless communication is disclosed. The apparatus includes means for transmitting, from a UE to a network entity, multiple DMRSs including a first set of DMRSs allocated to a first DMRS symbol and a first subset of subcarriers and a second set of DMRSs allocated to a second DMRS symbol and a second subset of subcarriers. The apparatus also includes means for transmitting, to the network entity, a PTRS associated with the multiple DMRSs (e.g., the DMRS symbols). The apparatus further includes means for receiving a channel estimation from the network entity, the channel estimation based on the multiple DMRSs and the PTRS.

In an additional aspect of the disclosure, a non-transitory computer-readable medium stores instructions that, when executed by a processor, cause the processor to perform operations including initiating transmission, from a UE to a network entity, of multiple DMRSs including a first set of DMRSs allocated to a first DMRS symbol and a first subset of subcarriers and a second set of DMRSs allocated to a second DMRS symbol and a second subset of subcarriers. The operations also include initiating transmission, to the network entity, of a PTRS associated with the multiple DMRSs (e.g., the DMRS symbols). The operations further include receiving a channel estimation from the network entity, the channel estimation based on the multiple DMRSs and the PTRS.

In an additional aspect of the disclosure, a method of wireless communication includes transmitting, to a UE from a transmitting node, multiple DMRSs including a first set of DMRSs allocated to a first DMRS symbol and a first subset of subcarriers and a second set of DMRSs allocated to a second DMRS symbol and a second subset of subcarriers. The method also includes transmitting, to the UE, a PTRS associated with the multiple DMRSs (e.g., the DMRS symbols). The method further includes receiving a channel estimation from the UE, the channel estimation based on the multiple DMRSs and the PTRS.

In an additional aspect of the disclosure, an apparatus configured for wireless communication is disclosed. The apparatus includes at least one processor, and a memory coupled to the at least processor. The at least one processor is configured to, when executing instructions stored in the memory, cause the apparatus to initiate transmission, to a UE, of multiple DMRSs including a first set of DMRSs allocated to a first DMRS symbol and a first subset of subcarriers and a second set of DMRSs allocated to a second DMRS symbol and a second subset of subcarriers. The at least one processor is also configured to, when executing the instructions stored in the memory, cause the apparatus to initiate transmission, to the UE, of a PTRS associated with the multiple DMRSs (e.g., the DMRS symbols). The at least one processor is further configured to, when executing the instructions stored in the memory, cause the apparatus to receive a channel estimation from the UE, the channel estimation based on the multiple DMRSs and the PTRS.

In an additional aspect of the disclosure, an apparatus configured for wireless communication is disclosed. The apparatus includes means for transmitting, to a UE from a transmitting node, multiple DMRSs including a first set of DMRSs allocated to a first DMRS symbol and a first subset of subcarriers and a second set of DMRSs allocated to a second DMRS symbol and a second subset of subcarriers. The apparatus also includes means for transmitting, to the UE, a PTRS associated with the multiple DMRSs (e.g., the DMRS symbols). The apparatus further includes means for receiving a channel estimation from the UE, the channel estimation based on the multiple DMRSs and the PTRS.

In an additional aspect of the disclosure, a non-transitory computer-readable medium stores instructions that, when executed by a processor, cause the processor to perform operations including initiating transmission, to a UE from a transmitting node, of multiple DMRSs including a first set of DMRSs allocated to a first DMRS symbol and a first subset of subcarriers and a second set of DMRSs allocated to a second DMRS symbol and a second subset of subcarriers. The operations also include initiating transmission, to the UE, of a PTRS associated with the multiple DMRSs (e.g., the DMRS symbols). The operations further include receiving a channel estimation from the UE, the channel estimation based on the multiple DMRSs and the PTRS.

In an additional aspect of the disclosure, a method of wireless communication includes receiving, at a network entity from a UE, multiple DMRSs including a first set of DMRSs allocated to a first DMRS symbol and a first subset of subcarriers and a second set of DMRSs allocated to a second DMRS symbol and a second subset of subcarriers. The method also includes receiving, from the UE, a PTRS associated with the multiple DMRSs (e.g., the DMRS symbols). The method further includes performing channel estimation based on the multiple DMRSs and a phase tracking process based on the multiple DMRSs and the PTRS.

In an additional aspect of the disclosure, an apparatus configured for wireless communication is disclosed. The apparatus includes at least one processor, and a memory coupled to the at least processor. The at least one processor is configured to, when executing instructions stored in the memory, cause the apparatus to receive, from a UE, multiple DMRSs including a first set of DMRSs allocated to a first DMRS symbol and a first subset of subcarriers and a second set of DMRSs allocated to a second DMRS symbol and a second subset of subcarriers. The at least one processor is also configured to, when executing the instructions stored in the memory, cause the apparatus to receive, from the UE, a PTRS associated with the multiple DMRSs (e.g., the DMRS symbols). The at least one processor is further configured to, when executing the instructions stored in the memory, cause the apparatus to perform channel estimation based on the multiple DMRSs and a phase tracking process based on the multiple DMRSs and the PTRS.

In an additional aspect of the disclosure, an apparatus configured for wireless communication is disclosed. The apparatus includes means for receiving, at a network entity from a UE, multiple DMRSs including a first set of DMRSs allocated to a first DMRS symbol and a first subset of subcarriers and a second set of DMRSs allocated to a second DMRS symbol and a second subset of subcarriers. The apparatus also includes means for receiving, from the UE, a PTRS associated with the multiple DMRSs (e.g., the DMRS symbols). The apparatus further includes means for performing channel estimation based on the multiple DMRSs and a phase tracking process based on the multiple DMRSs and the PTRS.

In an additional aspect of the disclosure, a non-transitory computer-readable medium stores instructions that, when executed by a processor, cause the processor to perform operations including receiving, at a network entity from a UE, multiple DMRSs including a first set of DMRSs allocated to a first DMRS symbol and a first subset of subcarriers and a second set of DMRSs allocated to a second DMRS symbol and a second subset of subcarriers. The operations also include receiving, from the UE, a PTRS associated with the multiple DMRSs. The operations further include performing channel estimation based on the multiple DMRSs and the PTRS.

Other aspects, features, and embodiments will become apparent to those of ordinary skill in the art, upon reviewing the following description of specific, exemplary embodiments in conjunction with the accompanying figures. While features may be discussed relative to certain aspects and figures below, all embodiments can include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects the exemplary aspects can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
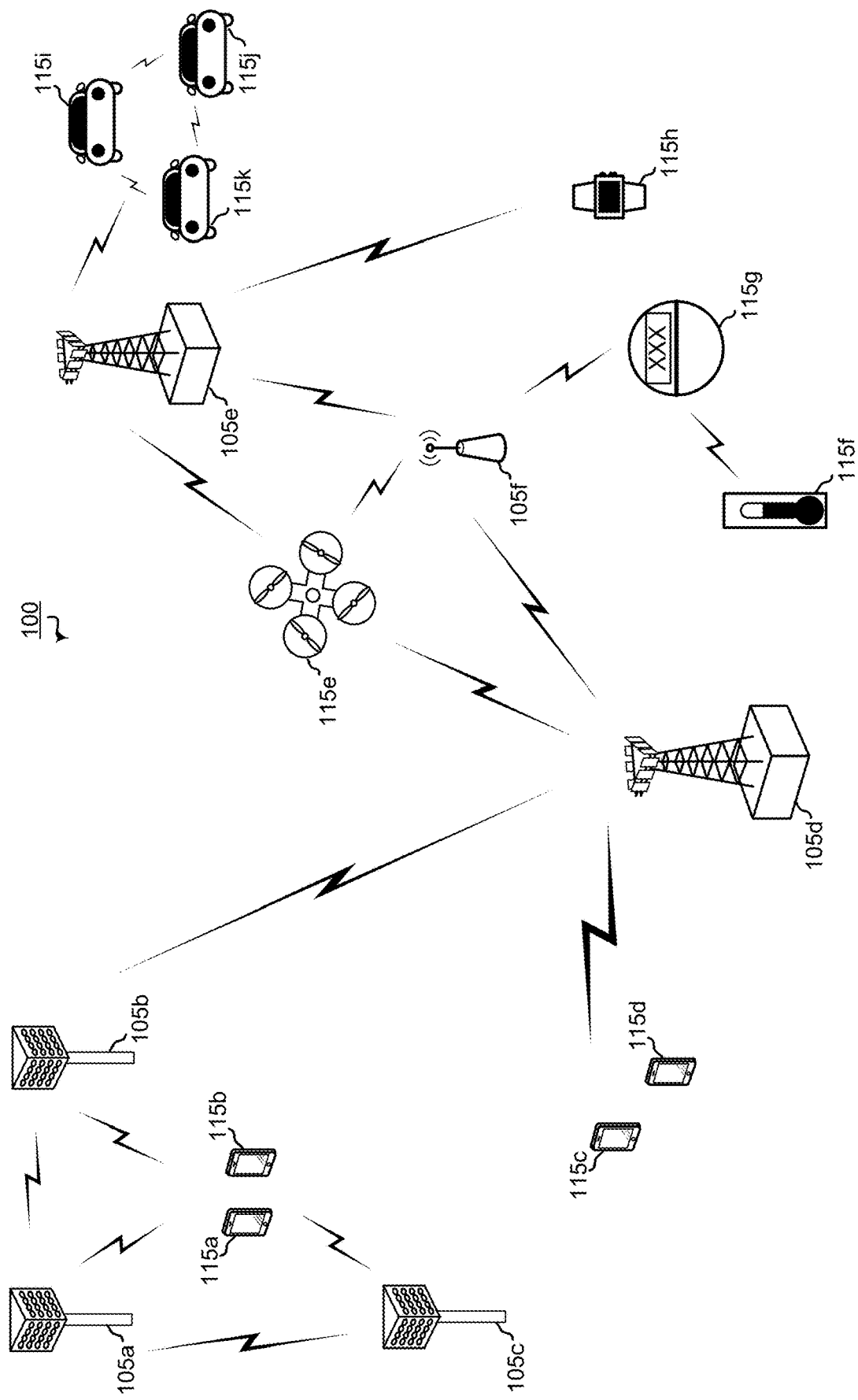
FIG. 1 is a block diagram illustrating details of a wireless communication system according to some aspects of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media for demodulation reference signal (DMRS) and phase tracking reference signal (PTRS) design (e.g., allocation) for larger subcarrier spacing, such as 960 kilohertz (kHz), 1.92 megahertz (MHz), or 3.84 MHz, as non-limiting examples, that are used in higher frequency bands, such as greater than 52.6 gigahertz (GHz), such as up to 71 GHz as a non-limiting example. The techniques described herein may enable allocation of different DMRSs to different orthogonal frequency division multiplexing (OFDM) symbols and to different sets of subcarriers (e.g., tones) as well as allocation of a PTRS to other OFDM symbols and at least some of the subcarriers such that the PTRS is aligned with at least one of the DMRSs. Aligning the PTRS with at least one of the DMRSs may enable a wireless device that receives the DMRSs and the PTRS to accurately estimate a channel or interpolate reference signals to other subcarriers in which the reference signals are not received, and to track phase changes, between symbols, in transmissions from the device that provides the DMRSs and the PTRS.

To illustrate, a user equipment (UE) may receive multiple DMRSs from a transmitting node (e.g., a base station or another UE). The UE may also receive a PTRS from the transmitting node. The transmitting node may allocate the DMRSs and the PTRS to various OFDM symbols and various subcarriers such that the PTRS is aligned with at least some of the DMRSs. In some implementations, the allocation of the PTRS is fixed to align with a first DMRS of the multiple DMRSs. This may provide backwards compatibility with a legacy PTRS design, such as aligning the PTRS to the DMRS port with the lowest index if different from the first symbol. In some other implementations, a first portion of the PTRS may be aligned to an OFDM symbol and a set of subcarriers associated with the first DMRS, and a second portion of the PTRS may be aligned to an OFDM symbol and a set of subcarriers associated with a second DMRS of the multiple DMRS. In some other implementations, the allocation of the PTRS may be fixed to align with the second DMRS.

The UE may perform a channel estimation and phase tracking (e.g., phase noise estimation) based on the DMRSs and the PTRS to estimate a wireless channel between the UE and the transmitting node. For example, if the transmitting node is a base station (or other network entity), the base station may transmit the DMRSs and the PTRS on the downlink (DL), and the UE may perform a channel estimation of a physical downlink shared channel (PDSCH) between the UE and the base station and track phase changes from one symbol to another symbol. In some other implementations, if the transmitting node is a second UE, the second UE may transmit the DMRS and the PTRS on the sidelink (SL), and the UE may perform a channel estimation of a physical sidelink shared channel (PSSCH) between the UE and the second UE and track phase changes from one symbol to another symbol. In some other implementations, the transmitting node is a base station (or other network entity), and the UE transmits the DMRSs and the PTRS. For example, the UE may transmit the DMRSs and the PTRS to the base station on the uplink (UL), and the base station may perform a channel estimate of a physical uplink shared channel (PUSCH) between the UE and the base station and track phase changes from one symbol to another symbol.

Particular implementations of the subject matter described in this disclosure can be implemented to realize one or more of the following potential advantages. In some aspects, the present disclosure provides techniques for DMRS and PTRS design (e.g., allocation) for larger subcarrier spacing, such as 960 kHz, 1.92 MHz, or 3.84 MHz, as non-limiting examples, that mitigate the impact of phase noise in higher frequency bands without reduction in accuracy of channel estimation and interpolation of reference signals to other subcarriers. To illustrate, by allocating multiple DMRSs including different DMRSs to different OFDM symbols and subcarriers, a receiving device may more accurately estimate a channel using one of the multiple DMRSs that corresponds to a selected subcarrier, instead of attempting to interpolate a DMRS for the subcarrier based on a single DMRS that may be allocated to a subcarrier having a significantly different frequency due to the larger subcarrier spacing. Supporting a larger subcarrier spacing may support a larger bandwidth, such as 2 GHz as a non-limiting example, with reasonable Fast Fourier Transform (FFT) size. Additionally, the techniques described herein may reduce an impact on a phase noise correction process at a wireless device that receives the DMRSs and the PTRS, as compared to other DMRS and PTRS designs for larger subcarrier spacing. For example, because the PTRS is aligned with at least some of the DMRSs, the wireless device may estimate and compensate for phase noise with less complexity and greater accuracy than if the PTRS is not aligned with at least some of the DMRSs.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. Additionally, an operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Indeed, one or more aspects of the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations and/or uses may come about via integrated chip implementations and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described implementations. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 is a block diagram illustrating details of an example wireless communication system. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component device/module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink and/or uplink, or desired transmission between base stations, and backhaul transmissions between base stations. UEs may operate as base stations or other network nodes in some scenarios. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
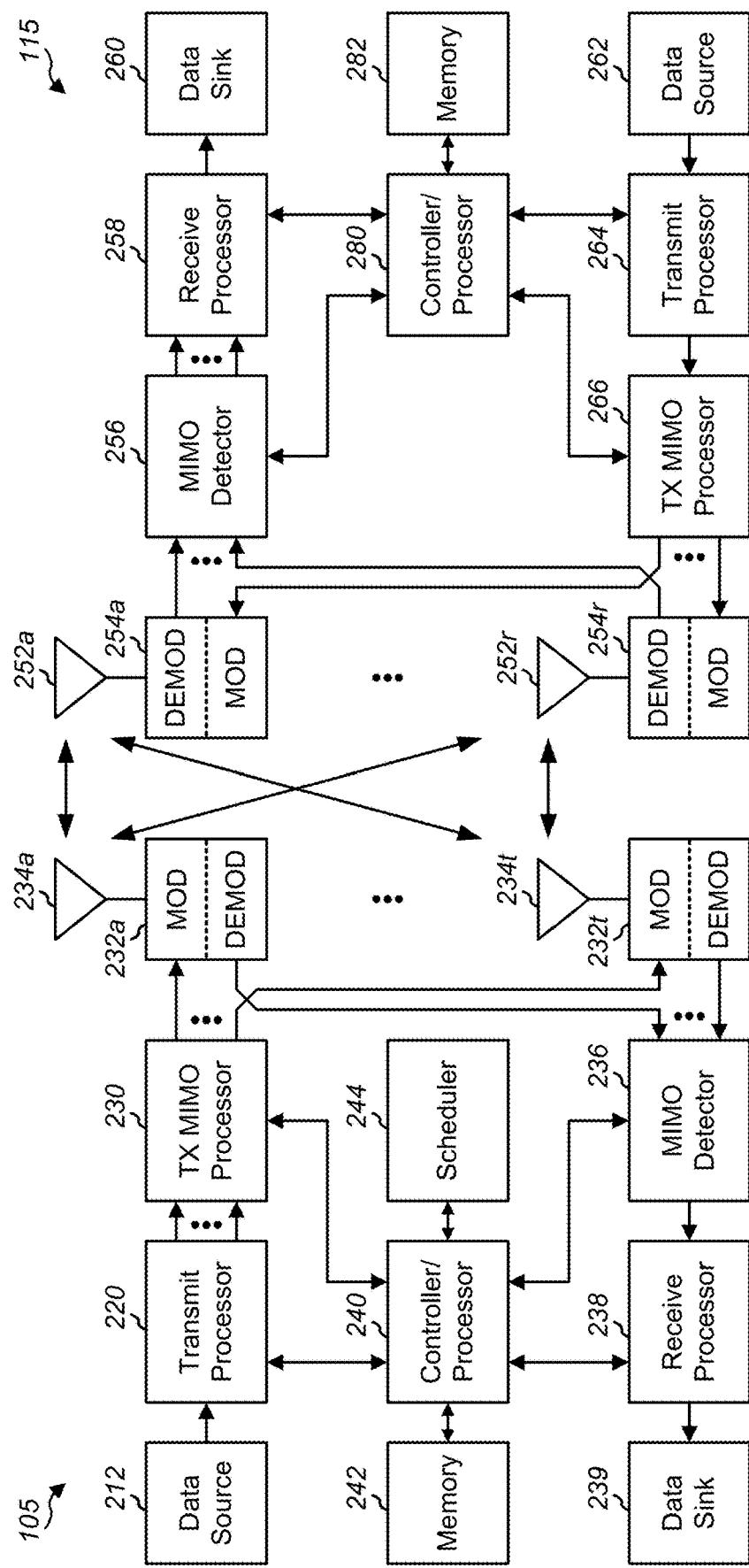
FIG. 2 is a block diagram illustrating a design of a base station and a UE configured according to some aspects.

FIG. 2 shows a block diagram conceptually illustrating an example design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, the antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the physical uplink shared channel (PUSCH)) from data source 262 and control information (e.g., for the physical uplink control channel (PUCCH)) from controller/processor 280. Additionally, transmit processor 264 may generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 280 and/or other processors and modules at UE 115 may perform or direct the execution of various processes for the techniques described herein, such as to perform or direct the execution illustrated in FIGS. 11, 12, 14, and 15, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Figure 3:
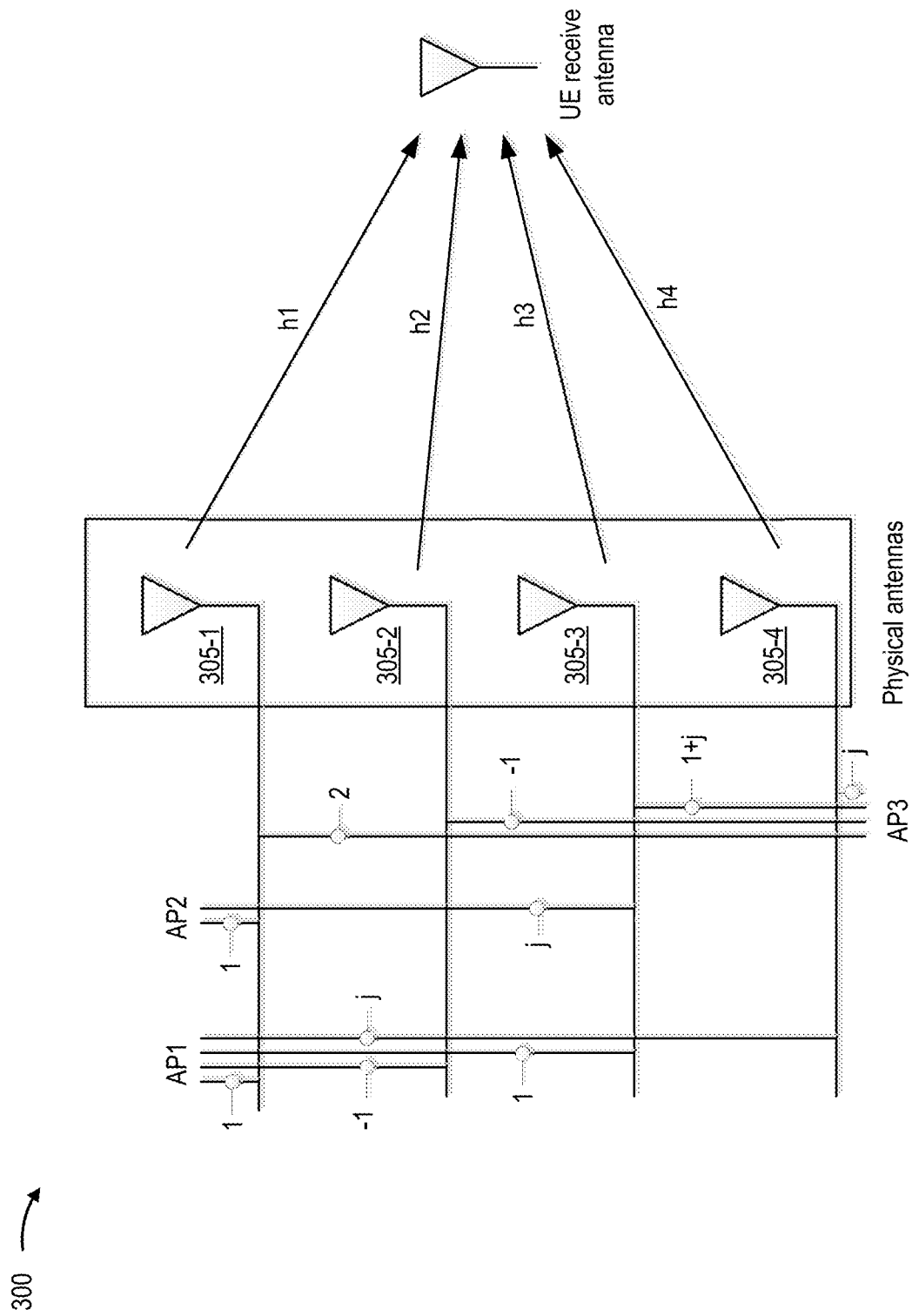
FIG. 3 is a diagram illustrating an example of antenna ports according to some aspects.

FIG. 3 is a diagram illustrating an example 300 of antenna ports in accordance some aspects. As shown in FIG. 3, a first physical antenna 305-1 may transmit information via a first channel h1, a second physical antenna 305-2 may transmit information via a second channel h2, a third physical antenna 305-3 may transmit information via a third channel h3, and a fourth physical antenna 305-4 may transmit information via a fourth channel h4. Such information may be conveyed via a logical antenna port, which may represent some combination of the physical antennas and/or channels. In some cases, a UE 115 may not have knowledge of the channels associated with the physical antennas, and may only operate based on knowledge of the channels associated with antenna ports, as defined below.

An antenna port may be defined such that a channel, over which a symbol on the antenna port is conveyed, can be inferred from a channel over which another symbol on the same antenna port is conveyed. In example 300, a channel associated with antenna port 1 (AP1) is represented as $h1-h2+h3+j*h4$, where channel coefficients (e.g., 1, −1, 1, and j, in this case) represent weighting factors (e.g., indicating phase and/or gain) applied to each channel. Such weighting factors may be applied to the channels to improve signal power and/or signal quality at one or more receivers. Applying such weighting factors to channel transmissions may be referred to as precoding, and a specific set of weighting factors applied to a set of channels may be referred to as a precoder.

Similarly, a channel associated with antenna port 2 (AP2) is represented as h1+j*h3, and a channel associated with antenna port 3 (AP3) is represented as 2*h1−h2+(1+j)*h3+ j*h4. In this case, antenna port 3 can be represented as the sum of antenna port 1 and antenna port 2 (e.g., AP3=AP1+ AP2) because the sum of the expression representing antenna port 1 (h1−h2+h3+j*h4) and the expression representing antenna port 2 (h1+j*h3) equals the expression representing antenna port 3 (2*h1−h2+(1+j)*h3+j*h4). It can also be said that antenna port 3 is related to antenna ports 1 and 2 [AP1,AP2] via the precoder [1,1] because 1 times the expression representing antenna port 1 plus 1 times the expression representing antenna port 2 equals the expression representing antenna port 3.

Figure 4:
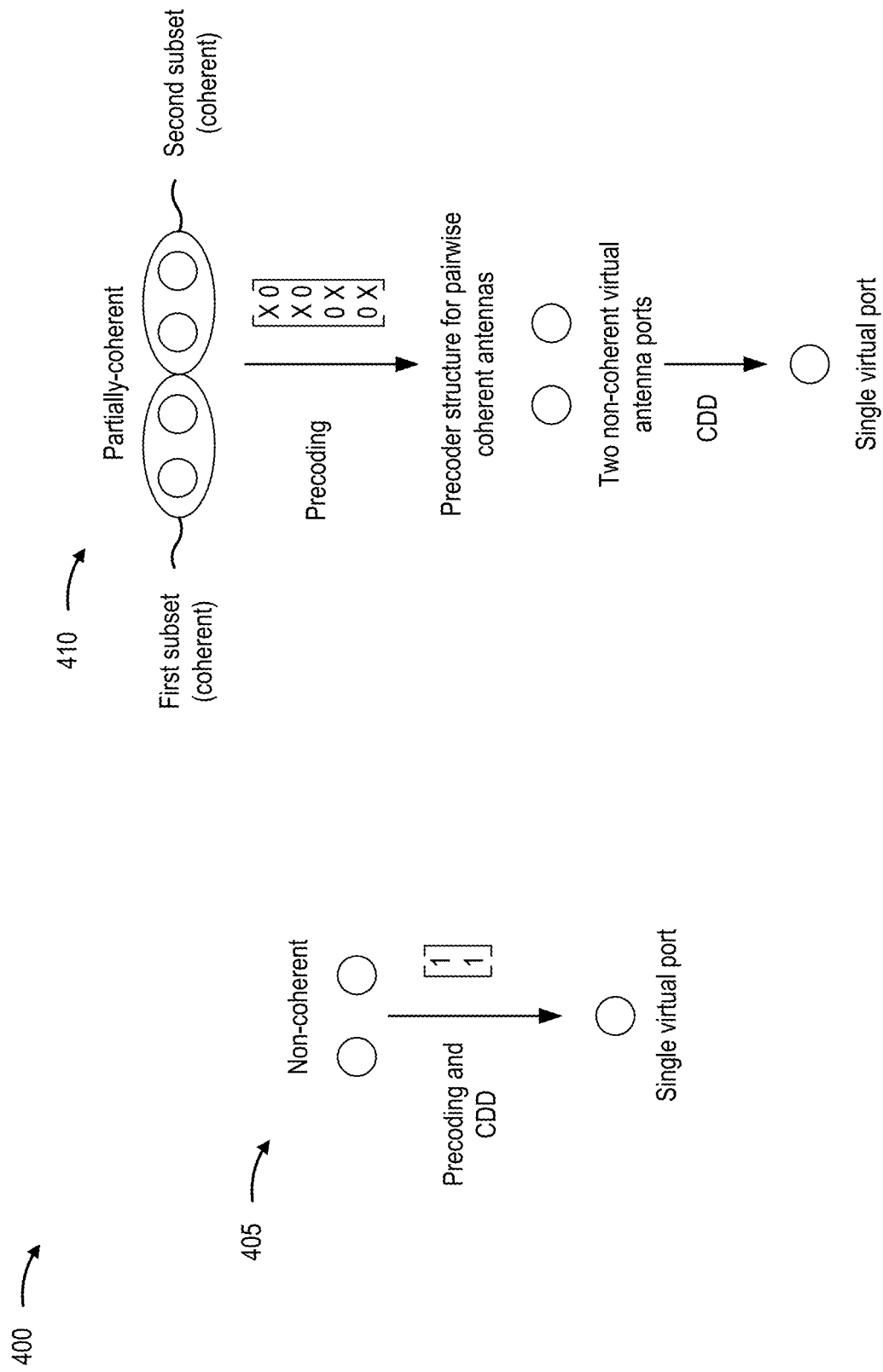
FIG. 4 is a diagram illustrating two examples of forming a virtual antenna port according to some aspects.

FIG. 4 is a diagram illustrating two examples 400 of forming a virtual antenna port in accordance with some aspects. The antennas of a multi-antenna UE (e.g., UE 115) may be classified into one of three groups depending on coherence of the antenna ports of the UE. A set of antenna ports (for example, two antenna ports) are coherent if the relative phase among the set of antenna ports (for example, between the two antenna ports) remains the same between the time of a sounding reference signal (SRS) transmission from those antenna ports and a subsequent physical uplink shared channel (PUSCH) transmission from those antenna ports. In this case, the SRS may be used (for example, by the UE or a base station) to determine an uplink precoder for precoding the PUSCH transmission, because the relative phase of the antenna ports will be the same for the SRS transmission and the PUSCH transmission. The precoding may span across the set of coherent antenna ports.

If a set of antenna ports is non-coherent, then such uplink precoder determination becomes difficult, because the relative phase between the antenna ports will change from the SRS transmission to the PUSCH transmission. For example, a set of antenna ports is considered non-coherent if the relative phase among the set of antenna ports is different for the SRS transmission than for the PUSCH transmission. In this case, the use of the same uplink precoder for a set of non-coherent antenna ports may result in the UE applying improper or inaccurate precoding weights (such as phase and gain weights) to the data streams transmitted from the non-coherent antenna ports. Furthermore, a set of antenna ports is considered partially-coherent if a first subset of the set of antenna ports is coherent with one another and a second subset of the set of antenna ports is coherent with one another, but the first subset of antenna ports and the second subset of antenna ports are not coherent with one another. In this case, common precoding may be used within each of the respective subsets of coherent antenna ports, but not across the different subsets of non-coherent antenna ports.

In some cases, when a base station schedules a PUSCH transmission for a multi-antenna UE having non-coherent or partially-coherent antenna ports, the signaling communication that schedules the PUSCH transmission may identify an uplink precoder that is to be used to precode the PUSCH transmission. Conventionally, because the antenna ports of the UE are non-coherent (or, in the case of partially coherent antenna ports, are non-coherent groups of coherent antenna ports), the UE may be capable of using the uplink precoder for only one of the antenna ports (or antenna port groups) while other antenna ports (or antenna port groups) are not used for the PUSCH transmission. Because only a subset of non-coherent or partially coherent antenna ports are used, this may result in decreased transmit power of the PUSCH transmission, decreased reliability of the PUSCH transmission (due to lack of transmit or spatial diversity), or a combination thereof.

To utilize some or all of the non-coherent or partially coherent antenna ports, the UE may apply various techniques to synthesize non-coherent or partially coherent antenna ports into a virtual antenna port so that common precoding may be used on the virtual antenna port and applied across the non-coherent antenna ports. A virtual (or logical) antenna port may represent a combination of two or more antenna ports. This allows a base station to select an uplink precoder for the virtual antenna port, and allows the UE to use the uplink precoder to transmit on the otherwise non-coherent or partially coherent antenna ports that have been combined to form the virtual antenna port.

For example, as shown by reference number 405, a set of non-coherent antenna ports (e.g., shown as two non-coherent antenna ports) can be combined into a single virtual port using precoding (e.g., uplink precoding) and cyclic delay diversity. The precoder may be determined by the UE 115 and/or signaled by a base station 105. Cyclic delay diversity (CDD) may refer to a technique where a delay (e.g., a cyclic delay) is introduced on one of the non-coherent antenna ports and not the other non-coherent antenna port. The delay may be measured in samples (e.g., 5 samples, 10 samples, and/or the like), fractions of samples, and/or the like. For example, a first non-coherent antenna port may transmit a first stream of samples, and the second non-coherent antenna port may transmit a second stream of samples (e.g., which may be the same stream) with a slight cyclic delay (e.g., a delay of 5 samples, 10 samples, and/or the like). For example, for a cyclic delay of 5 samples, where 16 samples are transmitted per symbol, the first non-coherent antenna port may transmit the 16 samples with a first sample transmitted first (e.g., [s1, s2, s3, s4, . . . , s16]), and the second non-coherent antenna port may transmit the 16 samples with the first sample transmitted sixth (e.g., with a delay of five samples) (e.g., [s12, s13, s14, s15, s16, s1, s2, s3, . . . , s11]).

Additionally, or alternatively, as shown by reference number 410, a set of partially-coherent antenna ports can be combined into a single virtual antenna port using precoding (e.g., uplink precoding) and cyclic delay diversity, in a similar manner as described above. As shown, a first subset of antenna ports may be coherent with one another, and a second subset of antenna ports may be coherent with one another, but the two subsets may not be coherent with one another. As further shown, precoding may be applied to the individual subsets to generate a first virtual antenna port and a second virtual antenna port that are not coherent with one another. Then, CDD may be applied to these two virtual antenna ports (e.g., by transmitting communications from the virtual antenna ports using CDD), thereby forming a single virtual antenna port from the partially-coherent antenna ports (e.g., using precoding and CDD).

The present disclosure provides systems, apparatus, methods, and computer-readable media for demodulation reference signal (DMRS) and phase tracking reference signal (PTRS) design (e.g., allocation) for larger subcarrier spacing, such as 960 kHz, 1.92 MHz, or 3.84 MHz, as non-limiting examples, that are used in higher frequency bands, such as greater than 52.6 GHz, such as up to 71 GHz. The techniques described herein may enable allocation of different DMRSs to different OFDM symbols and to different sets of subcarriers (e.g., tones) as well as allocation of a PTRS to other OFDM symbols and at least some of the subcarriers such that the PTRS is aligned with at least one of the DMRSs. Aligning the PTRS with at least one of the DMRSs may enable a wireless device that receives the DMRSs and the PTRS to accurately estimate a channel or interpolate reference signals to other subcarriers in which the reference signals are not received, and to track phase changes between the symbols.

To illustrate, a UE may receive multiple DMRSs from a transmitting node (e.g., a base station or another UE). The UE may also receive a PTRS from the transmitting node. The transmitting node may allocate the DMRSs and the PTRS to various OFDM symbols and various subcarriers such that the PTRS is aligned with at least some of the DMRSs. In some implementations, the allocation of the PTRS is fixed to align with a first DMRS of the multiple DMRSs. This may provide backwards compatibility with a legacy PTRS design, such as aligning the PTRS to the DMRS port with the lowest index if different from the first symbol. In some other implementations, a first portion of the PTRS may be aligned to an OFDM symbol and a set of subcarriers associated with the first DMRS, and a second portion of the PTRS may be aligned to an OFDM symbol and a set of subcarriers associated with a second DMRS of the multiple DMRS. In some other implementations, the allocation of the PTRS may be fixed to align with the second DMRS.

The UE may perform a channel estimation and phase tracking (e.g., phase noise estimation) based on the DMRSs and the PTRS to estimate a wireless channel between the UE and the transmitting node. For example, if the transmitting node is a base station (or other network entity), the base station may transmit the DMRSs and the PTRS on the downlink (DL), and the UE may perform a channel estimation of a physical downlink shared channel (PDSCH) between the UE and the base station and track phase changes from one symbol to another symbol. In some other implementations, if the transmitting node is a second UE, the second UE may transmit the DMRS and the PTRS on the sidelink (SL), and the UE may perform a channel estimation of a physical sidelink shared channel (PSSCH) between the UE and the second UE and track phase changes from one symbol to another symbol. In some other implementations, the transmitting node is a base station (or other network entity), and the UE transmits the DMRSs and the PTRS. For example, the UE may transmit the DMRSs and the PTRS to the base station on the uplink (UL), and the base station may perform a channel estimate of a physical uplink shared channel (PUSCH) between the UE and the base station and track phase changes from one symbol to another symbol.

Particular implementations of the subject matter described in this disclosure can be implemented to realize one or more of the following potential advantages. In some aspects, the present disclosure provides techniques for DMRS and PTRS design (e.g., allocation) for larger subcarrier spacing, such as 960 kHz, 1.92 MHz, or 3.84 MHz, as non-limiting examples, that mitigate the impact of phase noise in higher frequency bands without reduction in accuracy of channel estimation and interpolation of reference signals to other subcarriers. To illustrate, by allocating multiple DMRSs including different DMRSs to different OFDM symbols and subcarriers, a receiving device may more accurately estimate a channel using one of the multiple DMRSs that corresponds to a selected subcarrier, instead of attempting to interpolate a DMRS for the subcarrier based on a single DMRS that may be allocated to a subcarrier having a significantly different frequency due to the larger subcarrier spacing. Supporting a larger subcarrier spacing may support a larger bandwidth, such as 2 GHz as a non-limiting example, with reasonable Fast Fourier Transform (FFT) size. Additionally, the techniques described herein may reduce an impact on a phase noise correction process at a wireless device that receives the DMRSs and the PTRS, as compared to other DMRS and PTRS designs for larger subcarrier spacing. For example, because the PTRS is aligned with at least some of the DMRSs, the wireless device may estimate and compensate for phase noise with less complexity and greater accuracy than if the PTRS is not aligned with at least some of the DMRSs.

Figure 5:
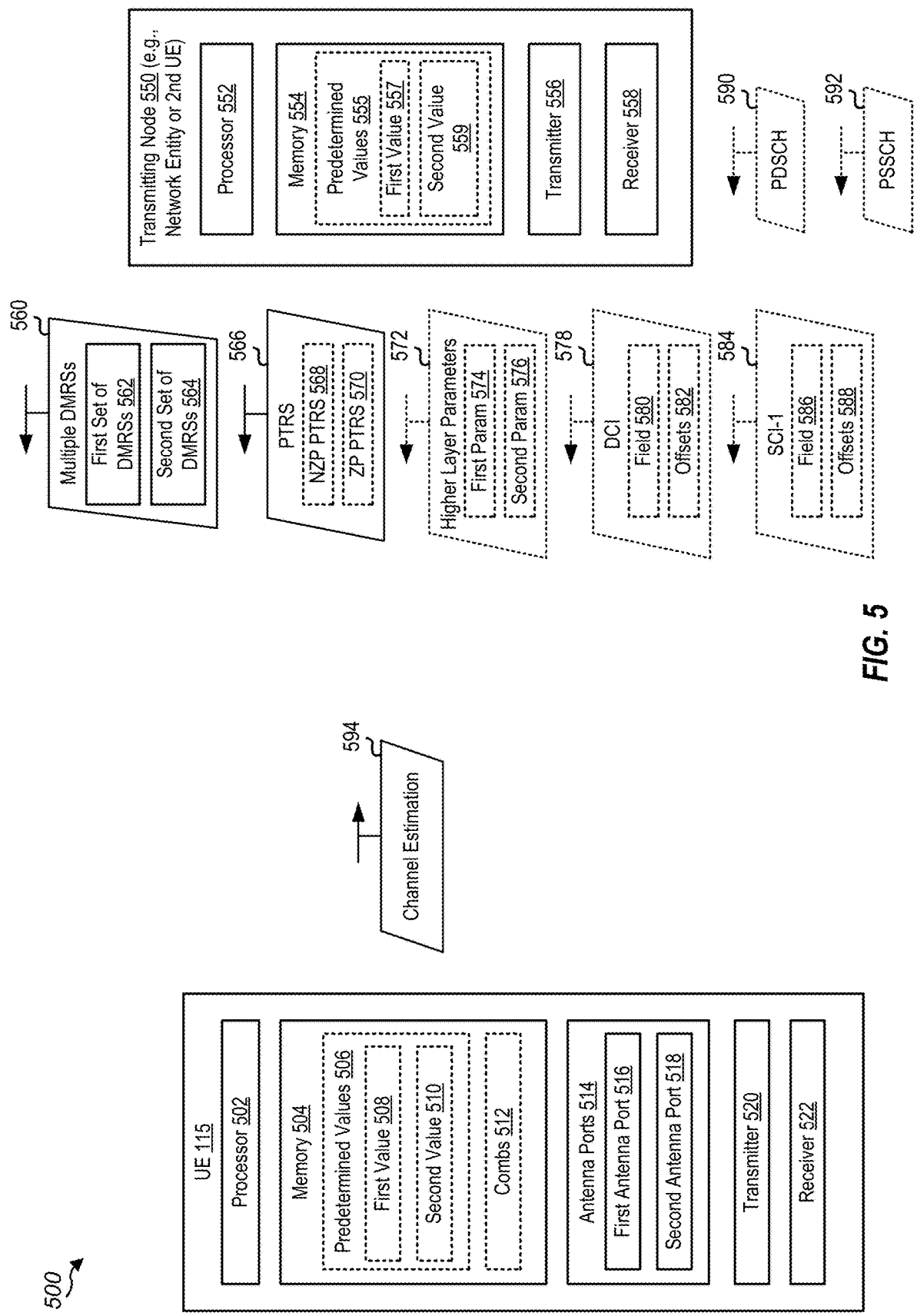
FIG. 5 is a block diagram illustrating an example wireless communication system configured for enabling communication of multiple demodulation reference signals (DMRSs) and a phase tracking reference signal (PTRS) aligned with at least one of the multiple DMRSs in the downlink (DL) or the sidelink (SL) according to some aspects.

FIG. 5 is a block diagram of an example wireless communications system 500 for enabling communication of multiple DMRSs and a PTRS aligned with at least one of the multiple DMRSs in the DL or the SL according to some aspects. In some implementations, wireless communications system 500 may implement aspects of wireless network 100. Wireless communications system 500 includes UE 115 and a transmitting node 550. In some implementations, transmitting node 550 may include or correspond to a network entity. The network entity may include or correspond to a base station, such as base station 105, a network, a network core, or another network device, as illustrative, non-limiting examples. In some other implementations, transmitting node 550 includes or corresponds to a second UE. Although one UE 115 and one transmitting node 550 are illustrated, in some other implementations, wireless communications system 500 may generally include multiple UEs 115, and may include more than one transmitting node 550.

UE 115 can include a variety of components (such as structural, hardware components) used for carrying out one or more functions described herein. For example, these components can include a processor 502, a memory 504, antenna ports 514 (e.g., multiple antenna ports), a transmitter 520, and a receiver 522. Processor 502 may be configured to execute instructions stored at memory 504 to perform the operations described herein. In some implementations, processor 502 includes or corresponds to controller/processor 280, and memory 504 includes or corresponds to memory 282.

In some implementations, memory 504 may be configured to store predetermined values 506, combs 512, or a combination thereof. Predetermined values 506 may include multiple predetermined values indicating offsets for PTRSs associated with configurations of DMRSs, one or more combs used to communicate the DMRSs, or a combination thereof. In some implementations, predetermined values 506 include at least a first predetermined value 508 and a second predetermined value 510. Combs 512 may be combs (or data representing combs) used to transmit or receive DMRSs by UE 115.

Antenna ports 514 include multiple antenna ports for transmitting signals from UE 115. Antenna ports 514 may be physical antenna ports, such as antenna ports AP1, AP2, and AP3 described with reference to FIG. 3. In some implementations, antenna ports 514 include at least a first antenna port 516 and a second antenna port 518.

Transmitter 520 is configured to transmit reference signals, control information, and data to one or more other devices, and receiver 522 is configured to receive reference signals, synchronization signals, control information, and data from one or more other devices. For example, transmitter 520 may transmit signaling, control information, and data, and receiver 522 may receive signaling, control information, and data, via a network, such as a wired network, a wireless network, or a combination thereof. For example, UE 115 may be configured to transmit or receive signaling, control information, and data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 520 and receiver 522 may be integrated in a transceiver. Additionally, or alternatively, transmitter 520, receiver 522, or both may include and correspond to one or more components of UE 115 described with reference to FIG. 2.

Transmitting node 550 can include a variety of components (such as structural, hardware components) used for carrying out one or more functions described herein. For example, these components can include a processor 552, a memory 554, a transmitter 556, and a receiver 558. Processor 552 may be configured to execute instructions stored at memory 554 to perform the operations described herein. In some implementations, processor 552 includes or corresponds to controller/processor 240, and memory 554 includes or corresponds to memory 242.

In some implementations, memory 554 may be configured to store predetermined values 555. Predetermined values 555 may include multiple predetermined values indicating offsets for PTRSs associated with configurations of DMRSs, one or more combs used to communicate the DMRSs, or a combination thereof. In some implementations, predetermined values 555 include at least a first predetermined value 557 and a second predetermined value 559.

Transmitter 556 is configured to transmit reference signals, synchronization signals, control information, and data to one or more other devices, and receiver 558 is configured to receive reference signals, control information, and data from one or more other devices. For example, transmitter 556 may transmit signaling, control information, and data, and receiver 558 may receive signaling, control information, and data, via a network, such as a wired network, a wireless network, or a combination thereof. For example, transmitting node 550 may be configured to transmit or receive data via a direct device-to-device connection, a LAN, a WAN, a modem-to-modem connection, the Internet, intranet, extranet, cable transmission system, cellular communication network, any combination of the above, or any other communications network now known or later developed within which permits two or more electronic devices to communicate. In some implementations, transmitter 556 and receiver 558 may be integrated in a transceiver. Additionally, or alternatively, transmitter 556, receiver 558 or both may include and correspond to one or more components of base station 105 described with reference to FIG. 2.

In some implementations, wireless communications system 500 implements a 5G New Radio (NR) network. For example, wireless communications system 500 may include multiple 5G-capable UEs 115 and multiple 5G-capable transmitting nodes 550, such as UEs and transmitting nodes configured to operate in accordance with a 5G NR network protocol such as that defined by the 3GPP.

During operation of the wireless communications system 500, transmitting node 550 may transmit multiple DMRSs 560 to UE 115. The DMRSs 560 may include a first set of DMRSs 562 allocated to a first DMRS symbol and a first subset of subcarriers, as well as a second set of DMRSs 564 allocated to a second DMRS symbol and a second subset of subcarriers. For example, transmitting node 550 may allocate one or more DMRSs to a first OFDM symbol (referred to as a first DMRS symbol due to the allocation of DMRSs to the OFDM symbol) across a first subset of subcarriers, and transmitting node 550 may allocate one or more other DMRSs to a second OFDM symbol (referred to as a second DMRS symbol) across a second subset of subcarriers. As a particular non-limiting example, transmitting node 550 may allocate first set of DMRSs 562 to OFDM symbol 3 and to odd subcarriers (e.g., subcarriers indexed by 1, 3, 5, etc.), and transmitting node 550 may allocate second set of DMRSs 564 to OFDM symbol 4 and to even subcarriers (e.g., subcarriers indexed by 2, 4, 6, etc.). In some implementations, the first DMRS symbol and the second DMRS symbol are consecutive symbols, such as OFDM symbol 3 and OFDM symbol 4, as a non-limiting example. In some other implementations, the first DMRS symbol and the second DMRS symbol are non-consecutive DMRS symbols, such as OFDM symbol 3 and OFDM symbol 7, as a non-limiting example. Additional details related to allocation of DMRSs to various OFDM symbols and subcarriers are described with reference to FIGS. 7-10. Although allocation to a first OFDM symbol and a second OFDM symbol are described, such description is not limiting. In some other implementations, first set of DMRSs 562 may be associated with (e.g., allocated to) a first group of OFDM symbols (e.g., a first group of DMRS symbols), second set of DMRSs 564 may be associated with (e.g., allocated to) a second group of OFDM symbols (e.g., a second group of DMRS symbols), or both.

First set of DMRSs 562 and second set of DMRSs 564 may each be transmitted using one or more DMRS ports. For example, transmitting node 550 may transmit first set of DMRSs 562 using a first DMRS port (or a first group of DMRS ports), and transmitting node 550 may transmit second set of DMRSs 564 using a second DMRS port (or a second group of DMRS ports) that is different from the first DMRS port. To illustrate, a staggered DMRS pattern may be formed by sending DMRSs over different symbols according to resource element (RE) allocations of different configuration ports, such that effectively one port is transmitted. For example, for rank 1, UE 115 is scheduled with one actual port. Allocation of DMRSs is further described with reference to FIGS. 7-10.

In some implementations, different DMRSs may be associated with different antenna ports of UE 115. For example, first set of DMRSs 562 may be associated with first antenna port 516, and second set of DMRSs 564 may be associated with second antenna port 518. In some such implementations, first antenna port 516 may be included in (or associated with) a first code-division multiplexing (CDM) group configured for UE 115, and second antenna port 518 may be included in (or associated with) a second CDM group configured for UE 115. To illustrate, transmitting node 550 may transmit a DMRS configuration to UE 115. The DMRS configuration may be included in a configuration message, such as a radio resource control (RRC) message. The DMRS configuration may indicate one or more CDM groups configured for UE 115, and corresponding DMRS ports included in each CDM group. For example, the DMRS configuration may indicate a first CDM group that includes at least DMRS port 0 (corresponding to first antenna port 516) and a second CDM group that includes at least DMRS port 2 (corresponding to second antenna port 518). Prior to transmission of DMRSs 560, transmitting node 550 may transmit an indication to UE 115 of one or more antenna ports, included in the one or more CDM groups, assigned to UE 115 for reception of DMRSs 560. For example, the indication may indicate that a first port (e.g., DMRS port 0, corresponding to first antenna port 516) included in the first CDM group is assigned to UE 115 for reception of first set of DMRSs 562 and that a second port (e.g., DMRS port 2, corresponding to second antenna port 518) in the second CDM group is assigned to UE 115 for reception of second set of DMRSs 564. These antenna ports (e.g., DMRS ports corresponding to first antenna port 516 and second antenna port 518) may be referred to as assigned DMRS ports or scheduled DMRS ports.

In some implementations, the indicated port for reception of DMRS transmissions may be assigned to UE 115 for one or more resource blocks (RBs). For example, the indicated DMRS port may be used for reception of DMRS transmissions in a set of RBs that are included in a resource allocation scheduled for UE 115 (e.g., for one or more PDSCH communications or one or more PSSCH communications). In some implementations, the DMRS port, the set of RBs, the resource allocation, or a combination thereof, may be included in downlink control information (DCI).

UE 115 may receive DMRSs 560 using antenna ports 514. For example, UE 115 may receive first set of DMRSs 562 using first antenna port 516 (e.g., an antenna port included in or corresponding to the first CDM group), and UE 115 may receive second set of DMRSs 564 using second antenna port 518 (e.g., an antenna port included in or corresponding to the second CDM group). In some implementations, UE 115 may combine first antenna port 516 and second antenna port 518 into a single virtual port for receiving DMRSs 560 (e.g., both first set of DMRSs 562 and second set of DMRSs 564). For example, UE 115 may combine first antenna port 516 and second antenna port 518 into a single virtual port, as described with reference to FIG. 4. In some such implementations, an indication of assigned DMRS ports from transmitting node 550 may also indicate that two or more assigned DMRS ports are to be combined into a corresponding virtual port. The indication may be included in a configuration message (e.g., an RRC message), in DCI, in activation DCI, or in a medium access control (MAC) control element (MAC-CE), as non-limiting examples. UE 115 may use the single virtual port to perform channel estimation, as further described herein.

In addition to transmitting DMRSs 560, transmitting node 550 may also transmit a PTRS 566 to UE 115. PTRS 566 may be associated with DMRSs 560. For example, transmitting node 550 may allocate PTRS 566 (or multiple PTRSs) to OFDM symbols (also referred to as PTRS symbols) and subcarriers such that PTRS 566 is aligned with at least one of DMRSs 560. Transmitting node 550 may transmit PTRS 566 using one or more PTRS ports, similar to the DMRS ports used to transmit DMRSs 560. For example, different PTRS ports may be allocated to different OFDM symbols, different subcarriers, or both. In some implementations, different PTRS ports may have different powers, such as zero power or non-zero power, as further described herein.

In some implementations, PTRS 566 is allocated to one or more symbols subsequent to the first DMRS symbol (to which first set of DMRSs 562 is allocated) and to one or more subcarriers of the first subset of subcarriers (to which first set of DMRSs 562 is allocated). For example, DMRSs 560 and PTRS 566 may be allocated according to a first configuration, as further described with reference to FIG. 7. In some other implementations, PTRS 566 is optionally allocated to a first set of symbols between the first DMRS symbol and the second DMRS symbol (to which second set of DMRSs 564 is allocated) and to one or more subcarriers of the first set of subcarriers and is allocated to a second set of symbols subsequent to the second DMRS symbol and to one or more subcarriers of the second subset of subcarriers (to which second set of DMRSs 564 is allocated). For example, DMRSs 560 and PTRS 566 may be allocated according to a second configuration, as further described with reference to FIG. 8. In some other implementations, PTRS 566 is allocated to one or more symbols subsequent to the second DMRS symbols and to one or more subcarriers of the second subset of subcarriers. For example, DMRSs 560 and PTRS 566 may be allocated according to a third configuration, as further described with reference to FIG. 9.

DMRSs 560 and PTRS 566 may be associated with, and enable determination of a channel estimation by UE 115 corresponding to, one or more types of channels between transmitting node 550 and UE 115. In some implementations, transmitting node 550 is a network entity, and DMRSs 560 and PTRS 566 are associated with a PDSCH 590 between UE 115 and the network entity (e.g., transmitting node 550). In such implementations, DMRSs 560 and PTRS 566 may be allocated according to the first configuration, the second configuration, or the third configuration. In some other implementations, transmitting node 550 is a second UE, and DMRSs 560 and PTRS 566 are associated with a PSSCH 592 between UE 115 and the second UE (e.g., transmitting node 550). In such implementations, DMRSs 560 and PTRS 566 may be allocated according to the first configuration or the second configuration, but not the third configuration.

In some implementations in which DMRSs 560 and PTRS 566 are allocated according to the second configuration, transmitting node 550 may signal offsets associated with allocation of PTRS 566 to UE 115. For example, transmitting node 550 may transmit higher layer parameters 572 to UE 115. Higher layer parameters 572 may be included in a message, such as an RRC message, a MAC-CE, or some other signal or message. In some implementations, higher layer parameters 572 are defined as a "resourceElementoffset" parameter. Higher layer parameters 572 may include a first higher layer parameter 574 associated with first set of DMRSs 562 and a second higher layer parameter 576 associated with second set of DMRSs 564. First higher layer parameter 574 may indicate a first offset of a first set of symbols (to which PTRS 566 is allocated), and second higher layer parameter 576 may indicate a second offset of a second set of symbols (to which PTRS 566 is also allocated). The first offset and the second offset may indicate an offset (in symbols) from an initial OFDM symbol of an RB assigned to UE 115, or the first offset may indicate an offset from the first DMRS symbol (to which first set of DMRSs 562 is allocated) and the second offset may indicate an offset from the second DMRS symbol (to which second set of DMRSs 564 is allocated), as non-limiting examples.

In some other implementations in which DMRSs 560 and PTRS 566 are allocated according to the second configuration, offsets associated with allocation of PTRS 566 may be determined based on predetermined values 506 stored at UE 115 (e.g., at memory 504) or predetermined values 555 stored at transmitting node 550 (e.g., at memory 554). To illustrate, predetermined values 506 and predetermined values 555 may indicate a plurality of offsets corresponding to configurations of DMRSs (and PTRSs), combs used to communicate DMRSs (and PTRSs), or a combination thereof. UE 115 and transmitting node 550 may determine offsets associated with allocation of PTRS 566 by accessing predetermined values 506 or predetermined values 555, respectively, and matching a configuration of DMRSs 560 and PTRS 566, combs used to communicate DMRSs 560 and PTRS 566 (e.g., combs 512), or both, to a configuration, combs, or both associated with one or more of predetermined values 506 or predetermined values 555. Predetermined values 506 may include first predetermined value 508 indicating a first offset of the first set of symbols to which PTRS 566 is allocated and second predetermined value 510 indicating a second offset of the second set of symbols to which PTRS 566 is allocated. Similarly, predetermined values 555 may include first predetermined value 557 indicating the first offset of the first set of symbols and second predetermined value 559 indicating the second offset of the second set of symbols. The first offset and the second offset may indicate an offset (in symbols) from an initial OFDM symbol of an RB assigned to UE 115, or the first offset may indicate an offset from the first DMRS symbol and the second offset may indicate an offset from the second DMRS symbol, as non-limiting examples.

In some implementations, PTRS 566 includes multiple PTRSs having different powers. For example, PTRS 566 may include a non-zero power (NZP) PTRS 568 and a zero power (ZP) PTRS 570. Transmitting node 550 may transmit NZP PTRS 568 using one or more NZP PTRS ports that are allocated a first set of symbols, a first one or more subcarriers, or a combination thereof, and transmitting node 550 may transmit ZP PTRS 570 using one or more ZP PTRS ports that are allocated to a second set of symbols, a second one or more subcarriers, or a combination thereof. Transmitting ZP PTRS 570 via one or more ZP PTRS ports may include adjusting parameters of one or more components of a transmission path at transmitting node 550, such as a power amplifier, as a non-limiting example. Transmitting ZP PTRS 570 may reserve some resource elements (REs) of a RB for transmission of NZP PTRSs to other UEs, or for other UEs to transmit NZP PTRSs to UE 115 (e.g., via the SL), which reduces interference from PTRS 566 to the other PTRSs transmitted by transmitting node 550 or the other UEs. As one example, in implementations configured for multi-user multiple-input, multiple-output (MU-MIMO), transmitting node 550 (e.g., a network entity) may use ZP PTRS ports to cause UEs to vacate some REs of a RB in order to reduce interference with NZP PTRSs transmitted to other UEs. Because different UEs may have different DMRS configurations, different patterns for ZP and NZP PTRSs may be used. As another example, in industrial internet of things (IIOT) systems, transmitting node 550 (e.g., a programmable logic controller (PLC)) may schedule multiple other UEs (e.g., sensors and actuators, as non-limiting examples). Using both NZP PTRS ports and ZP PTRS ports may be beneficial to enhance the performance of the PLC and the UEs.

In some implementations in which DMRSs 560 and PTRS 566 are allocated according to the first configuration described with reference to FIG. 7 (e.g., PTRS 566 is allocated to one or more symbols subsequent to the first DMRS symbol and one or more subcarriers of the first subset of subcarriers to which first set of DMRSs 562 is allocated), NZP PTRS 568 may be allocated to a first subset of the one or more symbols and ZP PTRS 570 may be allocated to a second subset of the one or more symbols. Such implementations include MU-MIMO implementations in which transmitting node 550 is a network entity and DMRSs 560 and PTRS 566 are associated with PDSCH 590. In some such implementations, the first subset of the one or more symbols and the second subset of the one or more symbols may be fixed across the one or more of the first subset of subcarriers, as further described with reference to FIG. 10.

In some other implementations in which DMRSs 560 and PTRS 566 are allocated according to the first configuration, NZP PTRS 568 may be allocated to a first subset of the one or more symbols and ZP PTRS 570 may be allocated to a second subset of the one or more symbols. Such implementations include SL implementations in which transmitting node 550 is a second UE and DMRSs 560 and PTRS 566 are associated with PSSCH 592. In some such implementations, the first subset of the one or more symbols and the second subset of the one or more symbols may be fixed across the one or more of the first subset of subcarriers, as further described with reference to FIG. 10.

In some implementations in which DMRSs 560 and PTRS 566 are allocated according to the second configuration described with reference to FIG. 8 (e.g., PTRS 566 is optionally allocated to a first set of symbols between the first DMRS symbol and the second DMRS symbol and to one or more subcarriers of the first subset of subcarriers to which first set of DMRSs 562 is allocated and is allocated to a second set of symbols subsequent to the second DMRS symbol and to one or more subcarriers of the second subset of subcarriers), NZP PTRS 568 may be allocated to a first subset of the first set of symbols and a first subset of the second set of symbols, and ZP PTRS 570 may be allocated to a second subset of the first set of symbols and a second subset of the second set of symbols. The first subset of the first set of symbols and the second subset of the first set of symbols may be associated with one or more of the first subset of subcarriers, and the first subset of the second set of symbols and the second subset of the second set of symbols are associated with the second subset of subcarriers. For example, NZP PTRS 568 and ZP PTRS 570 may each be allocated to subcarriers of the first subset of subcarriers and the second subset of subcarriers.

In some such implementations (e.g., MU-MIMO implementations in which transmitting node 550 is a network entity and DMRSs 560 and PTRS 566 are associated with PDSCH 590), transmitting node 550 may transmit DCI 578 to UE 115. DCI 578 may include a field 580 that indicates that ZP PTRS 570 is associated with (e.g., is allocated to) multiple subsets of subcarriers (e.g., at least the first subset of subcarriers and the second subset of subcarriers). In some implementations, field 580 is a single bit having either a first value that indicates that ZP PTRS 570 is not associated with (e.g., is not allocated to) multiple subsets of subcarriers or a second value that indicates that ZP PTRS 570 is associated with (e.g., is allocated to) multiple subsets of subcarriers. Additionally or alternatively, DCI 578 may include offsets 582. For example, one or more fields or bits of DCI 578 may indicate offsets 582. Offsets 582 may include an offset of the second subset of the first set of symbols, an offset of the second subset of the second set of symbols, or both (e.g., offset(s) of symbols allocated to ZP PTRS 570), for example with reference to an initial symbol of an RB. Alternatively, an offset of the second subset of the first set of symbols, an offset of the second subset of the second symbols, or both (e.g., offset(s) of symbols allocated to ZP PTRS 570), may be indicated by first predetermined value 508 and first predetermined value 557, or second predetermined value 510 and second predetermined value 559, respectively, as described above.

In some other such implementations (e.g., SL implementations in which transmitting node 550 is a second UE and DMRSs 560 and PTRS 566 are associated with PSSCH 592), transmitting node 550 may transmit sidelink control information 1 (SCI-1) 584 to UE 115. SCI-1 584 may include a field 586 that indicates that ZP PTRS 570 is associated with (e.g., is allocated to) multiple subsets of subcarriers (e.g., at least the first subset of subcarriers and the second subset of subcarriers). In some implementations, field 586 is a single bit having either a first value that indicates that ZP PTRS 570 is not associated with (e.g., is not allocated to) multiple subsets of subcarriers or a second value that indicates that ZP PTRS 570 is associated with (e.g., is allocated to) multiple subsets of subcarriers. Additionally or alternatively, SCI-1 584 may include offsets 588. For example, one or more fields or bits of SCI-1 584 may indicate offsets 588. Offsets 588 may include an offset of the second subset of the first set of symbols, an offset of the second subset of the second set of symbols, or both (e.g., offset(s) of symbols allocated to ZP PTRS 570), for example with reference to an initial symbol of an RB.

Alternatively to receiving SCI-1 584 from transmitting node 550, UE 115 may receive DCI from a base station that schedules SL transmissions between UE 115 and transmitting node 550 (e.g., the second UE) via PSSCH 592. The DCI may be similar to DCI 578 described above. For example, the DCI may include a field (which in some implementations includes a single bit) that indicates whether ZP PTRS 570 is associated with (e.g., allocated to) multiple subsets of subcarriers, and/or offset(s) of ZP PTRS 570. Alternatively to receiving either SCI-1 584 or DCI from a base station, an offset of the second subset of the first set of symbols, an offset of the second subset of the second symbols, or both (e.g., offset(s) of symbols allocated to ZP PTRS 570), may be indicated by first predetermined value 508 and first predetermined value 557, or second predetermined value 510 and second predetermined value 559, respectively, as described above.

In some implementations in which DMRSs 560 and PTRS 566 are allocated according to the third configuration described with reference to FIG. 9 (e.g., PTRS 566 is allocated to one or more symbols subsequent to the second DMRS symbol and to one or more subcarriers of the second subset of subcarriers to which second set of DMRSs 564 is allocated), NZP PTRS 568 may be allocated to a first subset of the one or more symbols and ZP PTRS 570 may be allocated to a second subset of the one or more symbols. Such implementations include MU-MIMO implementations in which transmitting node 550 is a network entity and DMRSs 560 and PTRS 566 are associated with PDSCH 590. In some such implementations, the first subset of the one or more symbols and the second subset of the one or more symbols may be fixed across the one or more of the first subset of subcarriers, similar to as described with reference to FIG. 10. Implementations in which DMRSs 560 and PTRS 566 are allocated according to the third configuration may not support SL implementations.

After receiving DMRSs 560 and PTRS 566 from transmitting node 550, UE 115 may perform channel estimation based on DMRSs 560 an PTRS 566. In some implementations, UE 115 may receive first set of DMRSs 562 using first antenna port 516 (e.g., an antenna port included in or associated with the first CDM group) and may receive second set of DMRSs 564 using second antenna port 518 (e.g., an antenna port included in or associated with the second CDM group), and UE 115 may perform channel estimation using a first orthogonal cover code (OCC) for first set of DMRSs 562 and a second OCC for second set of DMRSs 564 (sometimes referred to as de-CDMing). For example, UE 115 may multiple a received DMRS sequence on first antenna port 516 by the first OCC to obtain a first intended DMRS sequence, and UE 115 may multiple a received DMRS sequence on second antenna port 518 by the second OCC to obtain a second intended DMRS sequence. UE 115 may then perform DMRS processing on the first and second intended DMRS sequences. Additionally, or alternatively, UE 115 may perform channel estimation on PTRS 566, including PTRS 566 receiving, decoding, and processing. In some implementations, UE 115 may combine first antenna port 516 and second antenna port 518 into a single virtual port, as described with reference to FIG. 4, and UE 115 may use the single virtual port to receive DMRSs 560 and PTRS 566 and perform the channel estimation. In some implementations in which DMRSs 560 and PTRS 566 are allocated in accordance with either the first configuration described with reference to FIG. 7 or the third configuration described with reference to FIG. 9, performing the channel estimation includes interpolating a phase between REs of first set of DMRSs 562 and second set of DMRSs 564. Additionally or alternatively, UE 115 may estimate phase noise and track phase changes from symbol to another symbol (e.g., from the first DMRS symbol to the second DMRS symbol or from a PTRS symbol to a second PTRS symbol) and to adjust one or more oscillators of UE 115 accordingly, such as to reduce a common phase error (CPE) or otherwise compensate for phase noise.

Performing the channel estimation may cause UE 115 to generate channel estimation 594. In some implementations, channel estimation 594 represents an estimation of PDSCH 590. In some other implementations, channel estimation 594 represents an estimation of PSSCH 592. UE 115 may use channel estimation 594 when preparing signals to be transmitted to transmitting node 550. Additionally or alternatively, UE 115 may transmit channel estimation 594 to transmitting node 550. Transmitting node 550 may use channel estimation 594 when preparing signals to be transmitted to UE 115.

As described with reference to FIG. 5, the present disclosure provides techniques for allocating DMRSs and PTRSs transmitted on the DL or the SL for wireless communications systems configured to support larger subcarrier spacing, such as 960 kHz, 1.92 MHz, or 3.84 MHz, as non-limiting examples, that mitigate the impact of phase noise in higher frequency bands without reduction in accuracy of channel estimation and interpolation of reference signals to other subcarriers. To illustrate, by allocating DMRSs 560 including the first set of DMRSs 562 and the second set of DMRSs 564 to different OFDM symbols and subcarriers, the UE 115 may more accurately estimate a channel using one of the multiple DMRSs 560 that corresponds to a selected subcarrier, instead of attempting to interpolate a DMRS for the subcarrier based on a single DMRS that may be allocated to a subcarrier having a significantly different frequency due to the larger subcarrier spacing. Supporting a larger subcarrier spacing may support a larger bandwidth, such as 2 GHz as a non-limiting example, with reasonable FFT size. Additionally, the techniques described with reference to FIG. 5 may reduce an impact on a phase noise correction process at the UE 115 that receives the DMRSs 560 and the PTRS 566, as compared to other DMRS and PTRS designs for larger subcarrier spacing. For example, because the PTRS 566 is aligned with at least some of the DMRSs 560 (or offset from based on predefined offsets), the UE 115 may estimate and compensate for phase noise with less complexity and greater accuracy than if the PTRS 566 is not aligned with at least some of the DMRSs 560.

Figure 6:
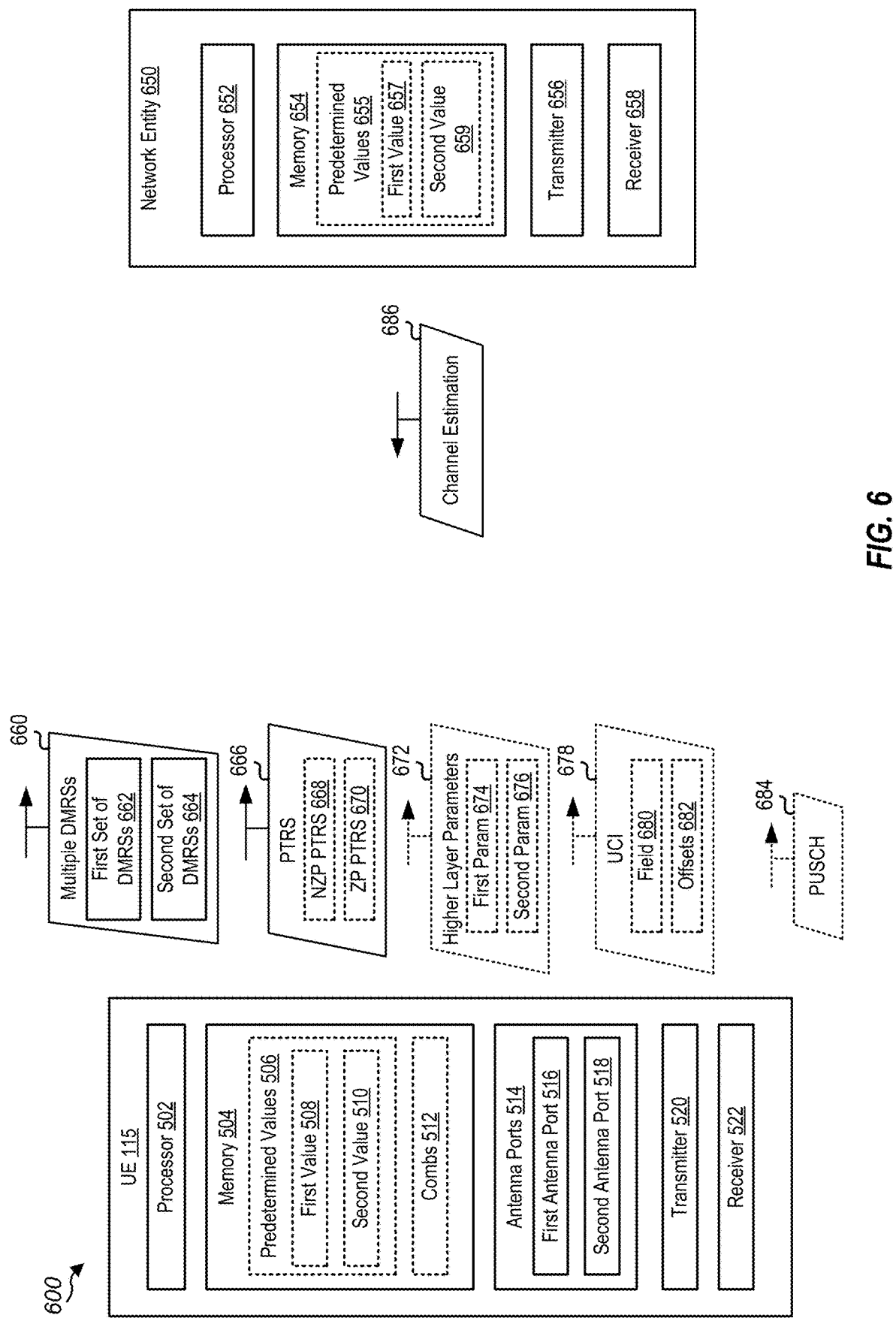
FIG. 6 is a block diagram illustrating an example wireless communication system configured for enabling communication of multiple DMRSs and a PTRS aligned with at least one of the multiple DMRSs in the uplink (UL) according to some aspects.

FIG. 6 is a block diagram of an example wireless communications system 600 for enabling communication of multiple DMRSs and a PTRS aligned with at least one of the multiple DMRSs in the UL according to some aspects. Wireless communications system 600 includes UE 115 and a network entity 650. In some implementations, network entity 650 may include or correspond to a base station, such as base station 105, a network, a network core, or another network device, as illustrative, non-limiting examples. Although one UE 115 and one network entity 650 are illustrated, in some other implementations, wireless communications system 600 may generally include multiple UEs 115, and may include more than one network entity 650.

UE 115 includes processor 502, memory 504, antenna ports 514, transmitter 520, and receiver 522, as described with reference to FIG. 5. Network entity 650 can include a variety of components (such as structural, hardware components) used for carrying out one or more functions described herein. For example, these components can include a processor 652, a memory 654, a transmitter 656, and a receiver 658. Processor 652 may be configured to execute instructions stored at memory 654 to perform the operations described herein. In some implementations, processor 652 includes or corresponds to controller/processor 240, and memory 654 includes or corresponds to memory 242.

In some implementations, memory 654 may be configured to store predetermined values 655. Predetermined values 655 may include multiple predetermined values indicating offsets for PTRSs associated with configurations of DMRSs, one or more combs used to communicate the DMRSs, or a combination thereof. In some implementations, predetermined values 655 include at least a first predetermined value 657 and a second predetermined value 659.

Transmitter 656 is configured to transmit reference signals, synchronization signals, control information, and data to one or more other devices, and receiver 658 is configured to receive reference signals, control information, and data from one or more other devices. For example, transmitter 656 may transmit signaling, control information, and data, and receiver 658 may receive signaling, control information, and data, via a network, such as a wired network, a wireless network, or a combination thereof. For example, network entity 650 may be configured to transmit or receive data via a direct device-to-device connection, a LAN, a WAN, a modem-to-modem connection, the Internet, intranet, extranet, cable transmission system, cellular communication network, any combination of the above, or any other communications network now known or later developed within which permits two or more electronic devices to communicate. In some implementations, transmitter 656 and receiver 658 may be integrated in a transceiver. Additionally, or alternatively, transmitter 656, receiver 658 or both may include and correspond to one or more components of base station 105 described with reference to FIG. 2.

In some implementations, wireless communications system 600 implements a 5G NR network. For example, wireless communications system 600 may include multiple 5G-capable UEs 115 and multiple 5G-capable network entities 650, such as UEs and network entities configured to operate in accordance with a 5G NR network protocol such as that defined by the 3GPP.

During operation of wireless communications system 600, UE 115 may transmit multiple DMRSs 660 to network entity 650. The DMRSs 660 may include a first set of DMRSs 662 allocated to a first DMRS symbol and a first subset of subcarriers, as well as a second set of DMRSs 664 allocated to a second DMRS symbol and a second subset of subcarriers. For example, UE 115 may allocate one or more DMRSs to a first OFDM symbol (e.g., a first DMRS symbol) across a first subset of subcarriers, and UE 115 may allocate one or more other DMRSs to a second OFDM symbol (e.g., a second DMRS symbol) across a second subset of subcarriers. As a particular non-limiting example, UE 115 may allocate first set of DMRSs 662 to OFDM symbol 3 and to odd subcarriers (e.g., subcarriers indexed by 1, 3, 5, etc.), and network entity 650 may allocate second set of DMRSs 664 to OFDM symbol 4 and to even subcarriers (e.g., subcarriers indexed by 2, 4, 6, etc.). In some implementations, the first DMRS symbol and the second DMRS symbol are consecutive symbols, such as OFDM symbol 3 and OFDM symbol 4, as a non-limiting example. In some other implementations, the first DMRS symbol and the second DMRS symbol are non-consecutive DMRS symbols, such as OFDM symbol 3 and OFDM symbol 7, as a non-limiting example. Additional details related to allocation of DMRSs to various OFDM symbols and subcarriers are described with reference to FIGS. 7-10. Although allocation to a first OFDM symbol and a second OFDM symbol are described, such description is not limiting. In some other implementations, first set of DMRSs 662 may be associated with (e.g., allocated to) a first group of OFDM symbols (e.g., a first group of DMRS symbols), second set of DMRSs 664 may be associated with (e.g., allocated to) a second group of OFDM symbols (e.g., a second group of DMRS symbols), or both.

First set of DMRSs 662 and second set of DMRSs 664 may each be transmitted using one or more DMRS ports. For example, UE 115 may transmit first set of DMRSs 662 using a first DMRS port (or a first group of DMRS ports), and UE 115 may transmit second set of DMRSs 664 using a second DMRS port (or a second group of DMRS ports) that is different from the first DMRS port. Using different DMRS ports is further described with reference to FIGS. 7-10.

In some implementations, different DMRSs may be associated with different antenna ports of UE 115, although effectively only one DMRS port may be used to transmit DMRSs to UE 115 (e.g., the staggered DMRS pattern may be formed by sending DMRSs over different symbols according to the RE allocations of different configuration ports, such that effectively only one port is transmitted). For example, first set of DMRSs 662 may be associated with first antenna port 516, and second set of DMRSs 664 may be associated with second antenna port 518. In some such implementations, first antenna port 516 may be included in (or associated with) a first CDM group configured for UE 115, and second antenna port 518 may be included in (or associated with) a second CDM group configured for UE 115. To illustrate, network entity 650 may transmit a DMRS configuration to UE 115. The DMRS configuration may be included in a configuration message, such as an RRC message. The DMRS configuration may indicate one or more CDM groups configured for UE 115, and corresponding DMRS ports included in each CDM group. For example, the DMRS configuration may indicate a first CDM group that includes at least DMRS port 0 (corresponding to first antenna port 516) and a second CDM group that includes at least DMRS port 2 (corresponding to second antenna port 518). Prior to transmission of DMRSs 660, network entity 650 may transmit an indication to UE 115 of one or more antenna ports, included in the one or more CDM groups, assigned to UE 115 for transmission of DMRSs 660. For example, the indication may indicate that a first port (e.g., DMRS port 0, corresponding to first antenna port 516) included in the first CDM group is assigned to UE 115 for transmission of first set of DMRSs 662 and that a second port (e.g., DMRS port 2, corresponding to second antenna port 518) in the second CDM group is assigned to UE 115 for transmission of second set of DMRSs 664. These antenna ports (e.g., DMRS ports corresponding to first antenna port 516 and second antenna port 518) may be referred to as assigned DMRS ports or scheduled DMRS ports.

In some implementations, the indicated port for transmission of DMRS transmissions may be assigned to UE 115 for one or more resource blocks (RBs). For example, the indicated DMRS port may be used for transmission of DMRS transmissions in a set of RBs that are included in a resource allocation scheduled for UE 115 (e.g., for one or more physical uplink shared channel (PUSCH communications). In some implementations, the DMRS port, the set of RBs, the resource allocation, or a combination thereof, may be included in DCI.

UE 115 may transmit DMRSs 660 using antenna ports 514. For example, UE 115 may transmit first set of DMRSs 662 using first antenna port 516 (e.g., an antenna port included in or corresponding to the first CDM group), and UE 115 may transmit second set of DMRSs 664 using second antenna port 518 (e.g., an antenna port included in or corresponding to the second CDM group). In some implementations, UE 115 may combine first antenna port 516 and second antenna port 518 into a single virtual port for transmitting DMRSs 660 (e.g., both first set of DMRSs 662 and second set of DMRSs 664). For example, UE 115 may combine first antenna port 516 and second antenna port 518 into a single virtual port, as described with reference to FIG. 4. In some such implementations, an indication of assigned DMRS ports from network entity 650 may also indicate that two or more assigned DMRS ports are to be combined into a corresponding virtual port. The indication may be included in a configuration message (e.g., an RRC message), in DCI, in activation DCI, or in a MAC-CE, as non-limiting examples.

In addition to transmitting DMRSs 660, UE 115 may also transmit a PTRS 666 to UE 115. PTRS 666 may be associated with DMRSs 660. For example, UE 115 may allocate PTRS 666 (or multiple PTRSs) to OFDM symbols (also referred to as PTRS symbols) and subcarriers such that PTRS 666 is aligned with at least one of DMRSs 660. UE 115 may transmit PTRS 666 using one or more PTRS ports, similar to the DMRS ports used to transmit DMRSs 660. For example, different PTRS ports may be allocated to different OFDM symbols, different subcarriers, or both. In some implementations, different PTRS ports may have different powers, such as zero power or non-zero power, as further described herein.

In some implementations, PTRS 666 is allocated to one or more symbols subsequent to the first DMRS symbol (to which first set of DMRSs 662 is allocated) and to one or more subcarriers of the first subset of subcarriers (to which first set of DMRSs 662 is allocated). For example, DMRSs 660 and PTRS 666 may be allocated according to the first configuration, as further described with reference to FIG. 7. In some other implementations, PTRS 666 is optionally allocated to a first set of symbols between the first DMRS symbol and the second DMRS symbol (to which second set of DMRSs 664 is allocated) and to one or more subcarriers of the first set of subcarriers and is allocated to a second set of symbols subsequent to the second DMRS symbol and to one or more subcarriers of the second subset of subcarriers (to which second set of DMRSs 664 is allocated). For example, DMRSs 660 and PTRS 666 may be allocated according to the second configuration, as further described with reference to FIG. 8. In some other implementations, PTRS 666 is allocated to one or more symbols subsequent to the second DMRS symbols and to one or more subcarriers of the second subset of subcarriers. For example, DMRSs 660 and PTRS 666 may be allocated according to the third configuration, as further described with reference to FIG. 9.

DMRSs 660 and PTRS 666 may be associated with, and enable determination of a channel estimation by network entity 650 corresponding to, one or more types of channels between network entity 650 and UE 115. In some implementations, DMRSs 660 and PTRS 666 are associated with a PUSCH 684 between UE 115 and network entity 650. In such implementations, DMRSs 660 and PTRS 666 may be allocated according to the first configuration, the second configuration, or the third configuration.

In some implementations in which DMRSs 660 and PTRS 666 are allocated according to the second configuration, UE 115 may signal offsets associated with allocation of PTRS 666 to network entity 650. For example, UE 115 may transmit higher layer parameters 672 to UE 115. Higher layer parameters 672 may be included in a message, such as an RRC message, a MAC-CE, or some other signal or message. In some implementations, higher layer parameters 672 are defined as a "resourceElementoffset" parameter. Higher layer parameters 672 may include a first higher layer parameter 674 associated with first set of DMRSs 662 and a second higher layer parameter 676 associated with second set of DMRSs 664. First higher layer parameter 674 may indicate a first offset of a first set of symbols (to which PTRS 666 is allocated), and second higher layer parameter 676 may indicate a second offset of a second set of symbols (to which PTRS 666 is also allocated). The first offset and the second offset may indicate an offset (in symbols) from an initial OFDM symbol of an RB assigned to UE 115, or the first offset may indicate an offset from the first DMRS symbol (to which first set of DMRSs 662 is allocated) and the second offset may indicate an offset from the second DMRS symbol (to which second set of DMRSs 664 is allocated), as non-limiting examples.

In some other implementations in which DMRSs 660 and PTRS 666 are allocated according to the second configuration, offsets associated with allocation of PTRS 666 may be determined based on predetermined values 506 stored at UE 115 (e.g., at memory 504) or predetermined values 655 stored at network entity 650 (e.g., at memory 654). To illustrate, predetermined values 506 and predetermined values 655 may indicate a plurality of offsets corresponding to configurations of DMRSs (and PTRSs), combs used to communicate DMRSs (and PTRSs), or a combination thereof. UE 115 and network entity 650 may determine offsets associated with allocation of PTRS 666 by accessing predetermined values 506 or predetermined values 655, respectively, and matching a configuration of DMRSs 660 and PTRS 666, combs used to communicate DMRSs 660 and PTRS 666 (e.g., combs 512), or both, to a configuration, combs, or both associated with one or more of predetermined values 506 or predetermined values 655. Predetermined values 506 may include first predetermined value 508 indicating a first offset of the first set of symbols to which PTRS 666 is allocated and second predetermined value 510 indicating a second offset of the second set of symbols to which PTRS 666 is allocated. Similarly, predetermined values 655 may include first predetermined value 657 indicating the first offset of the first set of symbols and second predetermined value 659 indicating the second offset of the second set of symbols. The first offset and the second offset may indicate an offset (in symbols) from an initial OFDM symbol of an RB assigned to UE 115, or the first offset may indicate an offset from the first DMRS symbol and the second offset may indicate an offset from the second DMRS symbol, as non-limiting examples.

In some implementations, PTRS 666 includes multiple PTRSs having different powers. For example, PTRS 666 may include a non-zero power (NZP) PTRS 668 and a zero power (ZP) PTRS 670. UE 115 may transmit NZP PTRS 668 using one or more NZP PTRS ports that are allocated a first set of symbols, a first one or more subcarriers, or a combination thereof, and UE 115 may transmit ZP PTRS 670 using one or more ZP PTRS ports that are allocated to a second set of symbols, a second one or more subcarriers, or a combination thereof. Transmitting ZP PTRS 670 via one or more ZP PTRS ports may include adjusting parameters of one or more components of a transmission path at UE 115, such as a power amplifier, as a non-limiting example. Transmitting ZP PTRS 670 may reserve some REs of a RB for other UEs to transmit NZP PTRSs to network entity 650, which reduces interference from PTRS 666 to the other PTRSs transmitted by the other UEs. As a non-limiting example, in implementations configured for MU-MIMO, UE 115 may use ZP PTRS ports to cause network entity 650 to vacate some REs of a RB in order to reduce interference with NZP PTRSs transmitted by other UEs. Because different UEs may have different DMRS configurations, different patterns for ZP and NZP PTRSs may be used.

In some implementations in which DMRSs 660 and PTRS 666 are allocated according to the first configuration described with reference to FIG. 7 (e.g., PTRS 666 is allocated to one or more symbols subsequent to the first DMRS symbol and one or more subcarriers of the first subset of subcarriers to which first set of DMRSs 662 is allocated), NZP PTRS 668 may be allocated to a first subset of the one or more symbols and ZP PTRS 670 may be allocated to a second subset of the one or more symbols. Such implementations include MU-MIMO implementations in which DMRSs 660 and PTRS 666 are associated with PUSCH 684. In some such implementations, the first subset of the one or more symbols and the second subset of the one or more symbols may be fixed across the one or more of the first subset of subcarriers, as further described with reference to FIG. 10.

In some implementations in which DMRSs 660 and PTRS 666 are allocated according to the second configuration described with reference to FIG. 8 (e.g., PTRS 666 is optionally allocated to a first set of symbols between the first DMRS symbol and the second DMRS symbol and to one or more subcarriers of the first subset of subcarriers to which first set of DMRSs 662 is allocated and is allocated to a second set of symbols subsequent to the second DMRS symbol and to one or more subcarriers of the second subset of subcarriers), NZP PTRS 668 may be allocated to a first subset of the first set of symbols and a first subset of the second set of symbols, and ZP PTRS 670 may be allocated to a second subset of the first set of symbols and a second subset of the second set of symbols. The first subset of the first set of symbols and the second subset of the first set of symbols may be associated with one or more of the first subset of subcarriers, and the first subset of the second set of symbols and the second subset of the second set of symbols are associated with the second subset of subcarriers. For example, NZP PTRS 668 and ZP PTRS 670 may each be allocated to subcarriers of the first subset of subcarriers and the second subset of subcarriers.

In some such implementations, UE 115 may transmit uplink control information (UCI) 678 to network entity 650. UCI 678 may include a field 680 that indicates that ZP PTRS 670 is associated with (e.g., is allocated to) multiple subsets of subcarriers (e.g., at least the first subset of subcarriers and the second subset of subcarriers). In some implementations, field 680 is a single bit having either a first value that indicates that ZP PTRS 670 is not associated with (e.g., is not allocated to) multiple subsets of subcarriers or a second value that indicates that ZP PTRS 670 is associated with (e.g., is allocated to) multiple subsets of subcarriers. Additionally or alternatively, UCI 678 may include offsets 682. For example, one or more fields or bits of UCI 678 may indicate offsets 682. Offsets 682 may include an offset of the second subset of the first set of symbols, an offset of the second subset of the second set of symbols, or both (e.g., offset(s) of symbols allocated to ZP PTRS 670), for example with reference to an initial symbol of an RB. Alternatively, an offset of the second subset of the first set of symbols, an offset of the second subset of the second symbols, or both (e.g., offset(s) of symbols allocated to ZP PTRS 670), may be indicated by first predetermined value 508 and first predetermined value 657, or second predetermined value 510 and second predetermined value 659, respectively, as described above.

In some implementations in which DMRSs 660 and PTRS 666 are allocated according to the third configuration described with reference to FIG. 9 (e.g., PTRS 666 is allocated to one or more symbols subsequent to the second DMRS symbol and to one or more subcarriers of the second subset of subcarriers to which second set of DMRSs 664 is allocated), NZP PTRS 668 may be allocated to a first subset of the one or more symbols and ZP PTRS 670 may be allocated to a second subset of the one or more symbols. In some such implementations, the first subset of the one or more symbols and the second subset of the one or more symbols may be fixed across the one or more of the first subset of subcarriers, similar to as described with reference to FIG. 10.

After receiving DMRSs 660 and PTRS 666 from UE 115, network entity 650 may perform channel estimation based on DMRSs 660 an PTRS 666, similar to as described with reference to FIG. 6. Additionally or alternatively, network entity 650 may track phase changes from symbol to another symbol (e.g., from the first DMRS symbol to the second DMRS symbol or from a PTRS symbol to a second PTRS symbol) and adjust one or more oscillators of network entity 650 accordingly. Performing the channel estimation may cause network entity 650 to generate channel estimation 686. Channel estimation 686 may represent an estimation of PUSCH 684. Network entity 650 may use channel estimation 686 when preparing signals to be transmitted to UE 115. Additionally or alternatively, network entity 650 may transmit channel estimation 686 to UE 115. UE 115 may use channel estimation 686 when preparing signals to be transmitted to network entity 650.

As described with reference to FIG. 6, the present disclosure provides techniques for allocating DMRSs and PTRSs transmitted on the UL for wireless communications systems configured with larger subcarrier spacing. The larger subcarrier spacing may support a larger bandwidth, such as 2 GHz, with reasonable FFT size. Additionally, the techniques described with reference to FIG. 6 may reduce an impact on a phase noise correction process at a wireless device that receives the DMRSs and the PTRS, as compared to other DMRS and PTRS designs for larger subcarrier spacing.

Figure 7:
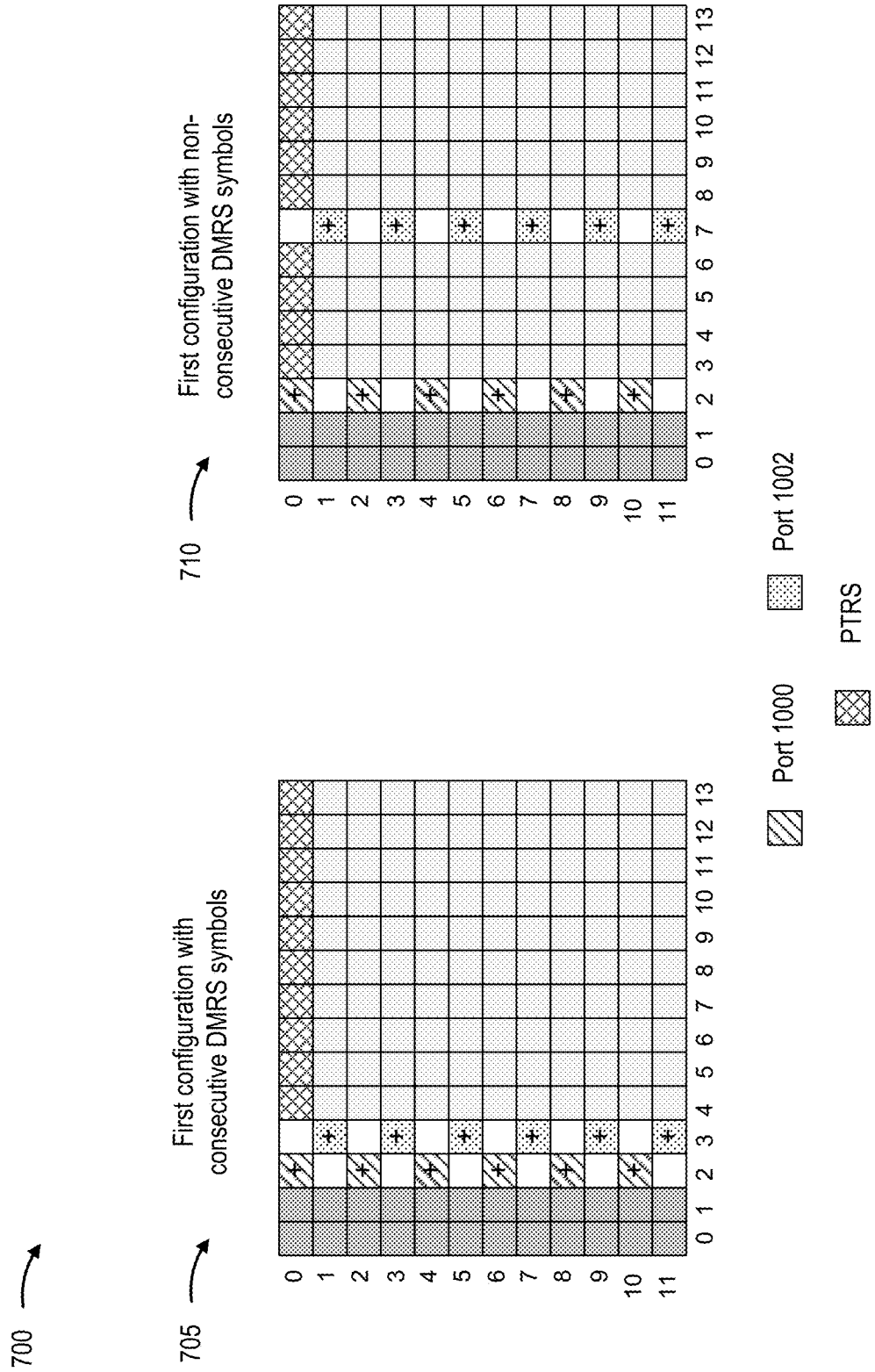
FIG. 7 is a diagram illustrating first examples associated with DMRS and PTRS design for large subcarrier spacing according to some aspects.

FIG. 7 is a diagram illustrating first examples 700 associated with DMRS and PTRS design for large subcarrier spacing according to some aspects. In a wireless communication system, such as wireless communications systems 500-600, multiple DMRS ports can be used to transmit on the same OFDM symbol using CDM and FDM. Using FDM, different DMRS ports can be used for transmission of DMRSs on the same OFDM symbol by using different subcarriers (e.g., tones) for different DMRS ports. Using CDM, different DMRS ports can be used for transmission of DMRSs on the same OFDM symbol (or across a set of OFDM symbols on the same subcarrier) by using different OCCs for different DMRS ports. The DMRS ports that are used for transmission on the same subcarrier belong to the same CDM group, and the DMRS ports that are used for transmission on different sub-carriers belong to different CDM groups. In other words, a CDM group includes a set of DMRS ports used for transmission of a respective set of DMRSs on the same subcarrier, where different OCCs are used for (e.g., to scramble) transmissions on different DMRS ports included in the set of DMRS ports. Additionally, one or more PTRS ports may be used to transmit PTRSs on one or more OFDM symbols spanning one or more subcarriers.

First examples 700 shown in FIG. 7 are shown for an RB configured for a UE, such as UE 115. The RB includes multiple OFDM symbols (e.g., symbols indexed 0-13, shown on the horizontal axis) and multiple subcarriers (e.g., subcarriers indexed 0-11, shown on the vertical axis). In some implementations, one or more REs of the RB may be reserved or allocated for purposes other than reference signal transmissions, as shown by symbols 0 and 1 spanning all subcarriers 0-13. The examples described with reference to FIG. 7 may be applied to DMRSs and PTRSs associated with a PDSCH, a PUSCH, or a PSSCH, as described above.

As shown in FIG. 7, a first configuration of DMRS and PTRS may support a maximum of two CDM groups, with different CDM groups being used on different symbols. Such configuration of different DMRS ports (or CDM groups) to different symbols may also be referred to as a "staggered DMRS configuration." In this configuration, a first CDM group (CDM Group 0) may occupy a first set or a first subset of subcarriers on a first symbol (also referred to as a first DMRS symbol), and a second CDM group (CDM Group 1) may occupy a second set or a second subset of subcarriers on a second symbol (also referred to as a second DMRS symbol). The first CDM group may include multiple DMRS ports, such as DMRS port 0 (shown as Port 1000), and the second CDM group may also include multiple DMRS ports, such as DMRS port 2 (shown as Port 1002). Although only one DMRS port for each CDM group is shown in FIG. 7, in other implementations, each CDM group may include two or more DMRS ports. In some implementations, the first CDM group (e.g., DMRS port 0) may be used to transmit first set of DMRSs 562 and/or first set of DMRSs 662, and the second CDM group (e.g., DMRS port 1) may be used to transmit second set of DMRSs 564 and/or second set of DMRSs 664, as described with reference to FIGS. 5-6.

In some implementations, as shown by reference number 705, DMRS symbols allocated according to the first configuration may span two adjacent (e.g., consecutive) symbols. In this case, the first CDM group (CDM Group 0) may occupy a first set or a first subset of subcarriers on a first symbol (shown as symbol 2), and a second CDM group (CDM Group 1) may occupy a second set or a second subset of subcarriers on a second symbol (shown as symbol 3). In the example of FIG. 7, the first subset of subcarriers includes even subcarriers (e.g., subcarriers 0, 2, 4, 6, 8, and 10) and the second subset of subcarriers includes odd subcarriers (e.g., subcarriers 1, 3, 5, 7, 9, and 11). In implementations in which each CDM group includes multiple DMRS ports (e.g., CDM Group 0 includes Port 1000 and Port 1001, and CDM includes Port 1002 and Port 1003), the first subset of subcarriers may be allocated between the multiple DMRS ports of CDM Group 0 (e.g., Port 1000 may be allocated to symbol 2 on subcarriers 0, 2, and 4, and Port 1001 may be allocated to symbol 2 on subcarriers 6, 8, and 10), and the second subset of subcarriers may be allocated between the multiple DMRS ports of CDM Group 1 (e.g., Port 1002 may be allocated to symbol 3 on subcarriers 1, 3, and 5, and Port 1003 may be allocated to symbol 3 on subcarriers 7, 9, and 11).

Additionally, a PTRS allocated according to the first configuration may be allocated to one or more symbols subsequent to the first DMRS symbol. As shown by reference number 705, when DMRS symbols are allocated to consecutive symbols (shown as symbols 2 and 3), the PTRS may be allocated to one or more symbols that are subsequent to the first DMRS symbol and are also subsequent to the second DMRS symbol (shown as symbols 4-13). In this example, an offset of the PTRS may be 4 (e.g., the PTRS is shifted 4 symbols from an initial symbol). Although the PTRS is shown as being allocated to all remaining symbols of the RB subsequent to the DMRS symbols (e.g., symbols 4-13), in other implementations, the PTRS may be allocated to only a subset of the remaining symbols, such as every other symbols, every third symbol, every fourth symbol, as non-limiting examples. As shown in FIG. 7, the PTRS may be allocated to a single subcarrier of the first subset of subcarriers, such as the first subcarrier (shown as subcarrier 0) of the first subset of subcarriers (e.g., the even subcarriers). In other implementations, the PTRS may be allocated to a different subcarrier of the first subset of subcarriers, or to more than one subcarrier of the first subset of subcarriers, such as every subcarrier, every other subcarrier, or every four subcarriers of the first subset of subcarriers, as non-limiting examples.

Alternatively, as shown by reference number 710, DMRS ports allocated according to the first configuration may span two non-adjacent (e.g., non-consecutive) symbols (e.g., a single symbol DMRS configuration with an additional configured DMRS symbol). In this case, the first CDM group (CDM Group 0) may occupy a first set or a first subset of subcarriers on a first symbol (shown as even subcarriers on symbol 2), and a second CDM group (CDM Group 1) may occupy a second set or a second subset of subcarriers on a second symbol (shown as odd subcarriers on symbol 7), where the first symbol and the second symbol are non-consecutive symbols.

When DMRS symbols are allocated to non-consecutive symbols, a PTRS allocated according to the first configuration may be allocated to a first set of symbols between the first DMRS symbol and the second DMRS symbol and a second set of symbols subsequent to the second DMRS symbol. As shown by reference number 710, when DMRS symbols are allocated to non-consecutive symbols (shown as symbols 2 and 7), the PTRS may be allocated to a first set of symbols that are between the first DMRS symbol and the second DMRS symbol (shown as symbols 3-6) and a second set of symbols that are subsequent to the second DMRS symbol (shown as symbols 8-13). In this case, the PTRS may be associated with an offset of 3 and an offset of 8. Although the PTRS is shown as being allocated to all remaining symbols of the RB not allocated to the DMRS symbols (e.g., symbols 3-6 and 8-13), in other implementations, the PTRS may be allocated to only a subset of the remaining symbols, such as every other symbols, every third symbol, every fourth symbol, as non-limiting examples. As shown in FIG. 7, the PTRS may be allocated to a single subcarrier of the first subset of subcarriers, such as the first subcarrier (shown as subcarrier 0) of the first subset of subcarriers (e.g., the even subcarriers). In other implementations, the PTRS may be allocated to a different subcarrier of the first subset of subcarriers, or to more than one subcarrier of the first subset of subcarriers, such as every subcarrier, every other subcarrier, or every four subcarriers of the first subset of subcarriers, as non-limiting examples.

In some implementations, the first configuration corresponds to a fixed PTRS pattern that is not changed regardless of changes to DMRS patterns (e.g., allocating different DMRS ports or CDM groups to different symbols). In such implementations, phase tracking algorithms can be modified to interpolate the phase between different DMRS REs. This enables alignment of the PTRS port to the first DMRS symbol. In some such implementations, the DMRS port allocated to the first DMRS symbol is the DMRS port having the lowest index, which conforms to one or more wireless communication standards, such as a 3GPP wireless communication standard. To further illustrate, the DMRS port (e.g., Port 1000) allocated to the first DMRS symbol may have a lowest index of a plurality of DMRS ports (e.g., the other DMRS ports included in the first CDM group and the DMRS ports included in the second CDM group), which may correspond to a first set of DMRSs being associated with an antenna port (e.g., first antenna port 516) having a lowest index of a plurality of antenna ports (e.g., antenna ports 514) configured to receive DMRSs at UE 115.

In some implementations, when the first configuration is used, multiple DMRS ports may be combined into a single virtual port, as described elsewhere herein. In this way, denser DMRS coverage in the frequency domain may be achieved. Furthermore, multiple DMRS symbols, that use a legacy DMRS configuration, may be assigned with different DMRS ports. The multiple DMRS symbols can be consecutive or non-consecutive.

Figure 8:
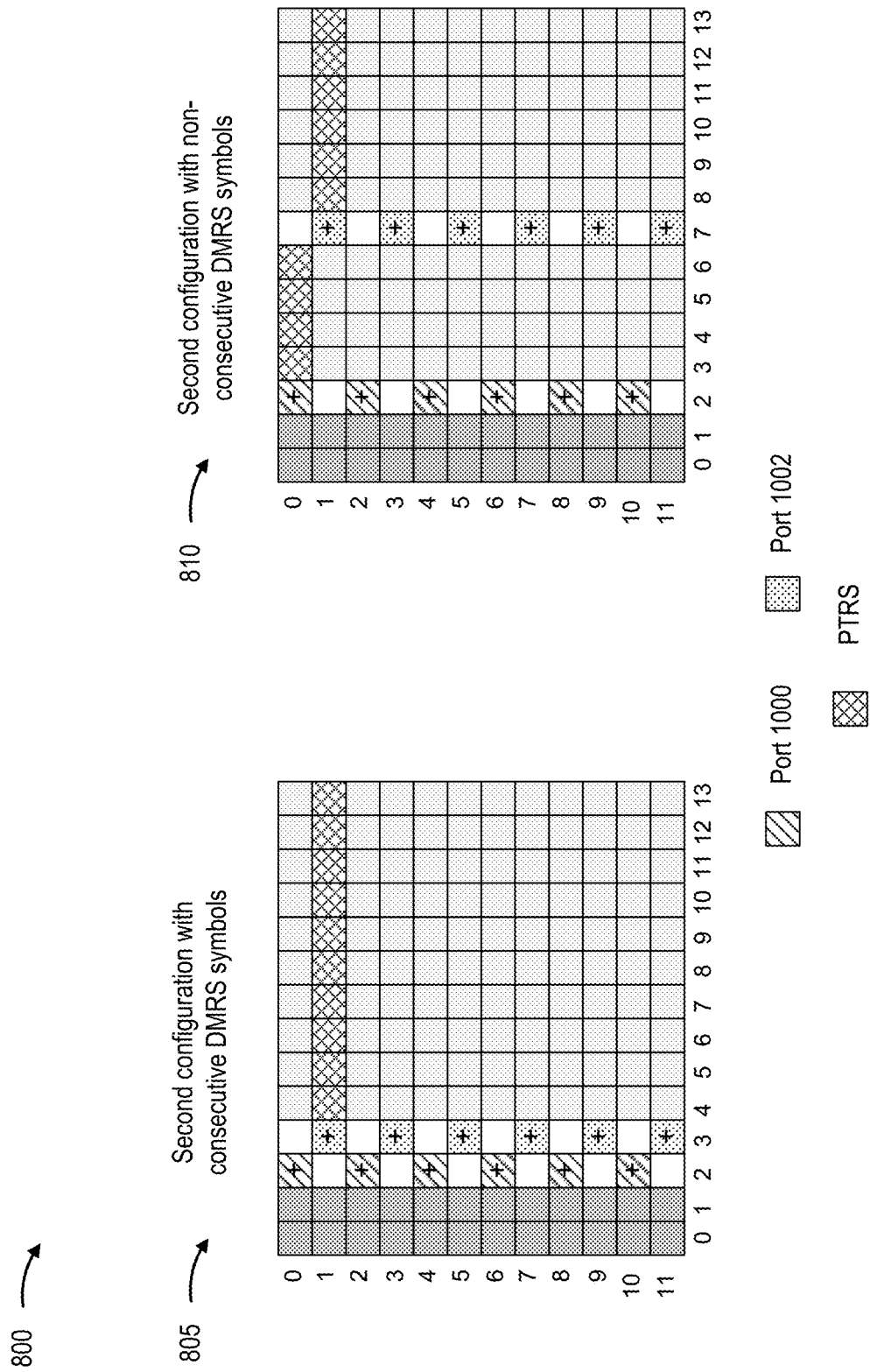
FIG. 8 is a diagram illustrating second examples associated with DMRS and PTRS design for large subcarrier spacing according to some aspects.

FIG. 8 is a diagram illustrating second examples 800 associated with DMRS and PTRS design for large subcarrier spacing according to some aspects. FIG. 8 illustrates a second configuration of DMRS and PTRS allocation. The second configuration may be applied to DMRSs and PTRSs associated with a PDSCH, a PUSCH, or a PSSCH, as described above. As described with reference to FIG. 7, different DMRS ports (or CDM groups including multiple DMRS ports) may be allocated to different symbols (e.g., consecutive symbols or non-consecutive symbols) and to different subsets of subcarriers. A PTRS may be optionally allocated to a first set of symbols between a first DMRS symbol and a second DMRS symbol and to one or more subcarriers of a first subset of subcarriers, and the PTRS may be allocated to a second set of symbols subsequent to the second DMRS symbol and to one or more subcarriers of the second subset of subcarriers.

In some implementations, as shown by reference number 805, DMRS symbols allocated according to the second configuration may span two adjacent (e.g., consecutive) symbols. In this case, the first CDM group (CDM Group 0) including at least DMRS Port 1000) may occupy a first set or a first subset of subcarriers on a first symbol (shown as even subcarriers on symbol 2), and a second CDM group (CDM Group 1 including at least DMRS Port 1002) may occupy a second set or a second subset of subcarriers on a second symbol (shown as odd subcarriers on symbol 3).

As shown by reference number 805, when DMRS symbols are allocated to consecutive symbols (shown as symbols 2 and 3), the PTRS is not allocated to the first set of symbols (e.g., between the first DMRS symbol and the second DMRS symbol) and is instead only allocated to the second set of symbols that are subsequent to the second DMRS symbol (shown as symbols 4-13). Although the PTRS is shown as being allocated to all remaining symbols of the RB subsequent to the DMRS symbols (e.g., symbols 4-13), in other implementations, the PTRS may be allocated to only a subset of the remaining symbols, such as every other symbols, every third symbol, every fourth symbol, as non-limiting examples. As shown in FIG. 8, the PTRS may be allocated to a single subcarrier of the second subset of subcarriers, such as the first subcarrier (shown as subcarrier 1) of the second subset of subcarriers (e.g., the odd subcarriers). In other implementations, the PTRS may be allocated to a different subcarrier of the second subset of subcarriers, or to more than one subcarrier of the second subset of subcarriers, such as every subcarrier, every other subcarrier, or every four subcarriers of the second subset of subcarriers, as non-limiting examples.

Alternatively, as shown by reference number 810, DMRS ports allocated according to the second configuration may span two non-adjacent (e.g., non-consecutive) symbols (e.g., a single symbol DMRS configuration with an additional configured DMRS symbol). In this case, the first CDM group (CDM Group 0) may occupy a first set or a first subset of subcarriers on a first symbol (shown as even subcarriers on symbol 2), and a second CDM group (CDM Group 1) may occupy a second set or a second subset of subcarriers on a second symbol (shown as odd subcarriers on symbol 7), where the first symbol and the second symbol are non-consecutive symbols.

When DMRS symbols are allocated to non-consecutive symbols, a PTRS allocated according to the second configuration may be allocated to both of the first set of symbols between the first DMRS symbol and the second DMRS symbol and the second set of symbols subsequent to the second DMRS symbol. As shown by reference number 810, when DMRS symbols are allocated to non-consecutive symbols (shown as symbols 2 and 7), the PTRS may be allocated to a first set of symbols that are between the first DMRS symbol and the second DMRS symbol (shown as symbols 3-6) and a second set of symbols that are subsequent to the second DMRS symbol (shown as symbols 8-13). Although the PTRS is shown as being allocated to all remaining symbols of the RB not allocated to the DMRS symbols (e.g., symbols 3-6 and 8-13), in other implementations, the PTRS may be allocated to only a subset of the remaining symbols, such as every other symbols, every third symbol, every fourth symbol, as non-limiting examples. As shown in FIG. 8, the PTRS may be allocated to the first set of symbols on a single subcarrier of the first subset of subcarriers (shown as subcarrier 0), and to the second set of symbols on a single subcarrier of the second subset of subcarriers (shown as subcarrier 1). In other implementations, the PTRS may be allocated to a different subcarrier of the subsets of subcarriers, or to more than one subcarrier of each subset of subcarriers, such as every subcarrier, every other subcarrier, or every four subcarriers of the subsets of subcarriers, as non-limiting examples.

In some implementations, the second configuration corresponds to a "staggered PTRS pattern" that aligns with both REs of the first DMRS symbol and REs of the second DMRS symbol. For example, at least some REs allocated to the PTRS are shifted to align with the second DMRS symbol, and are shifted to subcarriers of the second subset of subcarriers. In such implementations, phase tracking algorithms may not need to be modified to interpolate the phase between different DMRS REs. As described with reference to FIGS. 5-6, a higher layer parameter associated with the PTRS can be used to indicate that the PTRS spans multiple subsets of subcarriers and offsets for the first set of symbols and the second set of symbols. In some implementations, the PTRS may be allocated to avoid REs allocated to transmission of a direct current (DC) tone, as further described with reference to FIG. 10.

In some implementations, when the second configuration is used, multiple DMRS ports may be combined into a single virtual port, as described elsewhere herein. In this way, denser DMRS coverage in the frequency domain may be achieved. Furthermore, multiple DMRS symbols, that use a legacy DMRS configuration, may be assigned with different DMRS ports. The multiple DMRS symbols can be consecutive or non-consecutive.

Figure 9:
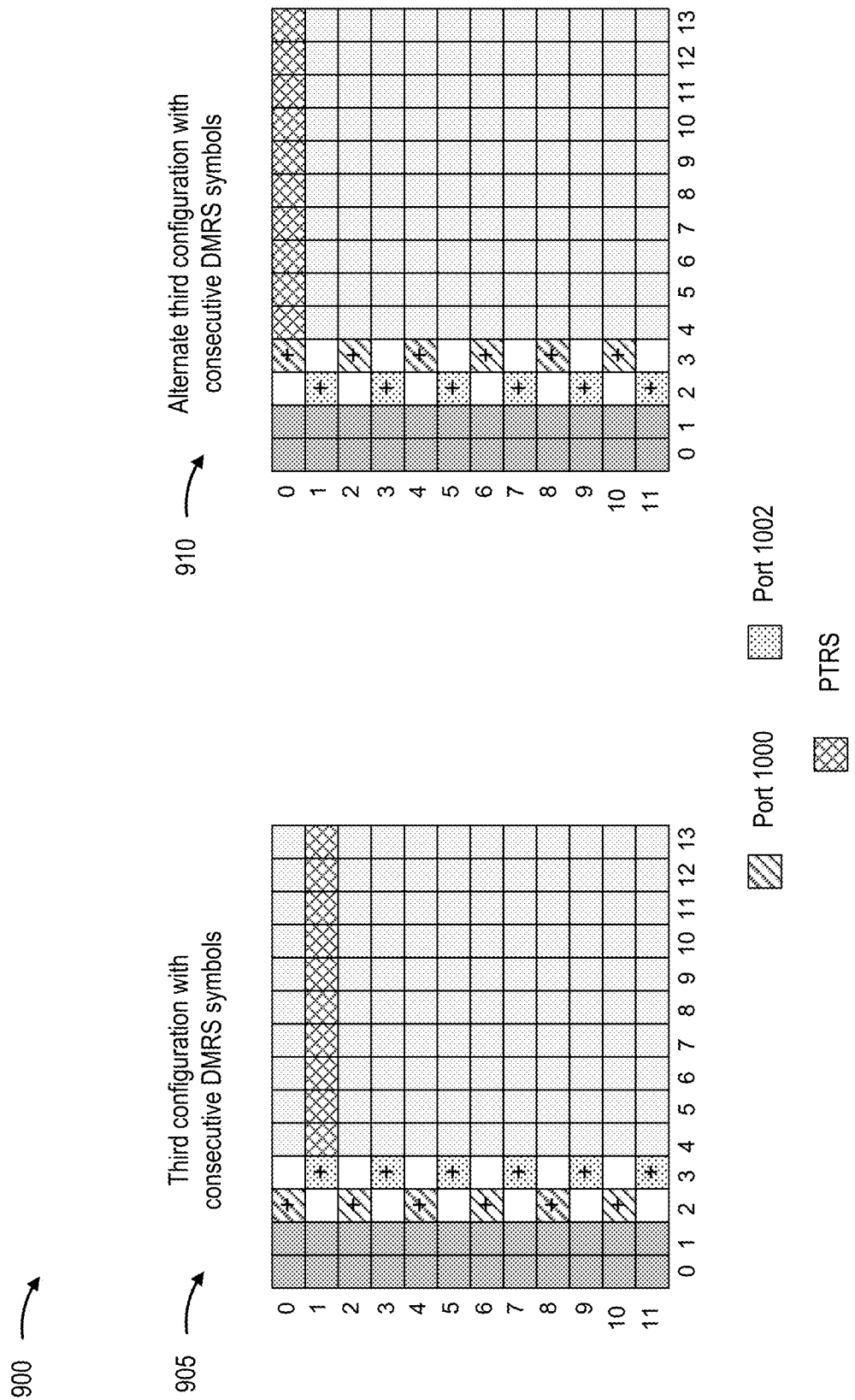
FIG. 9 is a diagram illustrating third examples associated with DMRS and PTRS design for large subcarrier spacing according to some aspects.

FIG. 9 is a diagram illustrating third examples 900 associated with DMRS and PTRS design for large subcarrier spacing according to some aspects. FIG. 9 illustrates a third configuration of DMRS and PTRS allocation. The third configuration may be applied to DMRSs and PTRSs associated with a PDSCH or a PUSCH, as described above. As described with reference to FIG. 7, different DMRS ports (or CDM groups including multiple DMRS ports) may be allocated to different symbols (e.g., consecutive symbols or non-consecutive symbols) and to different subsets of subcarriers. A PTRS may be allocated to one or more symbols subsequent to the second DMRS symbol and to one or more subcarriers of the second subset of subcarriers.

In some implementations, as shown by reference number 905, DMRS symbols allocated according to the second configuration may span two adjacent (e.g., consecutive) symbols. In this case, the first CDM group (CDM Group 0 including at least DMRS Port 1000) may occupy a first set or a first subset of subcarriers on a first symbol (shown as even subcarriers on symbol 2), and a second CDM group (CDM Group 1 including at least DMRS Port 1002) may occupy a second set or a second subset of subcarriers on a second symbol (shown as odd subcarriers on symbol 3).

As shown by reference number 905, when DMRS symbols are allocated to consecutive symbols (shown as symbols 2 and 3), the PTRS may be allocated to one or more symbols that are subsequent to the second DMRS symbol (shown as symbols 4-13). Although the PTRS is shown as being allocated to all remaining symbols of the RB subsequent to the DMRS symbols (e.g., symbols 4-13), in other implementations, the PTRS may be allocated to only a subset of the remaining symbols, such as every other symbols, every third symbol, every fourth symbol, as non-limiting examples. As shown in FIG. 9, the PTRS may be allocated to a single subcarrier of the second subset of subcarriers, such as the first subcarrier (shown as subcarrier 1) of the second subset of subcarriers (e.g., the odd subcarriers). In other implementations, the PTRS may be allocated to a different subcarrier of the second subset of subcarriers, or to more than one subcarrier of the second subset of subcarriers, such as every subcarrier, every other subcarrier, or every four subcarriers of the second subset of subcarriers, as non-limiting examples.

In the third configuration, as shown by reference number 905, the PTRS is aligned with a DMRS port that does not have the lowest index of the allocated DMRS ports. For example, the PTRS is aligned with Port 1002, which has a higher index than Port 1000. This may include or correspond to the PTRS being associated with an antenna port (e.g., second antenna port 518) that does not have a lowest index (or may have the highest index) of a plurality of antenna ports (e.g., antenna ports 514) at UE 115. In some implementations, the DMRS is aligned with a DMRS port having a lowest antenna index of the DMRS ports included in the second CDM group. In other implementations, the PTRS is aligned with a different DMRS port of the second CDM group, such as a DMRS port having the highest index of the second CDM group.

Alternatively, DMRSs and PTRSs may be allocated according to an alternate third configuration. As shown by reference number 910, DMRS ports allocated according to the alternate third configuration may span two adjacent (e.g., consecutive) symbols, with the DMRS port having the lowest index being allocated to the second symbol. In this case, the first CDM group (CDM Group 0) may occupy a first set or a first subset of subcarriers on a second symbol (shown as even subcarriers on symbol 3), and a second CDM group (CDM Group 1) may occupy a second set or a second subset of subcarriers on a first symbol (shown as odd subcarriers on symbol 2).

When DMRS symbols are allocated to non-consecutive symbols, a PTRS allocated according to the second configuration may be allocated to both of the first set of symbols between the first DMRS symbol and the second DMRS symbol and the second set of symbols subsequent to the second DMRS symbol. As shown by reference number 810, when DMRS symbols are allocated to non-consecutive symbols (shown as symbols 2 and 7), the PTRS may be allocated to a first set of symbols that are between the first DMRS symbol and the second DMRS symbol (shown as symbols 3-6) and a second set of symbols that are subsequent to the second DMRS symbol (shown as symbols 8-13). Although the PTRS is shown as being allocated to all remaining symbols of the RB not allocated to the DMRS symbols (e.g., symbols 3-6 and 8-13), in other implementations, the PTRS may be allocated to only a subset of the remaining symbols, such as every other symbols, every third symbol, every fourth symbol, as non-limiting examples. As shown in FIG. 8, the PTRS may be allocated to the first set of symbols on a single subcarrier of the first subset of subcarriers (shown as subcarrier 0), and to the second set of symbols on a single subcarrier of the second subset of subcarriers (shown as subcarrier 1). In other implementations, the PTRS may be allocated to a different subcarriers of the subsets of subcarriers, or to more than one subcarrier of each subset of subcarriers, such as every subcarrier, every other subcarrier, or every four subcarriers of the subsets of subcarriers, as non-limiting examples.

A PTRS allocated according to the alternate third configuration may be allocated to one or more symbols that are subsequent to the second DMRS symbol (shown as symbols 4-13). Although the PTRS is shown as being allocated to all remaining symbols of the RB subsequent to the DMRS symbols (e.g., symbols 4-13), in other implementations, the PTRS may be allocated to only a subset of the remaining symbols, such as every other symbols, every third symbol, every fourth symbol, as non-limiting examples. As shown in FIG. 9, the PTRS may be allocated to a single subcarrier of the first subset of subcarriers, such as the first subcarrier (shown as subcarrier 0) of the first subset of subcarriers (e.g., the even subcarriers). In other implementations, the PTRS may be allocated to a different subcarrier of the first subset of subcarriers, or to more than one subcarrier of the first subset of subcarriers, such as every subcarrier, every other subcarrier, or every four subcarriers of the first subset of subcarriers, as non-limiting examples.

In the third configuration, as shown by reference number 910, the DMRS port having the lowest index of the allocated DMRS ports is allocated to the second DMRS symbol, and the PTRS is aligned with the DMRS port having the lowest index. For example, the PTRS is aligned with Port 1000, which has a lowest index of the first CDM group and the second CDM group. This may include or correspond to the PTRS being associated with an antenna port (e.g., first antenna port 516) that has a lowest index of a plurality of antenna ports (e.g., antenna ports 514) at UE 115. Aligning the PTRS to the DMRS port having the lowest index may conform to one or more wireless communication standards, such as a 3GPP wireless communication standard.

In some implementations, when the third configuration (or the alternate third configuration) is used, multiple DMRS ports may be combined into a single virtual port, as described elsewhere herein. In this way, denser DMRS coverage in the frequency domain may be achieved. Furthermore, multiple DMRS symbols, that use a legacy DMRS configuration, may be assigned with different DMRS ports. The multiple DMRS symbols can be consecutive or non-consecutive.

Figure 10:
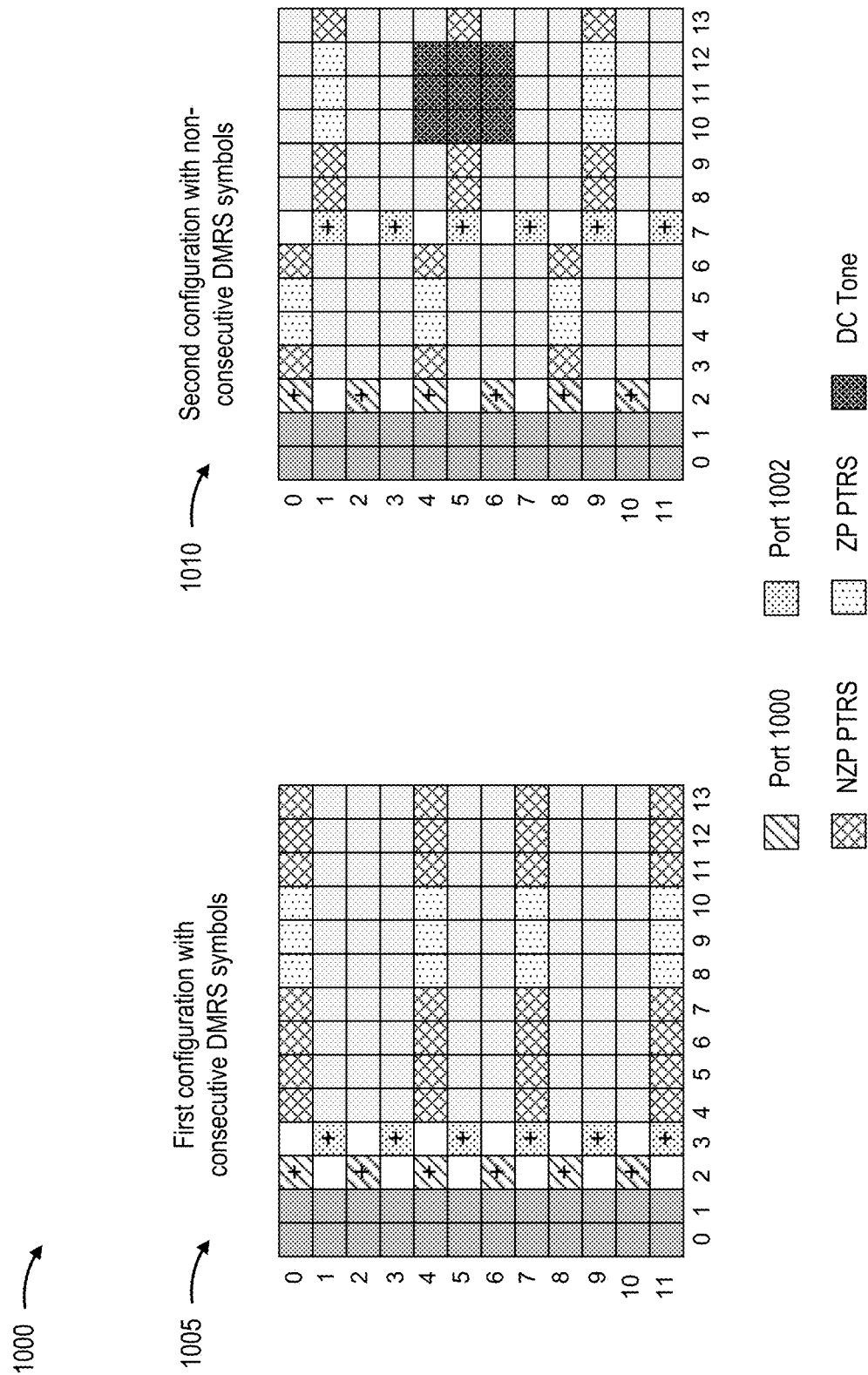
FIG. 10 is a diagram illustrating fourth examples associated with DMRS and PTRS design for large subcarrier spacing according to some aspects.

FIG. 10 is a diagram illustrating fourth examples 1000 associated with DMRS and PTRS design for large subcarrier spacing according to some aspects. FIG. 10 illustrates PTRS allocation for both NZP PTRSs (e.g., NZP PTRS ports) and ZP PTRSs (e.g., ZP PTRS ports). As described with reference to FIGS. 5-6, a NZP PTRS is a PTRS that is transmitted with a non-zero power, such that the PTRS may be received by the target device, while a ZP PTRS is a PTRS that is transmitted with zero power (or approximately zero power) and is not intended to be received by the target device, instead it is used to enable other PTRSs transmitted to other devices to have reduce interference in RBs allocated to the ZP PTRS. ZP PTRS and NZP PTRS allocation is shown in FIG. 10 for the first configuration with consecutive DMRS symbols and for the second configuration with non-consecutive DMRS symbols, although the techniques described herein may be applied to any of the first configuration, the second configuration, the third configuration, or the alternate third configuration in similar manners.

As shown by reference number 1005, DMRS symbols allocated according to the first configuration may span two adjacent (e.g., consecutive) symbols. In this case, the first CDM group (CDM Group 0 including at least DMRS Port 1000) may occupy a first set or a first subset of subcarriers on a first symbol (shown as even subcarriers on symbol 2), and a second CDM group (CDM Group 1 including at least DMRS Port 1002) may occupy a second set or a second subset of subcarriers on a second symbol (shown as odd subcarriers on symbol 3).

As shown by reference number 1005, when DMRS symbols are allocated to consecutive symbols (shown as symbols 2 and 3), a NZP PTRS may be allocated to a first subset of one or more symbols that are subsequent to the second DMRS symbol (shown as symbols 4-7 and 11-13), and a ZP PTRS may be allocated to a second subset of the one or more symbols that are subsequent to the second DMRS symbol (shown as symbols 8-10). In other implementations, the first subset of symbols and the second subset of symbols may include different symbols of the one or more symbols (e.g., symbols 4-13). As shown in FIG. 10, the NZP PTRS and the ZP PTRS may be allocated to a single subcarrier of the first subset of subcarriers, such as the first subcarrier (shown as subcarrier 0) of the first subset of subcarriers (e.g., the even subcarriers). In other implementations, the NZP PTRS and the ZP PTRS may be allocated to a different subcarrier of the first subset of subcarriers, or to more than one subcarrier of the first subset of subcarriers, such as every subcarrier, every other subcarrier, or every four subcarriers of the first subset of subcarriers, as non-limiting examples. Although described with reference to the first configuration, similar NZP PTRS and ZP PTRS allocation may occur for the second configuration (with consecutive DMRS symbols), the third configuration, or the alternate third configuration, with the allocation occurring on the second subset of subcarriers if needed. In these implementations, the first subset of symbols and the second subset of symbols are fixed across the corresponding subset of subcarriers, as described with reference to FIGS. 7 and 9. Additionally or alternatively, the allocation of NZP PTRS and ZP PTRS may be associated with a PDSCH, a PUSCH, or a PSSCH. For example, NZP PTRS and ZP PTRS allocation according to the first configuration may be associated with a PDSCH, a PUSCH, or a PSSCH. As another example, NZP PTRS and ZP PTRS allocation according to the third configuration or the alternate third configuration by be associated with only a PDSCH or a PUSCH.

As shown by reference number 1010, DMRS ports allocated according to the second configuration may span two non-adjacent (e.g., non-consecutive) symbols. In this case, the first CDM group (CDM Group 0) may occupy a first set or a first subset of subcarriers on a first symbol (shown as even subcarriers on symbol 2), and a second CDM group (CDM Group 1) may occupy a second set or a second subset of subcarriers on a second symbol (shown as odd subcarriers on symbol 7), where the first symbol and the second symbol are non-consecutive symbols.

When DMRS symbols are allocated to non-consecutive symbols, a NZP PTRS and a ZP PTRS allocated according to the second configuration may be allocated to both of a first set of symbols between the first DMRS symbol and the second DMRS symbol and a second set of symbols subsequent to the second DMRS symbol. As shown by reference number 1010, when DMRS symbols are allocated to non-consecutive symbols (shown as symbols 2 and 7), the NZP PTRS may be allocated to a first subset of a first set of symbols that are between the first DMRS symbol and the second DMRS symbol (shown as symbols 4 and 5) and to a first subset of a second set of symbols that are subsequent to the second DMRS symbol (shown as symbols 10-12), and the ZP PTRS may be allocated to a second subset of the first set of symbols (shown as symbols 3 and 6) and to a second subset of the second set of symbols (shown as symbols 8, 9, and 13). Although the NZP PTRS and the ZP PTRS are shown as being allocated to all remaining symbols of the RB not allocated to the DMRS symbols (e.g., symbols 3-6 and 8-13), in other implementations, the NZP PTRS and the ZP PTRS may be allocated to only a subset of the remaining symbols. As shown in FIG. 10, the NZP PTRS may be allocated to the first subset of the first set of symbols on a single subcarrier of the first subset of subcarriers (shown as subcarrier 0), and to the first subset of the second set of symbols on a single subcarrier of the second subset of subcarriers (shown as subcarrier 1), and the ZP PTRS may be allocated to the second subset of the first set of symbols on the single subcarrier of the first subset of subcarriers and to the second subset of the second set of symbols on the single subcarrier of the second subset of subcarriers. In other implementations, the NZP PTRS and the ZP PTRS may be allocated to a different subcarriers of the subsets of subcarriers, or to more than one subcarrier of each subset of subcarriers, such as every subcarrier, every other subcarrier, or every four subcarriers of the subsets of subcarriers, as non-limiting examples.

Thus, when a staggered DMRS pattern is used, a staggered pattern of NZP PTRS and ZP PTRS may be used. The allocation of NZP PTRS and ZP PTRS according to the second configuration may be associated with a PDSCH, a PUSCH, or a PSSCH. Additionally or alternatively, information associated with the staggered NZP PTRS and ZP PTRS allocation, such as indications of ZP PTRS staggering, offsets associated with NZP PTRS or ZP PTRS, etc., may be communicated using DCI, UCI, or SCI-1, as non-limiting examples.

In some implementations, the PTRS may be allocated to avoid RBs of a DC tone. For example, the PTRS may not be allocated to symbols that include the DC tone. In some implementations, the NZP PTRS is not allocated to symbols that include the DC tone, but the ZP PTRS may be allocated to symbols that include the DC tone, as shown in FIG. 10. Additionally or alternatively, the PTRS (e.g., the NZP PTRS, the ZP PTRS, or both) may not be allocated to subcarriers that include the DC tone.

Figures 11, 12:
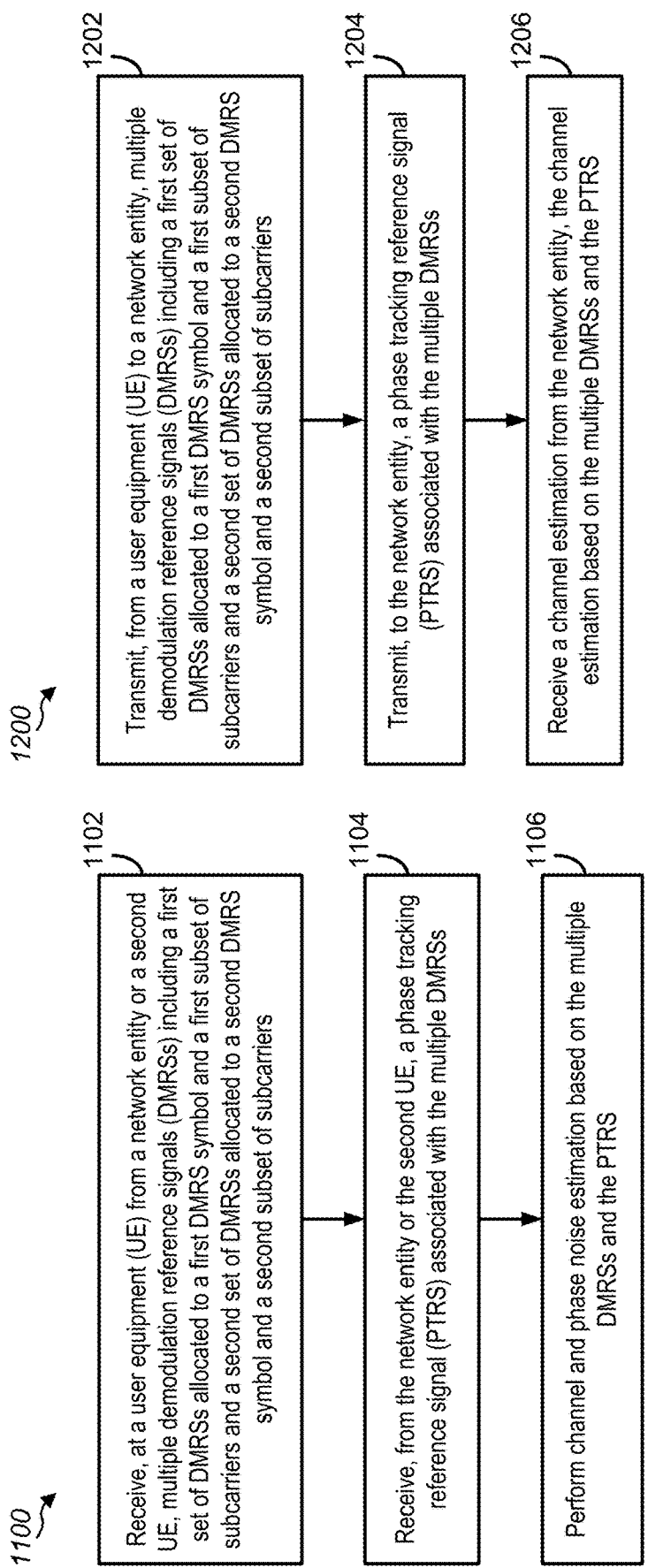
FIG. 11 is a flow diagram illustrating an example process of UE operations for receiving multiple DMRSs and a PTRS aligned with at least one of the multiple DMRSs according to some aspects.
FIG. 12 is a flow diagram illustrating an example process of UE operations for transmitting multiple DMRSs and a PTRS aligned with at least one of the multiple DMRSs according to some aspects.
Figure 13:
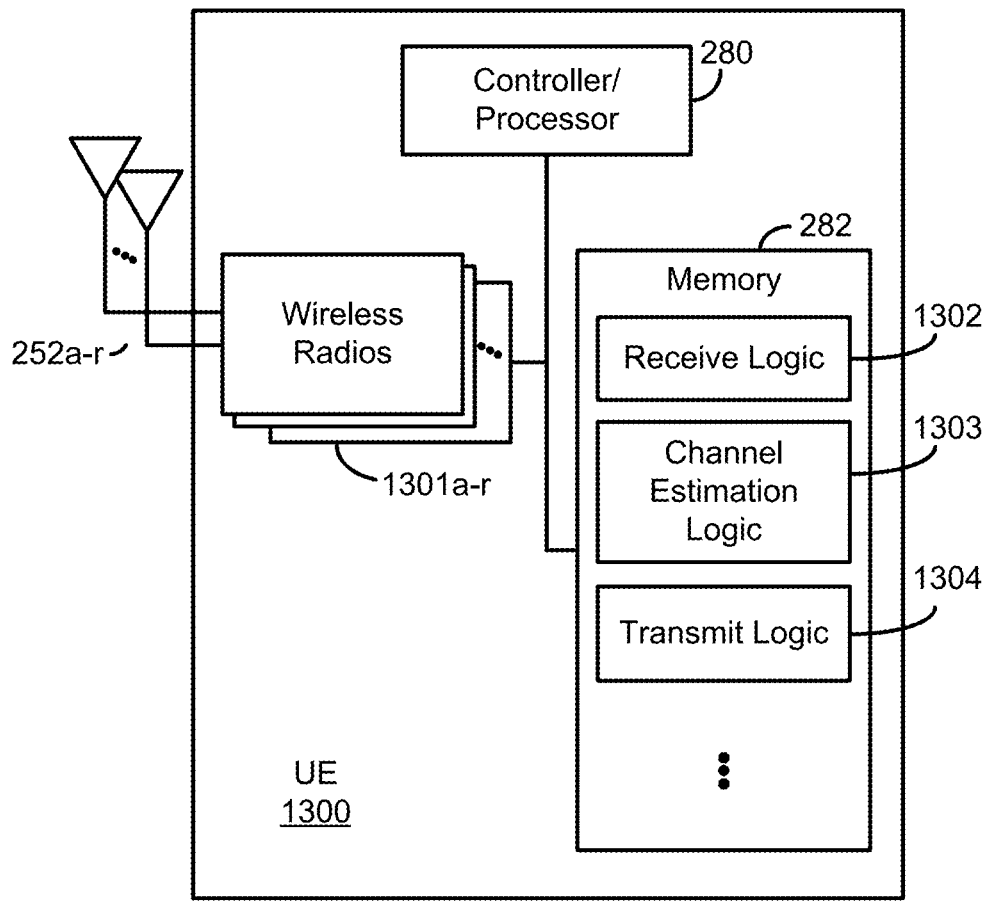
FIG. 13 is a block diagram illustrating an example of a UE configured to receive or transmit multiple DMRSs and a PTRS aligned with at least one of the multiple DMRSs according to some aspects.

Referring to FIGS. 11 and 12, flow diagrams illustrating example processes performed by a UE are shown. FIG. 11 illustrates an example process 1100 of UE operations for receiving multiple DMRSs and a PTRS aligned with at least one of the multiple DMRSs according to some aspects. FIG. 12 illustrates an example process 1200 of UE operations for transmitting multiple DMRSs and a PTRS aligned with at least one of the multiple DMRSs according to some aspects. In some implementations, process 1100 and/or process 1200 may be performed by UE 115 or a UE as illustrated in FIG. 13. In some other implementations, process 1100 and/or process 1200 may be performed by an apparatus configured for wireless communication. For example, the apparatus may include at least one processor, and a memory coupled to the processor. The processor may be configured to perform operations of process 1100 and/or process 1200. In some other implementations, process 1100 and/or process 1200 may be performed or executed using a non-transitory computer-readable medium having program code recorded thereon. The program code may be program code executable by a computer for causing the computer to perform operations of process 1100 and/or process 1200.

Example operations (also referred to as "blocks") of processes 1100 and 1200 will also be described with respect to UE 1300 as illustrated in FIG. 13. FIG. 13 is a block diagram illustrating an example UE 1300 configured to receiving or transmit multiple DMRSs and a PTRS aligned with at least one of the multiple DMRSs according to some aspects. UE 1300 includes the structure, hardware, and components as illustrated for UE 115 of FIGS. 2, 5, and 6. For example, UE 1300 includes controller/processor 280, which operates to execute logic or computer instructions stored in memory 282, as well as controlling the components of UE 1300 that provide the features and functionality of UE 1300. UE 1300, under control of controller/processor 280, transmits and receives signals via wireless radios 1301a-r and antennas 252a-r. Wireless radios 1301a-r include various components and hardware, as illustrated in FIG. 2 for UE 115, including modulator/demodulators 254a-r, MIMO detector 256, receive processor 258, transmit processor 264, and TX MIMO processor 266.

Figure 16:
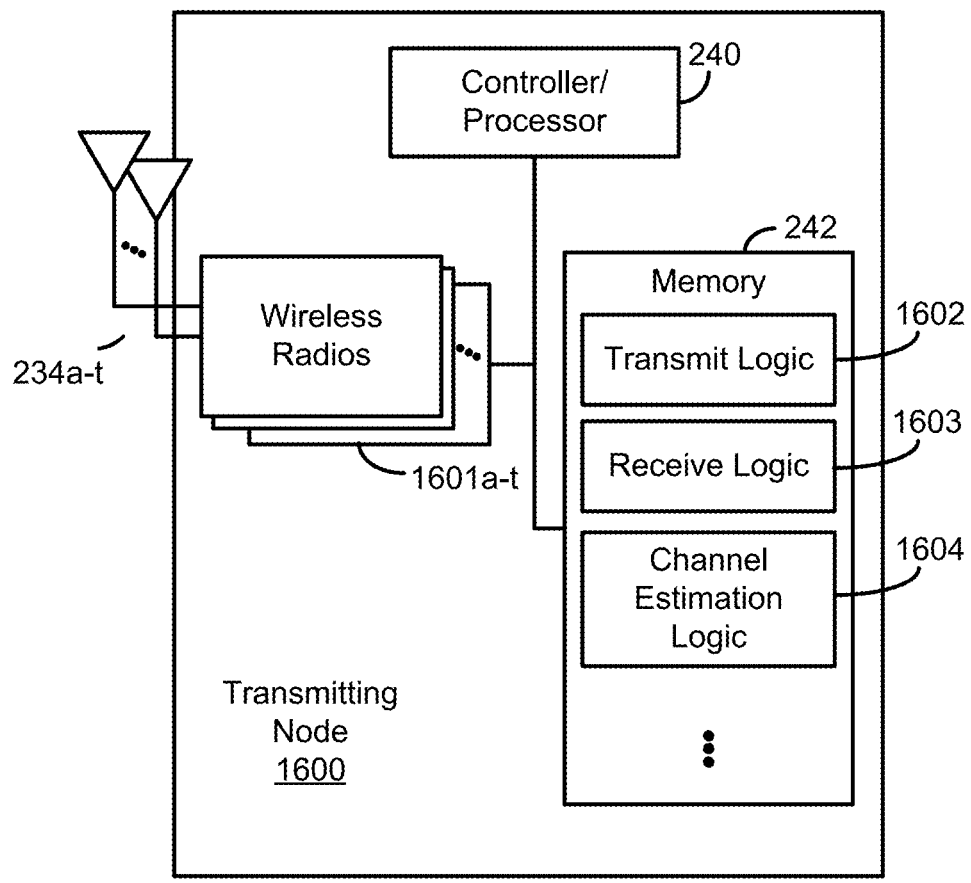
FIG. 16 is a block diagram illustrating an example transmitter node configured to transmit or receive multiple DMRSs and a PTRS aligned with at least one of the multiple DMRSs according to some aspects.

As shown, memory 282 may include receive logic 1302, channel estimation logic 1303, and transmit logic 1304. Receive logic 1302 may be configured to receive information or signaling from a transmitting node (e.g., a network entity or another UE), such as multiple DMRSs and a PTRS. Channel estimation logic 1303 may be configured to determine a channel estimation based on the multiple DMRSs and the PTRS. Transmit logic 1304 may be configured to enable transmission of signaling or messages to the transmitting node, such as the multiple DMRSs and the PTRS. UE 1300 may receive signals from or transmit signals to one or more network entities or UEs, such as base station 105 of FIGS. 1-2, transmitting node 550 of FIG. 5, network entity 650 of FIG. 6, a core network, a core network device, or a network entity as illustrated in FIG. 16.

Returning to process 1100 described with reference to FIG. 11, as illustrated at block 1102, UE 1300 receives, from a network entity or a second UE, multiple DMRSs including a first set of DMRSs allocated to a first DMRS symbol and a first subset of subcarriers and a second set of DMRSs allocated to a second DMRS symbol and a second subset of subcarriers. As an example of block 1102, UE 1300 may receive multiple DMRSs using wireless radios 1301a-r and antennas 252a-r, and using receive logic 1302. For example, UE 1300 may execute, under control of controller/processor 280, receive logic 1302 stored in memory 282. The execution environment of receive logic 1302 provides the functionality to receive, from a network entity or a second UE, multiple DMRSs including a first set of DMRSs allocated to a first DMRS symbol and a first subset of subcarriers and a second set of DMRSs allocated to a second DMRS symbol and a second subset of subcarriers.

At block 1104, UE 1300 receives, from the network entity or the second UE, a PTRS associated with the multiple DMRSs. As an example of block 1104, UE 1300 may receive a PTRS using wireless radios 1301a-r and antennas 252a-r, and using receive logic 1302. For example, UE 1300 may execute, under control of controller/processor 280, receive logic 1302 stored in memory 282. The execution environment of receive logic 1302 provides the functionality to receive, from the network entity or the second UE, a PTRS associated with the multiple DMRSs.

At block 1106, UE 1300 performs channel and phase noise estimation based on the multiple DMRSs and the PTRS. For example, UE 1300 may execute, under control of controller/processor 280, channel estimation logic 1303 stored in memory 282. The execution environment of channel estimation logic 1303 provides the functionality to perform channel and phase noise estimation based on the multiple DMRSs and the PTRS.

In some implementations, the first set of DMRSs is associated with a first antenna port, and the second set of DMRSs is associated with a second antenna port. In some such implementations, the first antenna port may be included in a first CDM group configured for UE 1300, and the second antenna port may be included in a second CDM group configured for UE 1300. Additionally or alternatively, process 1100 may further include combining the first antenna port and the second antenna port into a single virtual port. The channel and phase noise estimation may be performed using the single virtual port.

In some implementations, the first DMRS symbol and the second DMRS symbol are consecutive symbols. In some other implementations, the first DMRS symbol and the second DMRS symbol are non-consecutive symbols.

In some implementations, the PTRS may be allocated to one or more symbols subsequent to the first DMRS symbol and to one or more subcarriers of the first subset of subcarriers. In some such implementations, the first set of DMRSs may be associated with an antenna port having a lowest index of a plurality of antenna ports configured to receive DMRSs at UE 1300. Additionally or alternatively, the one or more symbols subsequent to the first DMRS symbol may also be subsequent to the second DMRS symbol. Alternatively, the one or more symbols subsequent to the first DMRS symbol may include a first set of symbols between the first DMRS symbol and the second DMRS symbol and a second set of symbols subsequent to the second DMRS symbol. Additionally or alternatively, performing the channel and phase noise estimation may include interpolating a phase between resource elements of the first set of DMRSs and the second set of DMRSs. Additionally or alternatively, the multiple DMRSs and the PTRS may be associated with a PDSCH between the UE and the network entity. Alternatively, the multiple DMRSs and the PTRS may be associated with a PSSCH between the UE and the second UE.

In some implementations in which the PTRS is allocated to one or more symbols subsequent to the first DMRS symbol and to one or more subcarriers of the first subset of subcarriers, the PTRS may include a NZP PTRS allocated to a first subset of the one or more symbols and a ZP PTRS allocated to a second subset of the one or more symbols. In some such implementations, the first subset of the one or more symbols and the second subset of the one or more symbols may be fixed across the one or more of the first subset of subcarriers. Additionally or alternatively, the multiple DMRSs and the PTRS may be associated with a PDSCH between the UE and the network entity.

In some implementations in which the PTRS is allocated to one or more symbols subsequent to the first DMRS symbol and to one or more subcarriers of the first subset of subcarriers, the PTRS may include a NZP PTRS allocated to a first subset of the one or more symbols and a ZP PTRS allocated to a second subset of the one or more symbols, and the multiple DMRSs and the PTRS may be associated with a PSSCH between the UE and the second UE. In some such implementations, the first subset of the one or more symbols and the second subset of the one or more symbols may be fixed across the one or more of the first subset of subcarriers.

In some implementations, the PTRS may be optionally allocated to a first set of symbols between the first DMRS symbol and the second DMRS symbol and to one or more subcarriers of the first subset of subcarriers and may be allocated to a second set of symbols subsequent to the second DMRS symbol and to one or more subcarriers of the second subset of subcarriers. In some such implementations, the PTRS is not allocated to the first set of symbols and to the one or more subcarriers of the first subset of subcarriers. In some other implementations, the PTRS is allocated to the first set of symbols and to the one or more subcarriers of the first subset of subcarriers. Additionally or alternatively, process 1100 may further include receiving, from the network entity or the second UE, a first higher layer parameter associated with the first set of DMRSs and a second higher layer parameter associated with the second set of DMRSs. The first higher layer parameter may indicate an offset of the first set of symbols, and the second higher layer parameter may indicate an offset of the second set of symbols. Additionally or alternatively, an offset of the first set of symbols may be based on a first predetermined value stored at a memory of UE 1300, and an offset of the second set of symbols may be based on a second predetermined value stored at the memory. In some such implementations, process 1100 further includes selecting the first predetermined value and the second predetermined value from a plurality of predetermined values stored at the memory based on a configuration of the multiple DMRSs, one or more combs used to communicate the multiple DMRSs, or both. Additionally or alternatively, the first set of symbols and the second set of symbols may not include one or more symbols allocated to a DC tone. Additionally or alternatively, the multiple DMRSs and the PTRS may be associated with a PDSCH between UE 1300 and the network entity. In some other implementations, the multiple DMRSs and the PTRS are associated with a PSSCH between UE 300 and the second UE.

In some implementations in which the PTRS is optionally allocated to a first set of symbols between the first DMRS symbol and the second DMRS symbol and to one or more subcarriers of the first subset of subcarriers and is allocated to a second set of symbols subsequent to the second DMRS symbol and to one or more subcarriers of the second subset of subcarriers, the PTRS may include a NZP PTRS allocated to a first subset of the first set of symbols and a first subset of the second set of symbols and a ZP PTRS allocated to a second subset of the first set of symbols and a second subset of the second set of symbols. In some such implementations, the first subset of the first set of symbols and the second subset of the first set of symbols may be associated with one or more of the first subset of subcarriers, and the first subset of the second set of symbols and the second subset of the second set of symbols may be associated with the second subset of subcarriers. In some such implementations, process 1100 further includes receiving DCI from the network entity. The DCI may include a field indicating that the ZP PTRS is associated with multiple subsets of subcarriers. In some such implementations, the field includes a single bit. Additionally or alternatively, the DCI may indicate an offset of the second subset of the first set of symbols, an offset of the second subset of the second set of symbols, or both. Alternative to receiving the DCI, an offset of the second subset of the first set of symbols, an offset of the second subset of the second set of symbols, or both, may be based on one or more predefined values stored at a memory of UE 1300. Additionally or alternatively, the multiple DMRSs and the PTRS may be associated with a PDSCH between the UE and the network entity.

In some implementations in which the PTRS is optionally allocated to a first set of symbols between the first DMRS symbol and the second DMRS symbol and to one or more subcarriers of the first subset of subcarriers and is allocated to a second set of symbols subsequent to the second DMRS symbol and to one or more subcarriers of the second subset of subcarriers, the PTRS may include a NZP PTRS allocated to a first subset of the first set of symbols and a first subset of the second set of symbols and a ZP PTRS allocated to a second subset of the first set of symbols and a second subset of the second set of symbols. The multiple DMRSs and the PTRS may be associated with a PSSCH between UE 1300 and the second UE. In some such implementations, the first subset of the first set of symbols and the second subset of the first set of symbols may be associated with one or more of the first subset of subcarriers, and the first subset of the second set of symbols and the second subset of the second set of symbols may be associated with the second subset of subcarriers. Additionally or alternatively, process 1100 may further include receiving SCI-1 from the second UE. The SCI-1 may include a field indicating that the ZP PTRS is associated with multiple subsets of subcarriers. In some such implementations, the field includes a single bit. Additionally or alternatively, the SCI-1 may indicate an offset of the second subset of the first set of symbols, an offset of the second subset of the second set of symbols, or both. Alternatively to receiving the SCI-1, process 1100 may further include receiving DCI from the network entity. The DCI may include a field indicating that the ZP PTRS is associated with multiple subsets of subcarriers. In some such implementations, the field includes a single bit. Additionally or alternatively, the DCI may indicate an offset of the second subset of the first set of symbols, an offset of the second subset of the second set of symbols, or both. Alternatively to receiving the SCI-1 or the DCI, an offset of the second subset of the first set of symbols, an offset of the second subset of the second set of symbols, or both, may be based on one or more predefined values stored at a memory of UE 1300.

In some implementations, the PTRS may be allocated to one or more symbols subsequent to the second DMRS symbol and to one or more subcarriers of the second subset of subcarriers. In some such implementations, the first set of DMRSs may be associated with an antenna port having a lower index than an antenna port associated with the second set of DMRSs. Alternatively, the second set of DMRSs may be associated with an antenna port having a lowest index of a plurality of antenna ports configured to receive DMRSs at the UE. Additionally or alternatively, performing the channel estimation may include interpolating a phase between resource elements of the first set of DMRSs and the second set of DMRSs. Additionally or alternatively, the multiple DMRSs and the PTRS may be associated with a PDSCH between UE 1300 and the network entity. Additionally or alternatively, the PTRS may include a NZP PTRS allocated to a first subset of the one or more symbols and a ZP PTRS allocated to a second subset of the one or more symbols. In some such implementations, the first subset of the one or more symbols and the second subset of the one or more symbols may be fixed across the one or more of the second subset of subcarriers. Additionally or alternatively, the multiple DMRSs and the PTRS may be associated with a PDSCH between UE 1300 and the network entity.

FIG. 12 illustrates a flow chart of process 1200. As illustrated at block 1202, UE 1300 transmits, to a network entity, multiple DMRSs including a first set of DMRSs allocated to a first DMRS symbol and a first subset of subcarriers and a second set of DMRSs allocated to a second DMRS symbol and a second subset of subcarriers. As an example of block 1202, UE 1300 may transmit multiple DMRSs using wireless radios 1301a-r and antennas 252a-r, and using transmit logic 1304. For example, UE 1300 may execute, under control of controller/processor 280, transmit logic 1304 stored in memory 282. The execution environment of transmit logic 1304 provides the functionality to transmit, to a network entity, multiple DMRSs including a first set of DMRSs allocated to a first DMRS symbol and a first subset of subcarriers and a second set of DMRSs allocated to a second DMRS symbol and a second subset of subcarriers.

At block 1204, UE 1300 transmits, to the network entity, a PTRS associated with the multiple DMRSs. As an example of block 1204, UE 1300 may transmit a PTRS using wireless radios 1301a-r and antennas 252a-r, and using transmit logic 1304. For example, UE 1300 may execute, under control of controller/processor 280, transmit logic 1304 stored in memory 282. The execution environment of transmit logic 1304 provides the functionality to transmit, to the network entity, a PTRS associated with the multiple DMRSs.

At block 1206, UE 1300 receives a channel estimation from the network entity. The channel estimation may be based on the multiple DMRSs and the PTRS. To illustrate, UE 1300 may receive a channel estimation using wireless radios 1301a-r and antennas 252a-r, and receive logic 1302.

To further illustrate, UE 1300 may execute, under control of controller/processor 280, receive logic 1302 stored in memory 282. The execution environment of receive logic 1302 provides the functionality to receive a channel estimation from the network entity. The channel estimation may be based on the multiple DMRSs and the PTRS.

In some implementations, the multiple DMRSs and the PTRS are associated with a PUSCH between UE 1300 and the network entity. Additionally or alternatively, the first set of DMRSs may be associated with a first antenna port, and the second set of DMRSs may be associated with a second antenna port. In some such implementations, the first antenna port may be included in a first CDM group configured for UE 1300, and the second antenna port may be included in a second CDM group configured for UE 1300.

In some implementations, the first DMRS symbol and the second DMRS symbol are consecutive symbols. In some other implementations, the first DMRS symbol and the second DMRS symbol are non-consecutive symbols.

In some implementations, process 1200 further includes allocating the PTRS to one or more symbols subsequent to the first DMRS symbol and to one or more subcarriers of the first subset of subcarriers. In some such implementations, the one or more symbols subsequent to the first DMRS symbol may also be subsequent to the second DMRS symbol. Alternatively, the one or more symbols subsequent to the first DMRS symbol may include a first set of symbols between the first DMRS symbol and the second DMRS symbol and a second set of symbols subsequent to the second DMRS symbol.

In some implementations, process 1200 further includes optionally allocating the PTRS to a first set of symbols between the first DMRS symbol and the second DMRS symbol and to one or more subcarriers of the first subset of subcarriers and allocating the PTRS to a second set of symbols subsequent to the second DMRS symbol and to one or more subcarriers of the second subset of subcarriers. In some such implementations, process 1200 also includes transmitting, to the network entity, a first higher layer parameter associated with the first set of DMRSs and a second higher layer parameter associated with the second set of DMRSs. The first higher layer parameter may indicate an offset of the first set of symbols, and wherein the second higher layer parameter may indicate an offset of the second set of symbols. Alternatively, an offset of the first set of symbols may be based on a first predetermined value stored at a memory of the UE, and an offset of the second set of symbols may be based on a second predetermined value stored at the memory. In some such implementations, process 1200 also includes selecting the first predetermined value and the second predetermined value from a plurality of predetermined values stored at the memory based on a configuration of the multiple DMRSs, one or more combs used to communicate the multiple DMRSs, or both. Additionally or alternatively, the first set of symbols and the second set of symbols may not include one or more symbols allocated to a DC tone.

In some implementations, process 1200 further includes allocating the PTRS to one or more symbols subsequent to the second DMRS symbol and to one or more subcarriers of the second subset of sub carriers. In some such implementations, the first set of DMRSs may be associated with an antenna port having a lower index than an antenna port associated with the second set of DMRSs. Alternatively, the second set of DMRSs may be associated with an antenna port having a lowest index of a plurality of antenna ports configured to receive DMRSs at UE 1300.

Figures 14, 15:
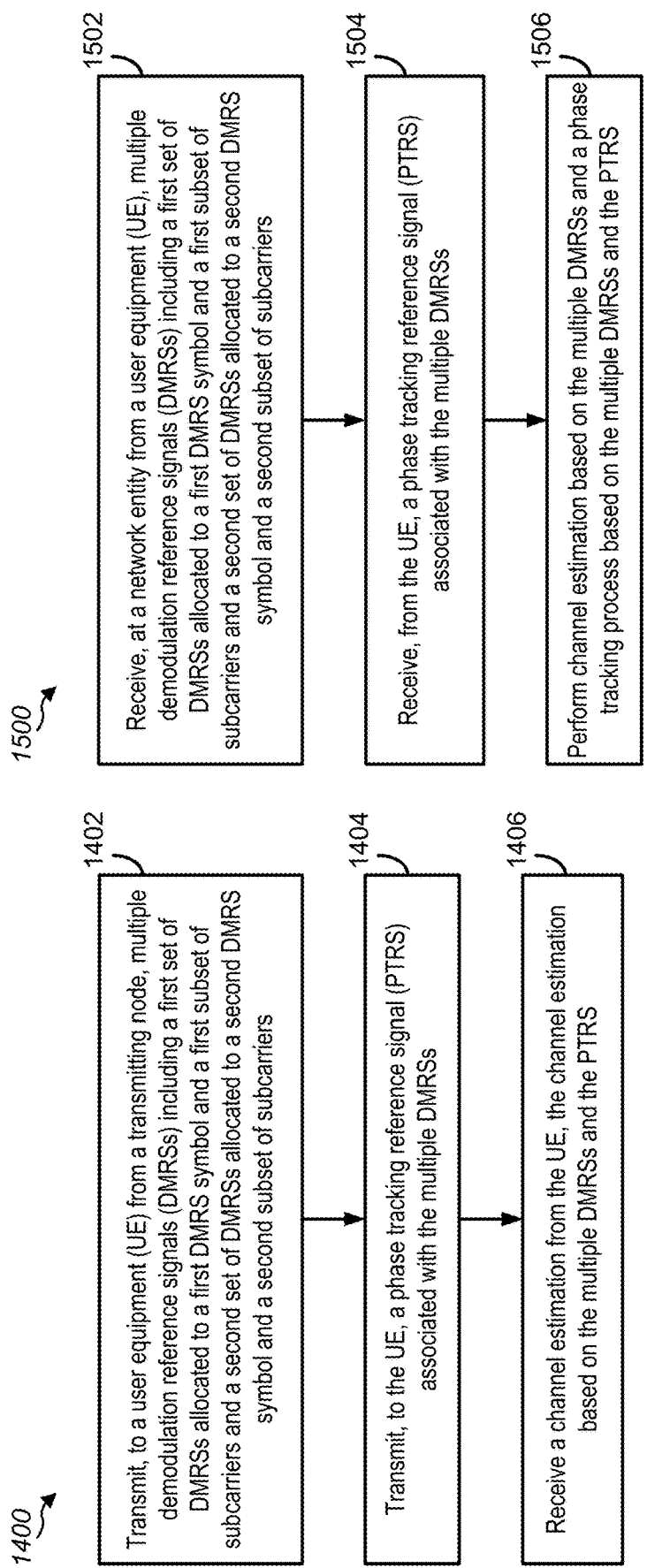
FIG. 14 is a flow diagram illustrating an example process of transmitting node operations for transmitting multiple DMRSs and a PTRS aligned with at least one of the multiple DMRSs according to some aspects.
FIG. 15 is a flow diagram illustrating an example process of network entity operations for receiving multiple DMRSs and a PTRS aligned with at least one of the multiple DMRSs according to some aspects.

FIGS. 14-15 are flow diagrams illustrating example processes performed by a transmitting node, such as a network entity or a UE, according to some aspects. FIG. 14 illustrates an example process 1400 of transmitting node operations for transmitting multiple DMRSs and a PTRS aligned with at least one of the multiple DMRSs according to some aspects. FIG. 15 illustrates an example process 1500 of network entity operations for receiving multiple DMRSs and a PTRS aligned with at least one of the multiple DMRSs according to some aspects. In some implementations, any of processes 1400-1500 may be performed by transmitting node 550 of FIG. 5, network entity 650 of FIG. 6, or a transmitting node as described with reference to FIG. 16. In some other implementations, any of processes 1400-1500 may be performed by an apparatus configured for wireless communication. For example, the apparatus may include at least one processor, and a memory coupled to the processor. The processor may be configured to perform operations of any of the processes 1400-1500. In some other implementations, any of the processes 1400-1500 may be performed or executed using a non-transitory computer-readable medium having program code recorded thereon. The program code may be program code executable by a computer for causing the computer to perform operations of any of the processes 1400-1500.

Example blocks of the processes 1400-1500 will also be described with respect to a transmitting node 1600 as illustrated in FIG. 16. FIG. 16 is a block diagram illustrating an example of transmitting node 1600 configured to transmit or receive multiple DMRSs and a PTRS aligned with at least one of the multiple DMRSs according to some aspects. Transmitting node 1600 may include base station 105 of FIGS. 1-2, transmitting node 550 of FIG. 5, network entity 650 of FIG. 6, a network, or a core network, as illustrative, non-limiting examples. Transmitting node 1600 includes the structure, hardware, and components as illustrated for base station 105 of FIGS. 1 and 2, transmitting node 550 of FIG. 5, network entity 650 of FIG. 6, or a combination thereof. For example, transmitting node 1600 may include controller/processor 240, which operates to execute logic or computer instructions stored in memory 242, as well as controlling the components of transmitting node 1600 that provide the features and functionality of transmitting node 1600. Transmitting node 1600, under control of controller/processor 240, transmits and receives signals via wireless radios 1601*a-t* and antennas 234*a-t*. Wireless radios 1601*a-t* include various components and hardware, as illustrated in FIG. 2 for transmitting node 550 or network entity 650 (such as base station 105), including modulator/demodulators 232*a-t*, transmit processor 220, TX MIMO processor 230, MIMO detector 236, and receive processor 238.

As shown, memory 242 may include transmit logic 1602, receive logic 1603, and channel estimation logic 1604. Transmit logic 1602 may be configured to initiate transmission of information or signals to a UE, such as multiple DMRSs and a PTRS. Receive logic 1603 may be configured to receive information or signals from the UE, such as multiple DMRSs and a PTRS. Channel estimation logic 1604 may be configured to determine a channel estimation based on the multiple DMRSs and the PTRS. Transmitting node 1600 may receive signals from or transmit signals to one or more UEs, such as UE 115 of FIGS. 1-2, 5 and 6 or UE 1300 of FIG. 13.

Returning to process 1400 described with reference to FIG. 14, as illustrated at block 1402, transmitting node 1600 transmits, to a UE, multiple DMRSs including a first set of DMRSs allocated to a first DMRS symbol and a first subset of subcarriers and a second set of DMRSs allocated to a second DMRS symbol and a second subset of subcarriers. To illustrate, transmitting node 1600 may transmit multiple DMRSs using wireless radios 1601*a-t* and antennas 234*a-t*, and transmit logic 1602. To further illustrate, transmitting node 1600 may execute, under control of controller/processor 240, transmit logic 1602 stored in memory 242. The execution environment of transmit logic 1602 provides the functionality to transmit, to a UE, multiple DMRSs including a first set of DMRSs allocated to a first DMRS symbol and a first subset of subcarriers and a second set of DMRSs allocated to a second DMRS symbol and a second subset of subcarriers.

At block 1404, transmitting node 1600 transmits, to the UE, a PTRS associated with the multiple DMRSs. To illustrate, transmitting node 1600 may transmit a PTRS using wireless radios 1601*a-t* and antennas 234*a-t*, and transmit logic 1602. To further illustrate, transmitting node 1600 may execute, under control of controller/processor 240, transmit logic 1602 stored in memory 242. The execution environment of transmit logic 1602 provides the functionality to transmit, to the UE, a PTRS associated with the multiple DMRSs.

At block 1406, transmitting node 1600 receives a channel estimation from the UE. The channel estimation may be based on the multiple DMRSs and the PTRS. To illustrate, transmitting node 1600 may receive a channel estimation using wireless radios 1601*a-t* and antennas 234*a-t*, and receive logic 1603. To further illustrate, transmitting node 1600 may execute, under control of controller/processor 240, receive logic 1603 stored in memory 242. The execution environment of receive logic 1603 provides the functionality to receive a channel estimation from the UE. The channel estimation may be based on the multiple DMRSs and the PTRS.

In some implementations, the first set of DMRSs is associated with a first antenna port, and the second set of DMRSs is associated with a second antenna port. In some such implementations, the first antenna port may be included in a first CDM group configured for the UE, and the second antenna port may be included in a second CDM group configured for the UE. Additionally or alternatively, process 1400 may further include transmitting an indication to the UE. The indication may be to combine the first antenna port and the second antenna port into a single virtual port for performing the channel estimation.

In some implementations, the first DMRS symbol and the second DMRS symbol are consecutive symbols. In some other implementations, the first DMRS symbol and the second DMRS symbol are non-consecutive symbols.

In some implementations, process 1400 further includes allocating the PTRS to one or more symbols subsequent to the first DMRS symbol and to one or more subcarriers of the first subset of subcarriers. In some such implementations, the first set of DMRSs may be associated with an antenna port having a lowest index of a plurality of antenna ports configured to receive DMRSs at the UE. Additionally or alternatively, the one or more symbols subsequent to the first DMRS symbol may also be subsequent to the second DMRS symbol. Alternatively, the one or more symbols subsequent to the first DMRS symbol may include a first set of symbols between the first DMRS symbol and the second DMRS symbol and a second set of symbols subsequent to the second DMRS symbol. Additionally or alternatively, transmitting node 1600 may include a network entity, and the multiple DMRSs and the PTRS may be associated with a PDSCH between the network entity and the UE. Alternatively, transmitting node 1600 may include a second UE, and the multiple DMRSs and the PTRS may be associated with a PSSCH between the second UE and the UE.

In some implementations in which process 1400 further includes allocating the PTRS to one or more symbols subsequent to the first DMRS symbol and to one or more subcarriers of the first subset of subcarriers, the PTRS may include a NZP PTRS allocated to a first subset of the one or more symbols and a ZP PTRS allocated to a second subset of the one or more symbols. In some such implementations, the first subset of the one or more symbols and the second subset of the one or more symbols may be fixed across the one or more of the first subset of subcarriers. Additionally or alternatively, transmitting node 1600 may include a network entity, and the multiple DMRSs and the PTRS may be associated with a PDSCH between the network entity and the UE.

In some implementations in which process 1400 further includes allocating the PTRS to one or more symbols subsequent to the first DMRS symbol and to one or more subcarriers of the first subset of subcarriers, transmitting node 1600 may include a second UE, the PTRS may include a NZP PTRS allocated to a first subset of the one or more symbols and a ZP PTRS allocated to a second subset of the one or more symbols, and the multiple DMRSs and the PTRS may be associated with a PSSCH between second UE and the UE. In some such implementations, the first subset of the one or more symbols and the second subset of the one or more symbols may be fixed across the one or more of the first subset of subcarriers.

In some implementations, process 1400 further includes optionally allocating the PTRS to a first set of symbols between the first DMRS symbol and the second DMRS symbol and to one or more subcarriers of the first subset of subcarriers and allocating the PTRS to a second set of symbols subsequent to the second DMRS symbol and to one or more subcarriers of the second subset of subcarriers. In some such implementations, the PTRS may not be not allocated to the first set of symbols and to the one or more subcarriers of the first subset of subcarriers. Alternatively, the PTRS may be allocated to the first set of symbols and to the one or more subcarriers of the first subset of subcarriers. Additionally or alternatively, process 1400 may also include transmitting, to the UE, a first higher layer parameter associated with the first set of DMRSs and a second higher layer parameter associated with the second set of DMRSs. The first higher layer parameter may indicate an offset of the first set of symbols, and the second higher layer parameter may indicate an offset of the second set of symbols. Alternatively, an offset of the first set of symbols may be based on a first predetermined value stored at a memory of transmitting node 1600, and an offset of the second set of symbols may be based on a second predetermined value stored at the memory. In some such implementations, the memory may be configured to store a plurality of predetermined values corresponding to one or more configurations of the multiple DMRSs, one or more combs used to communicate the multiple DMRSs, or both. Additionally or alternatively, the first set of symbols and the second set of symbols may not include one or more symbols allocated to a DC tone. Additionally or alternatively, transmitting node 1600 may include a network entity, and the multiple DMRSs and the PTRS may be associated with a PDSCH between the network entity and the UE. Alternatively, transmitting node 1600 may include a second UE, and the multiple DMRSs and the PTRS may be associated with a PSSCH between the second UE and the UE.

In some implementations in which process 1400 further includes optionally allocating the PTRS to a first set of symbols between the first DMRS symbol and the second DMRS symbol and to one or more subcarriers of the first subset of subcarriers and allocating the PTRS to a second set of symbols subsequent to the second DMRS symbol and to one or more subcarriers of the second subset of subcarriers, the PTRS may include a NZP PTRS allocated to a first subset of the first set of symbols and a first subset of the second set of symbols and a ZP PTRS allocated to a second subset of the first set of symbols and a second subset of the second set of symbols. In some such implementations, the first subset of the first set of symbols and the second subset of the first set of symbols may be associated with one or more of the first subset of subcarriers, and the first subset of the second set of symbols and the second subset of the second set of symbols may be associated with the second subset of subcarriers. Additionally or alternatively, process 1400 may also include transmitting DCI to the UE. The DCI may include a field indicating that the ZP PTRS is associated with multiple subsets of subcarriers, and transmitting node 1600 may include a network entity. In some such implementations, the field may include a single bit. Additionally or alternatively, the DCI may indicate an offset of the second subset of the first set of symbols, an offset of the second subset of the second set of symbols, or both. Alternatively to receiving the DCI, an offset of the second subset of the first set of symbols, an offset of the second subset of the second set of symbols, or both, may be based on one or more predefined values stored at a memory of the transmitting node. Additionally or alternatively, the multiple DMRSs and the PTRS may be associated with a PDSCH between the network entity and the UE.

In some implementations in which process 1400 further includes optionally allocating the PTRS to a first set of symbols between the first DMRS symbol and the second DMRS symbol and to one or more subcarriers of the first subset of subcarriers and allocating the PTRS to a second set of symbols subsequent to the second DMRS symbol and to one or more subcarriers of the second subset of subcarriers, transmitting node 1600 may include a second UE, the PTRS may include a NZP PTRS allocated to a first subset of the first set of symbols and a first subset of the second set of symbols and a ZP PTRS allocated to a second subset of the first set of symbols and a second subset of the second set of symbols, and the multiple DMRSs and the PTRS may be associated with a PSSCH between the second UE and the UE. In some such implementations, the first subset of the first set of symbols and the second subset of the first set of symbols may be associated with one or more of the first subset of subcarriers, and the first subset of the second set of symbols and the second subset of the second set of symbols may be associated with the second subset of subcarriers. Additionally or alternatively, process 1400 may also include transmitting SCI-1 to the UE. The SCI-1 may include a field indicating that the ZP PTRS is associated with multiple subsets of subcarriers. In some such implementations, the field may include a single bit. Additionally or alternatively, the SCI-1 may indicate an offset of the second subset of the first set of symbols, an offset of the second subset of the second set of symbols, or both. Alternatively to receiving the SCI-1, an offset of the second subset of the first set of symbols, an offset of the second subset of the second set of symbols, or both, may be based on one or more predefined values stored at a memory of the transmitting node.

In some implementations in which process 1400 further includes optionally allocating the PTRS to a first set of symbols between the first DMRS symbol and the second DMRS symbol and to one or more subcarriers of the first subset of subcarriers and allocating the PTRS to a second set of symbols subsequent to the second DMRS symbol and to one or more subcarriers of the second subset of subcarriers, transmitting node 1600 may include a network entity, and process 1400 may further include transmitting DCI to the UE. The DCI may indicate that a ZP PTRS is associated with multiple subsets of subcarriers. In some such implementations, the DCI may indicate an offset of the ZP PTRS.

In some implementations, process 1400 further includes allocating the PTRS to one or more symbols subsequent to the second DMRS symbol and to one or more subcarriers of the second subset of subcarriers. In some such implementations, the first set of DMRSs may be associated with an antenna port having a lower index than an antenna port associated with the second set of DMRSs. Alternatively, the second set of DMRSs may be associated with an antenna port having a lowest index of a plurality of antenna ports configured to receive DMRSs at the UE. Additionally or alternatively, transmitting node 1600 may include a network entity, and the multiple DMRSs and the PTRS may be associated with a PDSCH between the network entity and the UE. Additionally or alternatively, the PTRS may include a NZP PTRS allocated to a first subset of the one or more symbols and a ZP PTRS allocated to a second subset of the one or more symbols. In some such implementations, the first subset of the one or more symbols and the second subset of the one or more symbols may be fixed across the one or more of the second subset of subcarriers. Additionally or alternatively, transmitting node 1600 may include a network entity, and the multiple DMRSs and the PTRS may be associated with a PDSCH between the network entity and the UE.

FIG. 15 illustrates a flow diagram of process 1500. As illustrated at block 1502, transmitting node 1600 receives, from a UE, multiple DMRSs including a first set of DMRSs allocated to a first DMRS symbol and a first subset of subcarriers and a second set of DMRSs allocated to a second DMRS symbol and a second subset of subcarriers. To illustrate, transmitting node 1600 may receive multiple DMRSs using wireless radios 1601*a-t* and antennas 234*a-t*. To further illustrate, transmitting node 1600 may execute, under control of controller/processor 240, receive logic 1603 stored in memory 242. The execution environment of receive logic 1603 provides the functionality to receive, from a UE, multiple DMRSs including a first set of DMRSs allocated to a first DMRS symbol and a first subset of subcarriers and a second set of DMRSs allocated to a second DMRS symbol and a second subset of subcarriers.

At block 1504, transmitting node 1600 receives, from the UE, a PTRS associated with the multiple DMRSs. To illustrate, transmitting node 1600 may receive a PTRS using wireless radios 1601*a-t* and antennas 234*a-t*. To further illustrate, transmitting node 1600 may execute, under control of controller/processor 240, receive logic 1603 stored in memory 242. The execution environment of receive logic 1603 provides the functionality to receive, from the UE, a PTRS associated with the multiple DMRSs.

At block 1506, transmitting node 1600 performs channel estimation based on the multiple DMRSs and a phase tracking process based on the multiple DMRSs and the PTRS. As an example of block 1506, transmitting node 1600 may execute, under control of controller/processor 240, channel estimation logic 1604 stored in memory 242. The execution environment of channel estimation logic 1604 provides the functionality to perform channel estimation based on the multiple DMRSs and a phase tracking process based on the multiple DMRSs and the PTRS.

In some implementations, the multiple DMRSs and the PTRS are associated with a PUSCH between the network entity and the UE. Additionally or alternatively, the first set of DMRSs may be associated with a first antenna port, and the second set of DMRSs may be associated with a second antenna port. In some such implementations, the first antenna port may be included in a first CDM group configured for the UE, and the second antenna port may be included in a second CDM group configured for the UE.

In some implementations, the first DMRS symbol and the second DMRS symbol are consecutive symbols. In some other implementations, the first DMRS symbol and the second DMRS symbol are non-consecutive symbols.

In some implementations, the PTRS is allocated to one or more symbols subsequent to the first DMRS symbol and to one or more subcarriers of the first subset of subcarriers. In some such implementations, the one or more symbols subsequent to the first DMRS symbol may also be subsequent to the second DMRS symbol. Alternatively, the one or more symbols subsequent to the first DMRS symbol may include a first set of symbols between the first DMRS symbol and the second DMRS symbol and a second set of symbols subsequent to the second DMRS symbol.

In some implementations, the PTRS may be optionally allocated to a first set of symbols between the first DMRS symbol and the second DMRS symbol and to one or more subcarriers of the first subset of subcarriers and may be allocated to a second set of symbols subsequent to the second DMRS symbol and to one or more subcarriers of the second subset of subcarriers. In some such implementations, process 1500 may also include receiving, from the UE, a first higher layer parameter associated with the first set of DMRSs and a second higher layer parameter associated with the second set of DMRSs. The first higher layer parameter may indicate an offset of the first set of symbols, and the second higher layer parameter may indicate an offset of the second set of symbols. Alternatively, an offset of the first set of symbols may be based on a first predetermined value stored at a memory of the UE, and an offset of the second set of symbols may be based on a second predetermined value stored at the memory. Additionally or alternatively, the first set of symbols and the second set of symbols may not include one or more symbols allocated to a DC tone.

In some implementations, the PTRS is allocated to one or more symbols subsequent to the second DMRS symbol and to one or more subcarriers of the second subset of subcarriers. In some such implementations, the first set of DMRSs may be associated with an antenna port having a lower index than an antenna port associated with the second set of DMRSs. Alternatively, the second set of DMRSs may be associated with an antenna port having a lowest index of a plurality of antenna ports configured to receive DMRSs at the UE.

It is noted that one or more blocks (or operations) described with reference to FIGS. 11, 12, 14, and 15 may be combined with one or more blocks (or operations) of another figure. For example, one or more blocks (or operations) of FIG. 11 may be combined with one or more blocks (or operations) FIG. 12. As another example, one or more blocks of FIG. 11, 12, 14, or 15 may be combined with one or more blocks (or operations) of another of FIG. 2, 5, or 6. Additionally, or alternatively, one or more operations described above with reference to FIGS. 1-15 may be combined with one or more operations described with reference to FIG. 16.

In some aspects, techniques for enabling alignment of a PTRS to DMRSs allocated to different symbols may include additional aspects, such as any single aspect or any combination of aspects described below and/or in connection with one or more other processes or devices described elsewhere herein. In some aspects, enabling alignment of a PTRS to DMRSs allocated to different symbols may include an apparatus receiving, from a network entity or a second UE, multiple DMRSs including a first set of DMRSs allocated to a first DMRS symbol and a first subset of subcarriers and a second set of DMRSs allocated to a second DMRS symbol and a second subset of subcarriers. The apparatus may also receive, from the network entity or the second UE, a PTRS associated with the multiple DMRSs. The apparatus may also performing channel and phase noise estimation based on the multiple DMRSs and the PTRS. In some implementations, the apparatus includes a wireless device, such as a UE. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein.

In a first aspect, the first set of DMRSs is associated with a first antenna port, and the second set of DMRSs is associated with a second antenna port.

In a second aspect, in combination with the first aspect, the first antenna port is included in a first CDM group configured for the apparatus and the second antenna port is included in a second CDM group configured for the apparatus.

In a third aspect, alone or in combination with one or more of the first through second aspects, the apparatus combines the first antenna port and the second antenna port into a single virtual port. The channel and phase noise estimation is performed using the single virtual port.

In a fourth aspect, alone or in combination with one or more of the first through third aspects, the first DMRS symbol and the second DMRS symbol are consecutive symbols.

In a fifth aspect, alone or in combination with one or more of the first through third aspects, the first DMRS symbol and the second DMRS symbol are non-consecutive symbols.

In a sixth aspect, alone or in combination with one or more of the first through fifth aspects, the PTRS is allocated to one or more symbols subsequent to the first DMRS symbol and to one or more subcarriers of the first subset of subcarriers.

In a seventh aspect, in combination with the sixth aspect, the first set of DMRSs is associated with an antenna port having a lowest index of a plurality of antenna ports configured to receive DMRSs at the apparatus.

In an eighth aspect, alone or in combination with one or more of the sixth through seventh aspects, the one or more symbols subsequent to the first DMRS symbol are also subsequent to the second DMRS symbol.

In a ninth aspect, alone or in combination with one or more of the sixth through seventh aspects, the one or more symbols subsequent to the first DMRS symbol include a first set of symbols between the first DMRS symbol and the second DMRS symbol and a second set of symbols subsequent to the second DMRS symbol.

In a tenth aspect, alone or in combination with one or more of the sixth through ninth aspects, performing the channel and phase noise estimation includes interpolating a phase between resource elements of the first set of DMRSs and the second set of DMRSs.

In an eleventh aspect, alone or in combination with one or more of the sixth through tenth aspects, the multiple DMRSs and the PTRS are associated with a PDSCH between the apparatus and the network entity.

In a twelfth aspect, alone or in combination with one or more of the sixth through tenth aspects, the multiple DMRSs and the PTRS are associated with a PSSCH between the apparatus and the second UE.

In a thirteenth aspect, alone or in combination with one or more of the sixth through twelfth aspects, the PTRS includes a NZP PTRS allocated to a first subset of the one or more symbols and a ZP PTRS allocated to a second subset of the one or more symbols.

In a fourteenth aspect, in combination with the thirteenth aspect, the first subset of the one or more symbols and the second subset of the one or more symbols are fixed across the one or more of the first subset of subcarriers.

In a fifteenth aspect, alone or in combination with one or more of the thirteenth through fourteenth aspects, the multiple DMRSs and the PTRS are associated with a PDSCH between the apparatus and the network entity.

In a sixteenth aspect, alone or in combination with one or more of the sixth through twelfth aspects, the PTRS includes a NZP PTRS allocated to a first subset of the one or more symbols and a ZP PTRS allocated to a second subset of the one or more symbols, and the multiple DMRSs and the PTRS are associated with a PSSCH between the apparatus and the second UE.

In a seventeenth aspect, in combination with the sixteenth aspect, the first subset of the one or more symbols and the second subset of the one or more symbols are fixed across the one or more of the first subset of subcarriers.

In an eighteenth aspect, alone or in combination with one or more of the first through fifth aspects, the PTRS is optionally allocated to a first set of symbols between the first DMRS symbol and the second DMRS symbol and to one or more subcarriers of the first subset of subcarriers and allocated to a second set of symbols subsequent to the second DMRS symbol and to one or more subcarriers of the second subset of subcarriers.

In a nineteenth aspect, in combination with the eighteenth aspect, the PTRS is not allocated to the first set of symbols and to the one or more subcarriers of the first subset of subcarriers.

In a twentieth aspect, in combination with the eighteenth aspect, the PTRS is allocated to the first set of symbols and to the one or more subcarriers of the first subset of subcarriers.

In a twenty-first aspect, alone or in combination with one or more of the eighteenth through twentieth aspects, the apparatus receives, from the network entity or the second UE, a first higher layer parameter associated with the first set of DMRSs and a second higher layer parameter associated with the second set of DMRSs. The first higher layer parameter indicates an offset of the first set of symbols, and the second higher layer parameter indicates an offset of the second set of symbols.

In a twenty-second aspect, alone or in combination with one or more of the eighteenth through twentieth aspects, an offset of the first set of symbols is based on a first predetermined value stored at a memory of the apparatus, and an offset of the second set of symbols is based on a second predetermined value stored at the memory.

In a twenty-third aspect, in combination with the twenty-second aspect, the apparatus selects the first predetermined value and the second predetermined value from a plurality of predetermined values stored at the memory based on a configuration of the multiple DMRSs, one or more combs used to communicate the multiple DMRSs, or both.

In a twenty-fourth aspect, alone or in combination with one or more of the eighteenth through twenty-third aspects, the first set of symbols and the second set of symbols do not include one or more symbols allocated to a DC tone.

In a twenty-fifth aspect, alone or in combination with one or more of the eighteenth through twenty-fourth aspects, the multiple DMRSs and the PTRS are associated with a PDSCH between the apparatus and the network entity.

In a twenty-sixth aspect, alone or in combination with one or more of the eighteenth through twenty-fourth aspects, the multiple DMRSs and the PTRS are associated with a PSSCH between the apparatus and the second UE.

In a twenty-seventh aspect, alone or in combination with one or more of the eighteenth through twenty-sixth aspects, the PTRS includes a NZP PTRS allocated to a first subset of the first set of symbols and a first subset of the second set of symbols and a ZP PTRS allocated to a second subset of the first set of symbols and a second subset of the second set of symbols.

In a twenty-eighth aspect, in combination with the twenty-seventh aspect, the first subset of the first set of symbols and the second subset of the first set of symbols are associated with one or more of the first subset of subcarriers, and the first subset of the second set of symbols and the second subset of the second set of symbols are associated with the second subset of subcarriers.

In a twenty-ninth aspect, in combination with the twenty-eighth aspect, the apparatus receives DCI from the network entity. The DCI includes a field indicating that the ZP PTRS is associated with multiple subsets of subcarriers.

In a thirtieth aspect, in combination with the twenty-ninth aspect, the field comprises a single bit.

In a thirty-first aspect, alone or in combination with one or more of the twenty-ninth through thirtieth aspects, the DCI indicates an offset of the second subset of the first set of symbols, an offset of the second subset of the second set of symbols, or both.

In a thirty-second aspect, in combination with the twenty-eighth aspect, an offset of the second subset of the first set of symbols, an offset of the second subset of the second set of symbols, or both, are based on one or more predefined values stored at a memory of the apparatus.

In a thirty-third aspect, alone or in combination with one or more of the twenty-eighth through thirty-second aspects, the multiple DMRSs and the PTRS are associated with a PDSCH between the apparatus and the network entity.

In a thirty-fourth aspect, alone or in combination with one or more of the eighteenth through twenty-sixth aspects, the PTRS includes a NZP) PTRS allocated to a first subset of the first set of symbols and a first subset of the second set of symbols and a ZP PTRS allocated to a second subset of the first set of symbols and a second subset of the second set of symbols. The multiple DMRSs and the PTRS are associated with a PSSCH between the apparatus and the second UE.

In a thirty-fifth aspect, in combination with the thirty-fourth aspect, the first subset of the first set of symbols and the second subset of the first set of symbols are associated with one or more of the first subset of subcarriers, and the first subset of the second set of symbols and the second subset of the second set of symbols are associated with the second subset of subcarriers.

In a thirty-sixth aspect, alone or in combination with one or more of the thirty-fourth through thirty-fifth aspects, the apparatus receives SCI-1 from the second UE. The SCI-1 includes a field indicating that the ZP PTRS is associated with multiple subsets of subcarriers.

In a thirty-seventh aspect, in combination with the thirty-sixth aspect, the field comprises a single bit.

In a thirty-eighth aspect, alone or in combination with one or more of the thirty-sixth through thirty-seventh aspects, the SCI-1 indicates an offset of the second subset of the first set of symbols, an offset of the second subset of the second set of symbols, or both.

In a thirty-ninth aspect, alone or in combination with one or more of the thirty-fourth through thirty-fifth aspects, the apparatus receives DCI from the network entity. The DCI includes a field indicating that the ZP PTRS is associated with multiple subsets of subcarriers.

In a fortieth aspect, in combination with the thirty-ninth aspect, the field comprises a single bit.

In a forty-first aspect, alone or in combination with one or more of the thirty-ninth through fortieth aspects, the DCI indicates an offset of the second subset of the first set of symbols, an offset of the second subset of the second set of symbols, or both.

In a forty-second aspect, alone or in combination with one or more of the thirty-fourth through thirty-fifth aspects, an offset of the second subset of the first set of symbols, an offset of the second subset of the second set of symbols, or both, are based on one or more predefined values stored at a memory of the apparatus.

In a forty-third aspect, alone or in combination with one or more of the first through fifth aspects, the PTRS is allocated to one or more symbols subsequent to the second DMRS symbol and to one or more subcarriers of the second subset of subcarriers.

In a forty-fourth aspect, in combination with the forty-third aspect, the first set of DMRSs is associated with an antenna port having a lower index than an antenna port associated with the second set of DMRSs.

In a forty-fifth aspect, in combination with the forty-third aspect, the second set of DMRSs is associated with an antenna port having a lowest index of a plurality of antenna ports configured to receive DMRSs at the apparatus.

In a forty-sixth aspect, alone or in combination with one or more of the forty-third through forty-fifth aspects, performing the channel estimation includes interpolating a phase between resource elements of the first set of DMRSs and the second set of DMRSs.

In a forty-seventh aspect, alone or in combination with one or more of the forty-third through forty-sixth aspects, the multiple DMRSs and the PTRS are associated with a PDSCH between the apparatus and the network entity.

In a forty-eighth aspect, alone or in combination with one or more of the forty-third through forty-seventh aspects, the PTRS includes a NZP PTRS allocated to a first subset of the one or more symbols and a ZP PTRS allocated to a second subset of the one or more symbols.

In a forty-ninth aspect, in combination with the forty-eighth aspect, the first subset of the one or more symbols and the second subset of the one or more symbols are fixed across the one or more of the second subset of subcarriers.

In a fiftieth aspect, alone or in combination with one or more of the forty-eighth through forty-ninth aspects, the multiple DMRSs and the PTRS are associated with a PDSCH between the apparatus and the network entity.

In some aspects, an apparatus configured for wireless communication, such as a UE, is configured to transmit, to a network entity, multiple DMRSs including a first set of DMRSs allocated to a first DMRS symbol and a first subset of subcarriers and a second set of DMRSs allocated to a second DMRS symbol and a second subset of subcarriers. The apparatus is also configured to transmit, to the network entity, a PTRS associated with the multiple DMRSs. The apparatus is also configured to receiving a channel estimation from the network entity. The channel estimation is based on the multiple DMRSs and the PTRS. In some implementations, the apparatus includes a wireless device, such as a UE. In some implementations, the apparatus may include at least one processor, and a memory coupled to the processor. The processor may be configured to perform operations described herein with respect to the wireless device. In some other implementations, the apparatus may include a non-transitory computer-readable medium having a program code recorded thereon and the program code may be executable by a computer for causing the computer to perform operations described herein with reference to the wireless device. In some implementations, the apparatus may include one or more means configured to perform operations described herein.

In fifty-first aspect, the multiple DMRSs and the PTRS are associated with a PUSCH between the apparatus and the network entity.

In a fifty-second aspect, alone or in combination with the fifty-first aspect, the first set of DMRSs is associated with a first antenna port, and wherein the second set of DMRSs is associated with a second antenna port.

In a fifty-third aspect, in combination with the fifty-second aspect, the first antenna port is included in a first CDM group configured for the apparatus, and wherein the second antenna port is included in a second CDM group configured for the apparatus.

In a fifty-fourth aspect, alone or in combination with one or more of the fifty-first through fifty-third aspects, the first DMRS symbol and the second DMRS symbol are consecutive symbols.

In a fifty-fifth aspect, alone or in combination with one or more of the fifty-first through fifty-third aspects, the first DMRS symbol and the second DMRS symbol are non-consecutive symbols.

In a fifty-sixth aspect, alone or in combination with one or more of the fifty-first through fifty-fifth aspects, the apparatus allocates the PTRS to one or more symbols subsequent to the first DMRS symbol and to one or more subcarriers of the first subset of subcarriers.

In a fifty-seventh aspect, in combination with the fifty-sixth aspect, the one or more symbols subsequent to the first DMRS symbol are also subsequent to the second DMRS symbol.

In a fifty-eighth aspect, in combination with the fifty-sixth aspect, the one or more symbols subsequent to the first DMRS symbol include a first set of symbols between the first DMRS symbol and the second DMRS symbol and a second set of symbols subsequent to the second DMRS symbol.

In a fifty-ninth aspect, alone or in combination with one or more of the fifty-first through fifty-fifth aspects, the apparatus optionally allocates the PTRS to a first set of symbols between the first DMRS symbol and the second DMRS symbol and to one or more subcarriers of the first subset of subcarriers and allocates the PTRS to a second set of symbols subsequent to the second DMRS symbol and to one or more sub carriers of the second subset of subcarriers.

In a sixtieth aspect, in combination with the fifty-ninth aspect, the apparatus transmits, to the network entity, a first higher layer parameter associated with the first set of DMRSs and a second higher layer parameter associated with the second set of DMRSs. The first higher layer parameter indicates an offset of the first set of symbols, and the second higher layer parameter indicates an offset of the second set of symbols.

In a sixty-first aspect, in combination with the fifty-ninth aspect, an offset of the first set of symbols is based on a first predetermined value stored at a memory of the apparatus, and an offset of the second set of symbols is based on a second predetermined value stored at the memory.

In a sixty-second aspect, in combination with the sixty-first aspect, the apparatus selects the first predetermined value and the second predetermined value from a plurality of predetermined values stored at the memory based on a configuration of the multiple DMRSs, one or more combs used to communicate the multiple DMRSs, or both.

In a sixty-third aspect, alone or in combination with one or more of the fifty-ninth through sixty-second aspects, the first set of symbols and the second set of symbols do not include one or more symbols allocated to DC tone.

In a sixty-fourth aspect, alone or in combination with one or more of the fifty-first through fifty-fifty aspects, the apparatus allocates the PTRS to one or more symbols subsequent to the second DMRS symbol and to one or more sub carriers of the second subset of subcarriers.

In a sixty-fifth aspect, in combination with the sixty-fourth aspect, the first set of DMRSs is associated with an antenna port having a lower index than an antenna port associated with the second set of DMRSs.

In a sixty-sixth aspect, in combination with the sixty-fourth aspect, the second set of DMRSs is associated with an antenna port having a lowest index of a plurality of antenna ports configured to receive DMRSs at the apparatus.

In some aspects, an apparatus configured for wireless communication, such as a transmitting node, is configured to transmit, to a UE, multiple DMRSs including a first set of DMRSs allocated to a first DMRS symbol and a first subset of subcarriers and a second set of DMRSs allocated to a second DMRS symbol and a second subset of subcarriers. The apparatus is also configured to transmit, to the UE, a PTRS associated with the multiple DMRSs. The apparatus is further configured to receive a channel estimation from the UE. The channel estimation is based on the multiple DMRSs and the PTRS. In some implementations, the apparatus includes a wireless device, such as a transmitting node, which may include or correspond to network entity or a second UE, as non-limiting examples. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein.

In a sixty-seventh aspect, the first set of DMRSs is associated with a first antenna port, and the second set of DMRSs is associated with a second antenna port.

In a sixty-eighth aspect, in combination with the sixty-seventh aspect, the first antenna port is included in a first CDM group configured for the UE, and the second antenna port is included in a second CDM group configured for the UE.

In a sixty-ninth aspect, alone or in combination with one or more of the sixty-seventh through sixty-eighth aspects, the apparatus transmits an indication to the UE. The indication is to combine the first antenna port and the second antenna port into a single virtual port for performing the channel estimation.

In a seventieth aspect, alone or in combination with one or more of the sixty-seventh through sixty-ninth aspects, the first DMRS symbol and the second DMRS symbol are consecutive symbols.

In a seventy-first aspect, alone or in combination with one or more of the sixty-seventh through sixty-ninth aspects, the first DMRS symbol and the second DMRS symbol are non-consecutive symbols.

In a seventy-second aspect, alone or in combination with one or more of the sixty-seventh through seventy-first aspects, the apparatus allocates the PTRS to one or more symbols subsequent to the first DMRS symbol and to one or more subcarriers of the first subset of subcarriers.

In a seventy-third aspect, in combination with the seventy-second aspect, the first set of DMRSs is associated with an antenna port having a lowest index of a plurality of antenna ports configured to receive DMRSs at the UE.

In a seventy-fourth aspect, alone or in combination with one or more of the seventy-second through seventy-third aspects, the one or more symbols subsequent to the first DMRS symbol are also subsequent to the second DMRS symbol.

In a seventy-fifth aspect, alone or in combination with one or more of the seventy-second through seventy-third aspects, the one or more symbols subsequent to the first DMRS symbol include a first set of symbols between the first DMRS symbol and the second DMRS symbol and a second set of symbols subsequent to the second DMRS symbol.

In a seventy-sixth aspect, alone or in combination with one or more of the seventy-second through seventy-fifth aspects, the apparatus comprises a network entity, and the multiple DMRSs and the PTRS are associated with a PDSCH between the network entity and the UE.

In a seventy-seventh aspect, alone or in combination with one or more of the seventy-second through seventy-fifth aspects, the apparatus comprises a second UE, and the multiple DMRSs and the PTRS are associated with a PSSCH between the second UE and the UE.

In a seventy-eighth aspect, alone or in combination with one or more of the seventy-second through seventy-seventh aspects, the PTRS includes a NZP PTRS allocated to a first subset of the one or more symbols and a ZP PTRS allocated to a second subset of the one or more symbols.

In a seventy-ninth aspect, in combination with the seventy-eighth aspect, the first subset of the one or more symbols and the second subset of the one or more symbols are fixed across the one or more of the first subset of subcarriers.

In an eightieth aspect, alone or in combination with one or more of the seventy-eighth through seventy-ninth aspects, the apparatus comprises a network entity, and the multiple DMRSs and the PTRS are associated with a PDSCH between the network entity and the UE.

In an eighty-first aspect, alone or in combination with one or more of the seventy-second through seventy-seventh aspects, the apparatus comprises a second UE, the PTRS includes a NZP PTRS allocated to a first subset of the one or more symbols and a ZP PTRS allocated to a second subset of the one or more symbols, and the multiple DMRSs and the PTRS are associated with a PSSCH between second UE and the UE.

In an eighty-second aspect, in combination with the eighty-first aspect, the first subset of the one or more symbols and the second subset of the one or more symbols are fixed across the one or more of the first subset of subcarriers.

In an eighty-third aspect, alone or in combination with one or more of the sixty-seventh through seventy-first aspects, the apparatus optionally allocates the PTRS to a first set of symbols between the first DMRS symbol and the second DMRS symbol and to one or more subcarriers of the first subset of subcarriers and allocates the PTRS to a second set of symbols subsequent to the second DMRS symbol and to one or more subcarriers of the second subset of subcarriers.

In an eighty-fourth aspect, in combination with the eighty-third aspect, the PTRS is not allocated to the first set of symbols and to the one or more subcarriers of the first subset of subcarriers.

In an eighty-fifth aspect, in combination with the eighty-third aspect, the PTRS is allocated to the first set of symbols and to the one or more subcarriers of the first subset of subcarriers.

In an eighty-sixth aspect, alone or in combination with one or more of the eighty-third through eighty-fifth aspects, the apparatus transmits, to the UE, a first higher layer parameter associated with the first set of DMRSs and a second higher layer parameter associated with the second set of DMRSs. The first higher layer parameter indicates an offset of the first set of symbols, and the second higher layer parameter indicates an offset of the second set of symbols.

In an eighty-seventh aspect, alone or in combination with one or more of the eighty-third through eighty-fifth aspects, an offset of the first set of symbols is based on a first predetermined value stored at a memory of the apparatus, and an offset of the second set of symbols is based on a second predetermined value stored at the memory.

In an eighty-eighth aspect, in combination with the eighty-seventh aspect, the memory is configured to store a plurality of predetermined values corresponding to one or more configurations of the multiple DMRSs, one or more combs used to communicate the multiple DMRSs, or both.

In an eighty-ninth aspect, alone or in combination with one or more of the eighty-third through eighty-eighth aspects, the first set of symbols and the second set of symbols do not include one or more symbols allocated to a DC tone.

In a ninetieth aspect, alone or in combination with one or more of the eighty-third through eighty-ninth aspects, the apparatus comprises a network entity, and the multiple DMRSs and the PTRS are associated with a PDSCH between the network entity and the UE.

In a ninety-first aspect, alone or in combination with one or more of the eighty-third through eighty-ninth aspects, the apparatus comprises a second UE, and the multiple DMRSs and the PTRS are associated with a PSSCH between the second UE and the UE.

In a ninety-second aspect, alone or in combination with one or more of the eighty-third through ninety-first aspects, the PTRS includes a NZP PTRS allocated to a first subset of the first set of symbols and a first subset of the second set of symbols and a ZP PTRS allocated to a second subset of the first set of symbols and a second subset of the second set of symbols.

In a ninety-third aspect, in combination with the ninety-second aspect, the first subset of the first set of symbols and the second subset of the first set of symbols are associated with one or more of the first subset of subcarriers, and the first subset of the second set of symbols and the second subset of the second set of symbols are associated with the second subset of subcarriers.

In a ninety-fourth aspect, alone or in combination with one or more of the ninety-second through ninety-third aspects, the apparatus transmits DCI to the UE. The DCI includes a field indicating that the ZP PTRS is associated with multiple subsets of subcarriers, wherein the transmitting node comprises a network entity.

In a ninety-fifth aspect, in combination with the ninety-fourth aspect, the field comprises a single bit.

In a ninety-sixth aspect, alone or in combination with one or more of the ninety-fourth through ninety-fifth aspects, the DCI indicates an offset of the second subset of the first set of symbols, an offset of the second subset of the second set of symbols, or both.

In a ninety-sixth aspect, alone or in combination with one or more of the ninety-second through ninety-third aspects, an offset of the second subset of the first set of symbols, an offset of the second subset of the second set of symbols, or both, are based on one or more predefined values stored at a memory of the apparatus.

In a ninety-seventh aspect, alone or in combination with one or more of the ninety-second through ninety-sixth aspects, the apparatus comprises a network entity, and the multiple DMRSs and the PTRS are associated with a PDSCH between the network entity and the UE.

In a ninety-eighth aspect, alone or in combination with one or more of the eighty-third through ninety-first aspects, the apparatus comprises a second UE, the PTRS includes a NZP PTRS allocated to a first subset of the first set of symbols and a first subset of the second set of symbols and a ZP PTRS allocated to a second subset of the first set of symbols and a second subset of the second set of symbols, and the multiple DMRSs and the PTRS are associated with a PSSCH between the second UE and the UE.

In a ninety-ninth aspect, in combination with the ninety-eighth aspect, the first subset of the first set of symbols and the second subset of the first set of symbols are associated with one or more of the first subset of subcarriers, and the first subset of the second set of symbols and the second subset of the second set of symbols are associated with the second subset of subcarriers.

In a hundredth aspect, alone or in combination with one or more of the ninety-eighth through ninety-ninth aspects, the apparatus transmits SCI-1 to the UE. The SCI-1 includes a field indicating that the ZP PTRS is associated with multiple subsets of subcarriers.

In a hundred-and-first aspect, in combination with the hundredth aspect, the field comprises a single bit.

In a hundred-and-second aspect, alone or in combination with one or more of the hundredth through hundred-and-first aspects, the SCI-1 indicates an offset of the second subset of the first set of symbols, an offset of the second subset of the second set of symbols, or both.

In a hundred-and-third aspect, alone or in combination with one or more of the ninety-eighth through ninety-ninth aspects, an offset of the second subset of the first set of symbols, an offset of the second subset of the second set of symbols, or both, are based on one or more predefined values stored at a memory of the apparatus.

In a hundred-and-fourth aspect, alone or in combination with one or more of the eighty-third through ninety-first aspects, the apparatus comprises a network entity, and the apparatus transmits DCI to the UE. The DCI indicates that a ZP PTRS is associated with multiple subsets of subcarriers.

In a hundred-and-fifth aspect, in combination with the hundred-and-fourth aspect, the DCI indicates an offset of the ZP PTRS.

In a hundred-and-sixth aspect, alone or in combination with one or more of the sixty-seventh through seventy-first aspects, the apparatus allocates the PTRS to one or more symbols subsequent to the second DMRS symbol and to one or more subcarriers of the second subset of subcarriers.

In a hundred-and-seventh aspect, in combination with the hundred-and-sixth aspect, the first set of DMRSs is associated with an antenna port having a lower index than an antenna port associated with the second set of DMRSs.

In a hundred-and-eighth aspect, in combination with the hundred-and-sixth aspect, the second set of DMRSs is associated with an antenna port having a lowest index of a plurality of antenna ports configured to receive DMRSs at the UE.

In a hundred-and-ninth aspect, alone or in combination with one or more of the hundred-and-sixth through the hundred-and-eighth aspects, the apparatus comprises a network entity, and the multiple DMRSs and the PTRS are associated with a PDSCH between the network entity and the UE.

In a hundred-and-tenth aspect, alone or in combination with one or more of the hundred-and-sixth through hundred-and-ninth aspects, the PTRS includes a NZP PTRS allocated to a first subset of the one or more symbols and a ZP PTRS allocated to a second subset of the one or more symbols.

In a hundred-and-eleventh aspect, in combination with the hundred-and-tenth aspect, the first subset of the one or more symbols and the second subset of the one or more symbols are fixed across the one or more of the second subset of subcarriers.

In a hundred-and-twelfth aspect, alone or in combination with one or more of the hundred-and-tenth through hundred-and-eleventh aspects, the apparatus comprises a network entity, and the multiple DMRSs and the PTRS are associated with a PDSCH between the network entity and the UE.

In some aspects, an apparatus configured for wireless communication, such as a network entity, is configured to receive, from a UE, multiple DMRSs including a first set of DMRSs allocated to a first DMRS symbol and a first subset of subcarriers and a second set of DMRSs allocated to a second DMRS symbol and a second subset of subcarriers. The apparatus is also configured to receive, from the UE, a PTRS associated with the multiple DMRSs. The apparatus is further configured to performing channel estimation based on the multiple DMRSs and a phase tracking process based on the multiple DMRSs and the PTRS. In some implementations, the apparatus includes a wireless device, such as a network entity. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein.

In a hundred-and-thirteenth aspect, the multiple DMRSs and the PTRS are associated with a PUSCH between the apparatus and the UE.

In a hundred-and-fourteenth aspect, alone or in combination with the hundred-and-thirteenth aspect, the first set of DMRSs is associated with a first antenna port, and the second set of DMRSs is associated with a second antenna port.

In a hundred-and-fifteenth aspect, in combination with the hundred-and-fourteenth aspect, the first antenna port is included in a first CDM group configured for the UE, and the second antenna port is included in a second CDM group configured for the UE.

In a hundred-and-sixteenth aspect, alone or in combination with one or more of the hundred-and-thirteenth through hundred-and-fifteenth aspects, the first DMRS symbol and the second DMRS symbol are consecutive symbols.

In a hundred-and-seventeenth aspect, alone or in combination with one or more of the hundred-and-thirteenth through hundred-and-fifteenth aspects, the first DMRS symbol and the second DMRS symbol are non-consecutive symbols.

In a hundred-and-eighteenth aspect, alone or in combination with one or more of the hundred-and-thirteenth through hundred-and-seventeenth aspects, the PTRS is allocated to one or more symbols subsequent to the first DMRS symbol and to one or more subcarriers of the first subset of subcarriers.

In a hundred-and-nineteenth aspect, in combination with the hundred-and-eighteenth aspect, the one or more symbols subsequent to the first DMRS symbol are also subsequent to the second DMRS symbol.

In a hundred-and-twentieth aspect, in combination with the hundred-and-eighteenth aspect, the one or more symbols subsequent to the first DMRS symbol include a first set of symbols between the first DMRS symbol and the second DMRS symbol and a second set of symbols subsequent to the second DMRS symbol.

In a hundred-and-twenty-first aspect, alone or in combination with one or more of the hundred-and-thirteenth through hundred-and-seventeenth aspects, the PTRS is optionally allocated to a first set of symbols between the first DMRS symbol and the second DMRS symbol and to one or more subcarriers of the first subset of subcarriers and is allocated to a second set of symbols subsequent to the second DMRS symbol and to one or more subcarriers of the second subset of subcarriers.

In a hundred-and-twenty-second aspect, in combination with the hundred-and-twenty-first aspect, the apparatus receives, from the UE, a first higher layer parameter associated with the first set of DMRSs and a second higher layer parameter associated with the second set of DMRSs. The first higher layer parameter indicates an offset of the first set of symbols, and wherein the second higher layer parameter indicates an offset of the second set of symbols.

In a hundred-and-twenty-third aspect, in combination with the hundred-and-twenty-first aspect, an offset of the first set of symbols is based on a first predetermined value stored at a memory of the UE, and an offset of the second set of symbols is based on a second predetermined value stored at the memory.

In a hundred-and-twenty-fourth aspect, alone or in combination with one or more of the hundred-and-twenty-first through hundred-and-twenty-third aspects, the first set of symbols and the second set of symbols do not include one or more symbols allocated to a DC tone.

In a hundred-and-twenty-fifth aspect, alone or in combination with one or more of the hundred-and-thirteenth through hundred-and-seventeenth aspects, the PTRS is allocated to one or more symbols subsequent to the second DMRS symbol and to one or more subcarriers of the second subset of subcarriers.

In a hundred-and-twenty-sixth aspect, in combination with the hundred-and-twenty-fifth aspect, the first set of DMRSs is associated with an antenna port having a lower index than an antenna port associated with the second set of DMRSs.

In a hundred-and-twenty-seventh-aspect in combination with the hundred-and-twenty-fifth aspect, the second set of DMRSs is associated with an antenna port having a lowest index of a plurality of antenna ports configured to receive DMRSs at the UE.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks and modules described herein with respect to FIGS. 2, 5, 6, 13, and 16 may comprise processors, electronics devices, hardware devices, electronics components, logical circuits, memories, software codes, firmware codes, etc., or any combination thereof. In addition, features discussed herein relating to FIGS. 1-16 may be implemented via specialized processor circuitry, via executable instructions, and/or combinations thereof.

Those of skill would further appreciate that the various illustrative logical blocks, modules, circuits, and algorithm steps (e.g., the logical blocks in FIGS. 11, 12, 14, and 15) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method of wireless communication performed by a user equipment (UE), the method comprising:
receiving, from a network entity or a second UE, multiple demodulation reference signals (DMRSs) including a first set of DMRSs allocated to a first DMRS symbol and a first subset of subcarriers and a second set of DMRSs allocated to a second DMRS symbol and a second subset of subcarriers, wherein the first set of DMRSs and the second set of DMRSs are allocated in a staggered configuration such that the first set of DMRSs occupy the first DMRS symbol and the second set of DMRSs occupy a second DMRS symbol distinct from the first DMRS symbol, wherein the first set of DMRSs is associated with an antenna port having a lowest index of a plurality of antenna ports configured to receive DMRSs at the UE;
receiving, from the network entity or the second UE, a phase tracking reference signal (PTRS) associated with the multiple DMRSs, wherein:
the PTRS is allocated to one or more symbols subsequent to the first DMRS symbol and subsequent to the second DMRS symbol and is not allocated to one or more symbols preceding the first DMRS symbol and preceding the second DMRS symbol,
the PTRS is allocated to a first plurality of the first subset of subcarriers and to a second plurality of the second subset of subcarriers,
the first subset of subcarriers are one of even subcarriers or odd subcarriers,
the second subset of subcarriers are the other of the even subcarriers or the odd subcarriers, and
the PTRS includes a non-zero power (NZP) PTRS allocated to a first subset of the one or more symbols and a zero power (ZP) PTRS allocated to a second subset of the one or more symbols; and
performing channel and phase noise estimation based on the multiple DMRSs and the PTRS.

2. The method of claim 1, wherein a first antenna port associated with the first set of DMRSs is included in a first code-division multiplexing (CDM) group configured for the UE, wherein a second antenna port associated with the second set of DMRSs is included in a second CDM group configured for the UE.

3. The method of claim 1, further comprising combining a first antenna port associated with the first set of DMRSs and a second antenna port associated with the second set of DMRSs into a single virtual port, wherein the channel and phase noise estimation is performed using the single virtual port.

4. The method of claim 1, wherein performing the channel and phase noise estimation includes interpolating a phase between resource elements of the first set of DMRSs and the second set of DMRSs.

5. The method of claim 1, wherein the multiple DMRSs and the PTRS are associated with a physical sidelink shared channel (PSSCH) between the UE and the second UE.

6. The method of claim 1, wherein there is no overlap between the first set of DMRSs and the second set of DMRSs on any DMRS symbol.

7. An apparatus configured for wireless communication, the apparatus comprising:
at least one processor; and
a memory coupled to the at least one processor,
wherein the at least one processor is configured to, when executing instructions stored in the memory, cause the apparatus to:
receive, from a network entity or a user equipment (UE), multiple demodulation reference signals (DMRSs) including a first set of DMRSs allocated to a first DMRS symbol and a first subset of subcarriers and a second set of DMRSs allocated to a second DMRS symbol and a second subset of subcarriers, wherein the first set of DMRSs and the second set of DMRSs are allocated in a staggered configuration such that the first set of DMRSs occupy a first DMRS symbol and the second set of DMRSs occupy a second DMRS symbol distinct from the first DMRS symbol, wherein the first set of DMRSs is associated with an antenna port having a lowest index of a plurality of antenna ports configured to receive DMRSs at the apparatus;
receive, from the network entity or the UE, a phase tracking reference signal (PTRS) associated with the multiple DMRSs, wherein:
the PTRS is allocated to one or more symbols subsequent the first DMRS symbol and subsequent to the second DMRS symbol and is not allocated to one or more symbols preceding the first DMRS symbol and preceding the second DMRS symbol,
the PTRS is allocated to a first plurality of the first subset of subcarriers and to a second plurality of the second subset of subcarriers,
the first subset of subcarriers are one of even subcarriers or odd subcarriers,
the second subset of subcarriers are the other of the even subcarriers or the odd subcarriers, and
the PTRS includes a non-zero power (NZP) PTRS allocated to a first subset of the one or more symbols and a zero power (ZP) PTRS allocated to a second subset of the one or more symbols; and
perform channel and phase noise estimation based on the multiple DMRSs and the PTRS.

8. The apparatus of claim 7, wherein the first DMRS symbol and the second DMRS symbol are consecutive symbols.

9. The apparatus of claim 8, wherein the at least one processor is further configured to, when executing instructions stored in the memory, cause the apparatus to receive, from the network entity or the UE, a first higher layer parameter associated with the first set of DMRSs and a second higher layer parameter associated with the second set of DMRSs, wherein the first higher layer parameter indicates an offset of the first subset of the one or more symbols, and wherein the second higher layer parameter indicates an offset of the second subset of the one or more symbols.

10. The apparatus of claim 8, wherein the at least one processor is further configured to, when executing instructions stored in the memory, cause the apparatus to select a first predetermined value and a second predetermined value from a plurality of predetermined values stored at the memory based on a configuration of the multiple DMRSs, one or more combs used to communicate the multiple DMRSs, or both, wherein an offset of the first set of symbols is based on the first predetermined value, and wherein an offset of the second set of symbols is based on the second predetermined value.

11. The apparatus of claim 8, wherein the first set of symbols and the second set of symbols do not include one or more symbols allocated to a direct current (DC) tone.

12. A method of wireless communication, the method comprising:
transmitting, to a user equipment (UE) from a transmitting node, multiple demodulation reference signals (DMRSs) including a first set of DMRSs allocated to a first DMRS symbol and a first subset of subcarriers and a second set of DMRSs allocated to a second DMRS symbol and a second subset of subcarriers, wherein the first set of DMRSs and the second set of DMRSs are allocated in a staggered configuration such that the first set of DMRSs occupy a first DMRS symbol and the second set of DMRSs occupy a second DMRS symbol distinct from the first DMRS symbol, wherein the first set of DMRSs is associated with an antenna port having a lowest index of a plurality of antenna ports configured to receive DMRSs at the UE;
transmitting, to the UE, a phase tracking reference signal (PTRS) associated with the multiple DMRSs, wherein:
the PTRS is allocated to one or more symbols subsequent to the first DMRS symbol and subsequent to the second DMRS symbol and is not allocated to one or more symbols preceding the first DMRS symbol and preceding the second DMRS symbol,
the PTRS is allocated to a first plurality of the first subset of subcarriers and to a second plurality of the second subset of subcarriers,
the first subset of subcarriers are one of even subcarriers or odd subcarriers,
the second subset of subcarriers are the other of the even subcarriers or the odd subcarriers, and
the PTRS includes a non-zero power (NZP) PTRS allocated to a first subset of the one or more symbols and a zero power (ZP) PTRS allocated to a second subset of the one or more symbols; and
receiving a channel estimation from the UE, the channel estimation based on the multiple DMRSs and the PTRS.

13. The method of claim 12, further comprising transmitting downlink control information (DCI) to the UE, the DCI including a field indicating that the ZP PTRS is associated with multiple subsets of subcarriers, wherein the transmitting node comprises a network entity.

14. The method of claim 12, wherein an offset of the second subset of the first set of symbols, an offset of the second subset of the second set of symbols, or both, are based on one or more predefined values stored at a memory of the transmitting node.

15. The method of claim 12, further comprising transmitting sidelink control information 1 (SCI-1) to the UE, the SCI-1 including a field indicating that the ZP PTRS is associated with multiple subsets of subcarriers, wherein the transmitting node comprises a second UE, and wherein the multiple DMRSs and the PTRS are associated with a physical sidelink shared channel (PSSCH) between the second UE and the UE.

16. The method of claim 12, wherein the transmitting node comprises a second UE, wherein the multiple DMRSs and the PTRS are associated with a physical sidelink shared channel (PSSCH) between the second UE and the UE wherein an offset of the second subset of the first set of symbols, an offset of the second subset of the second set of symbols, or both, are based on one or more predefined values stored at a memory of the transmitting node.

17. The method of claim 12, wherein the transmitting node comprises a network entity, and further comprising transmitting downlink control information (DCI) to the UE, the DCI indicating that the zero power (ZP) PTRS is associated with multiple subsets of subcarriers.

18. An apparatus configured for wireless communication, the apparatus comprising:
  at least one processor; and
  a memory coupled to the at least one processor,
  wherein the at least one processor is configured to, when executing instructions stored in the memory, cause the apparatus to:
    initiate transmission, to a user equipment (UE), of multiple demodulation reference signals (DMRSs) including a first set of DMRSs allocated to a first DMRS symbol and a first subset of subcarriers and a second set of DMRSs allocated to a second DMRS symbol and a second subset of subcarriers, wherein the first set of DMRSs and the second set of DMRSs are allocated in a staggered configuration such that the first set of DMRSs occupy a first DMRS symbol and the second set of DMRSs occupy a second DMRS symbol distinct from the first DMRS symbol, wherein the first set of DMRSs is associated with an antenna port having a lowest index of a plurality of antenna ports configured to receive DMRSs at the UE;
    initiate transmission, to the UE, of a phase tracking reference signal (PTRS) associated with the multiple DMRSs, wherein:
      the PTRS is allocated to one or more symbols subsequent the first DMRS symbol and subsequent to the second DMRS symbol and is not allocated to one or more symbols preceding the first DMRS symbol and preceding the second DMRS symbol,
      the PTRS is allocated to a first plurality of the first subset of subcarriers and to a second plurality of the second subset of subcarriers,
      the first subset of subcarriers are one of even subcarriers or odd subcarriers,
      the second subset of subcarriers are the other of the even subcarriers or the odd subcarriers, and
      the PTRS includes a non-zero power (NZP) PTRS allocated to a first subset of the one or more symbols and a zero power (ZP) PTRS allocated to a second subset of the one or more symbols; and
    receive a channel estimation from the UE, the channel estimation based on the multiple DMRSs and the PTRS.

19. The apparatus of claim 18, wherein the first set of DMRSs is associated with an antenna port having a lower index than an antenna port associated with the second set of DMRSs, and wherein the second set of DMRSs is associated with the antenna port having the lowest index of the plurality of antenna ports configured to receive the DMRSs at the UE.

20. The apparatus of claim 18, wherein the first subset of the one or more symbols and the second subset of the one or more symbols are fixed across the one or more of the second subset of subcarriers.

* * * * *